United States Patent
Kondo et al.

(10) Patent No.: US 7,605,868 B2
(45) Date of Patent: Oct. 20, 2009

(54) INFORMATION PROCESSING APPARATUS AND METHOD, RECORDING MEDIUM, AND PROGRAM

(75) Inventors: Tetsujiro Kondo, Tokyo (JP); Daisuke Kikuchi, Tokyo (JP); Takeshi Miyai, Tokyo (JP); Takashi Nakanishi, Tokyo (JP); Yoshiaki Nakamura, Tokyo (JP); Tsugihiko Haga, Kanagawa (JP); Shizuo Chikaoka, Tokyo (JP)

(73) Assignee: Sony Corporation, Tokyo (JP)

( * ) Notice: Subject to any disclaimer, the term of this patent is extended or adjusted under 35 U.S.C. 154(b) by 751 days.

(21) Appl. No.: 11/040,586

(22) Filed: Jan. 21, 2005

(65) Prior Publication Data

US 2005/0201631 A1 Sep. 15, 2005

(30) Foreign Application Priority Data

Jan. 22, 2004 (JP) .............................. 2004-013888
Jan. 22, 2004 (JP) .............................. 2004-013890
Jan. 22, 2004 (JP) .............................. 2004-013891

(51) Int. Cl.
*H04N 5/46* (2006.01)

(52) U.S. Cl. ...................... 348/555; 348/441; 348/458; 348/558

(58) Field of Classification Search ................ 348/441, 348/448, 458–459, 558, 555, 409.1–410.1, 348/414.1; 382/254

See application file for complete search history.

(56) References Cited

U.S. PATENT DOCUMENTS 5,663,764 A * 9/1997 Kondo et al. ............ 375/240.14
5,727,085 A * 3/1998 Toyama et al. .............. 382/232
6,571,142 B1 * 5/2003 Kondo et al. .................. 700/90

OTHER PUBLICATIONS

Patent Abstracts of Japan, Publication No. 07-079418, Publication Date Mar. 20, 1995.
Patent Abstracts of Japan, Publication No. 2000-078536, Publication Date Mar. 14, 2000.

* cited by examiner

*Primary Examiner*—Trang U Tran
(74) *Attorney, Agent, or Firm*—Frommer Lawrence & Haug LLP; William S. Frommer; Thomas F. Presson

(57) ABSTRACT

A pattern matching section compares reference taps supplied by one area extracting section with a reference tap component of a training pair pre-stored in a training-pair storing section, selects a training pair including a reference tap component having highest similarity to the reference taps, and supplies the selected training pair to a normal-equation generating section. Training pairs stored in the training-pair storing section include a SD signal and HD signal. A prediction-coefficient determining section obtains prediction coefficients by solving normal equations generated by the normal-equation generating section. A prediction calculating section produces a HD signal by applying the prediction coefficients to prediction taps extracted by another area extracting section.

13 Claims, 49 Drawing Sheets

RELATED ART

RELATED ART

RELATED ART

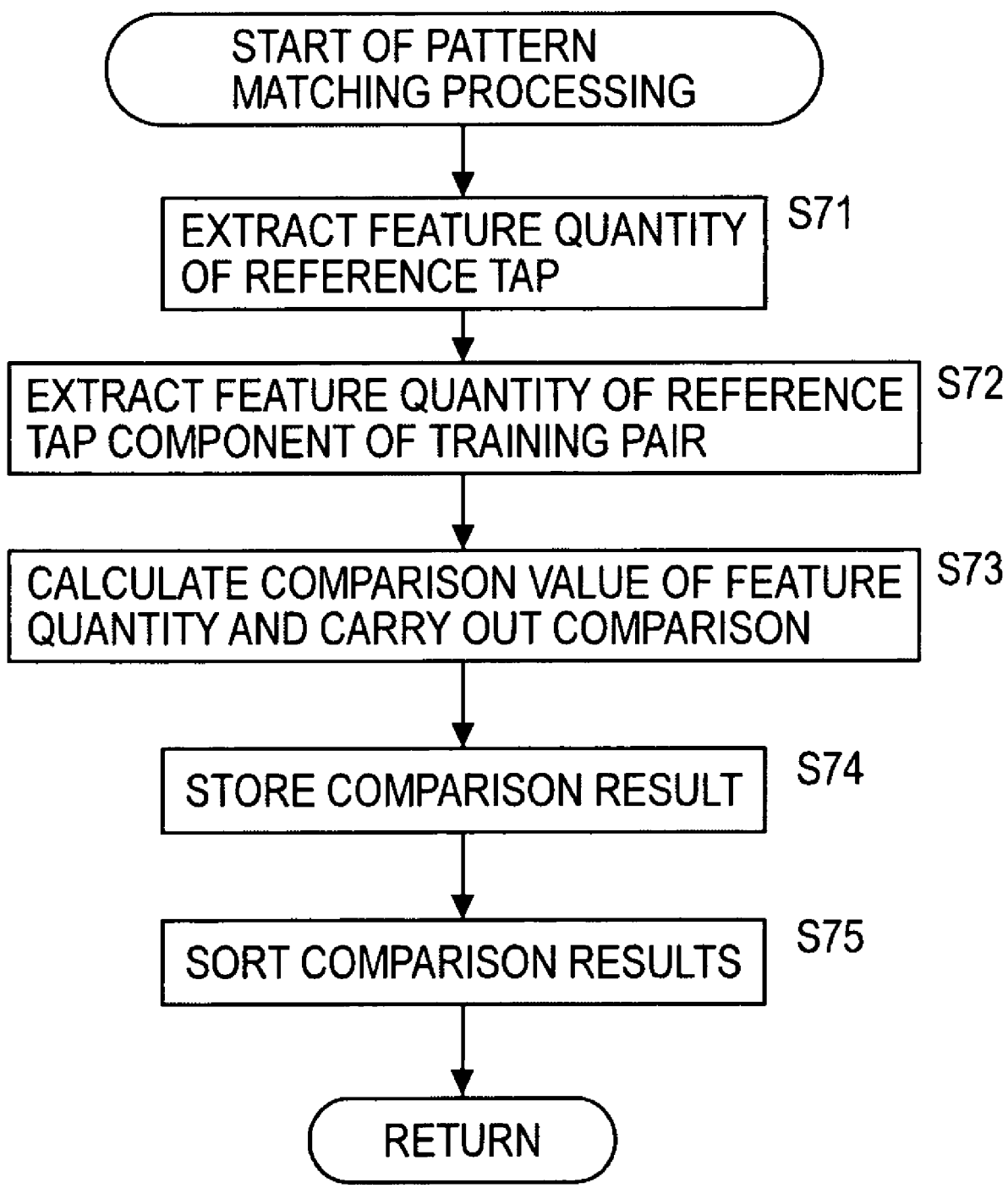

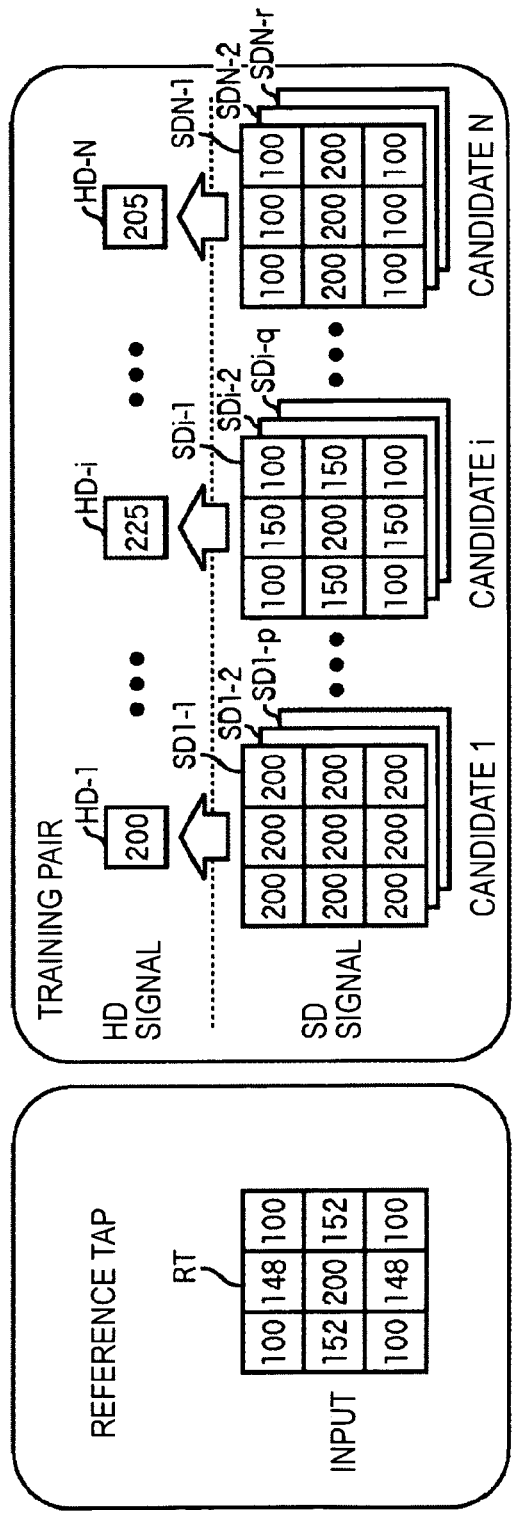
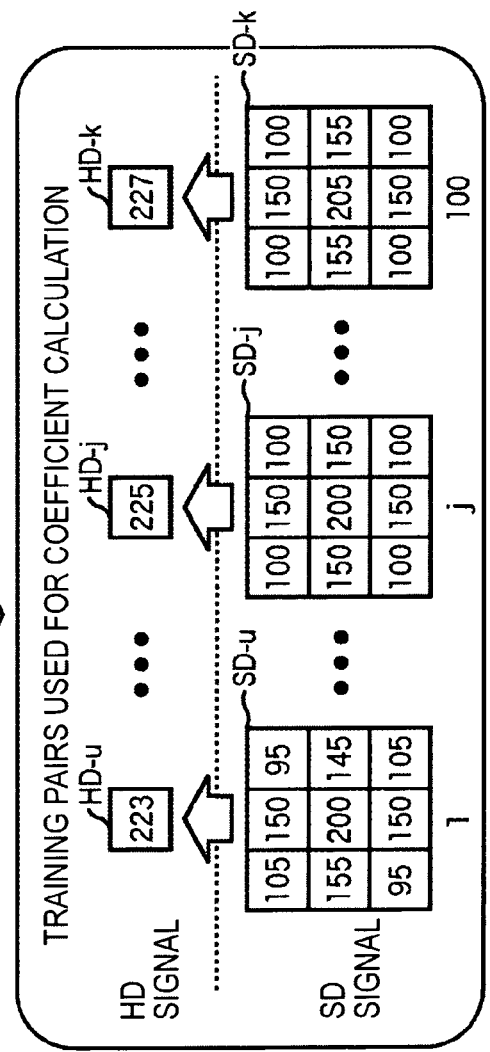

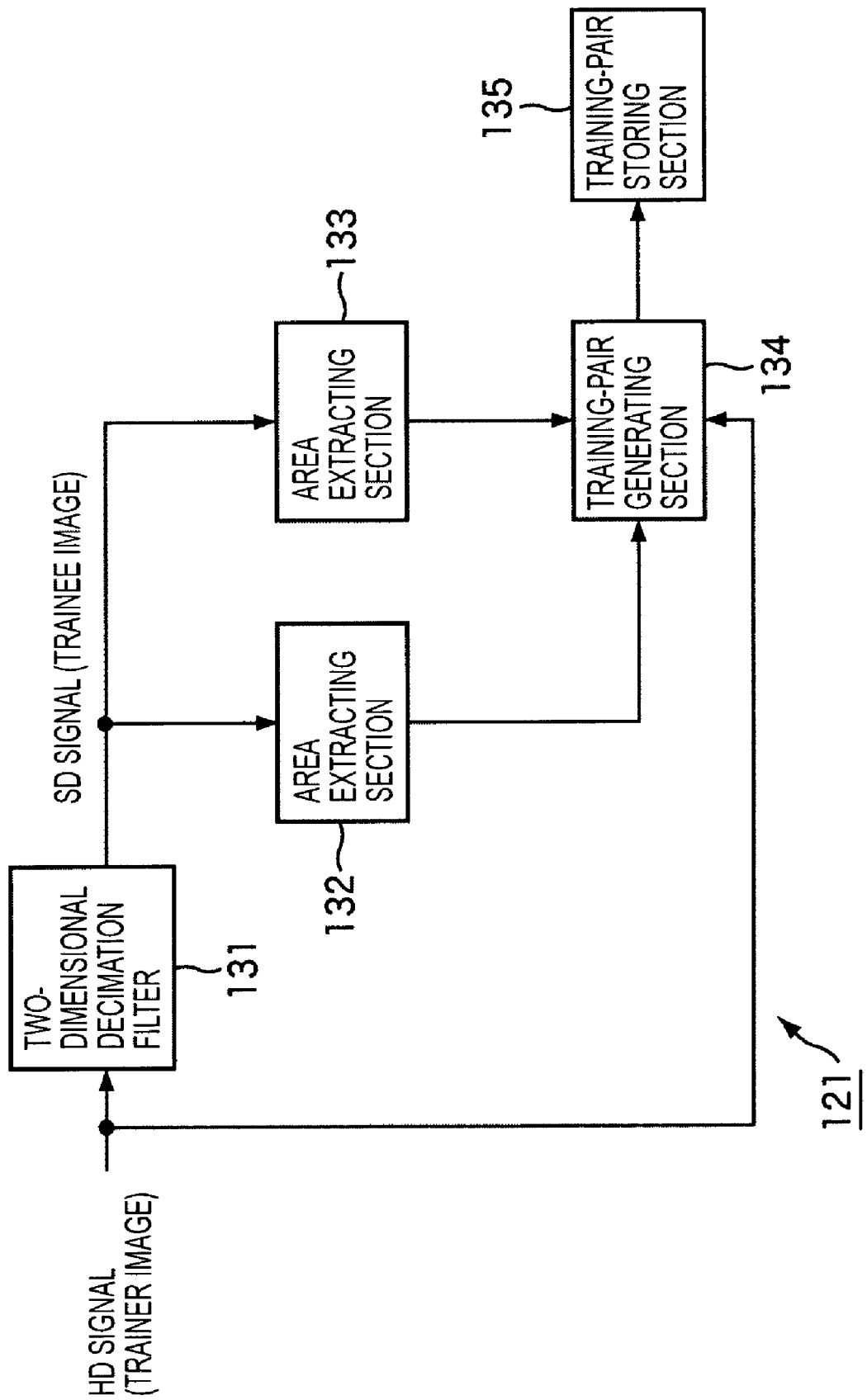

FIG. 25

CIF IMAGE SIGNAL

×  ×  ×  ×  ×

×  c1 ⊗  c2 ⊗  c3 ⊗  ×

×  c4 ⊗  c5 ⊗  c6 ⊗  ×

×  c7 ⊗  c8 ⊗  c9 ⊗  ×

×  ×  ×  ×  ×

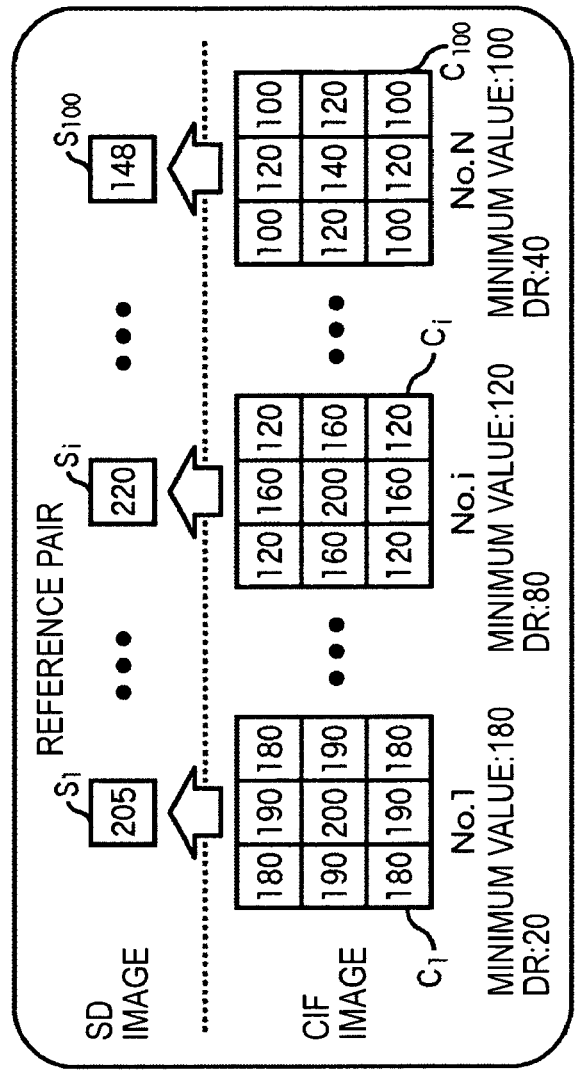
FIG. 30A
FIG. 30B
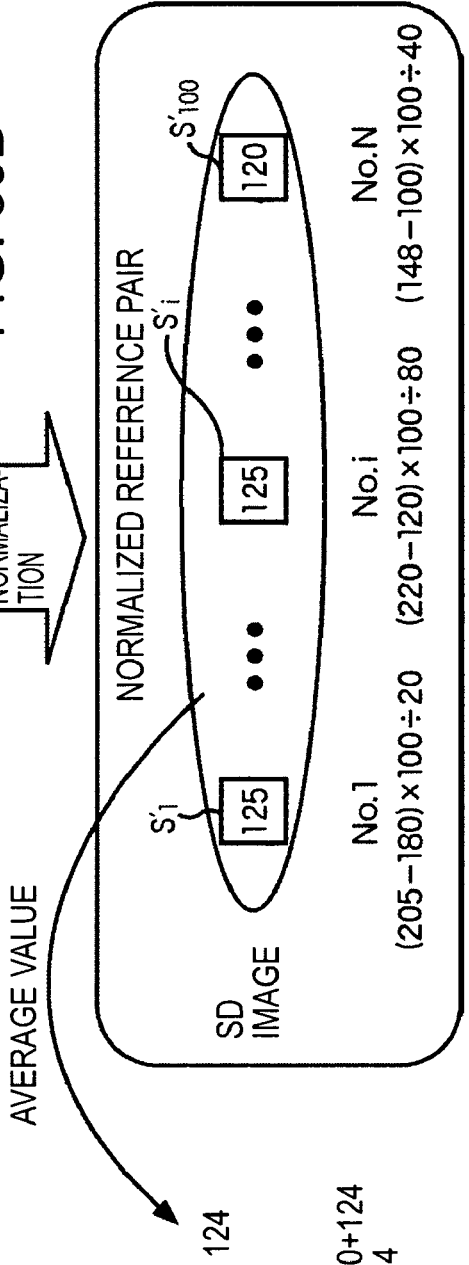
FIG. 30C

INPUT → OUTPUT

INPUT → OUTPUT

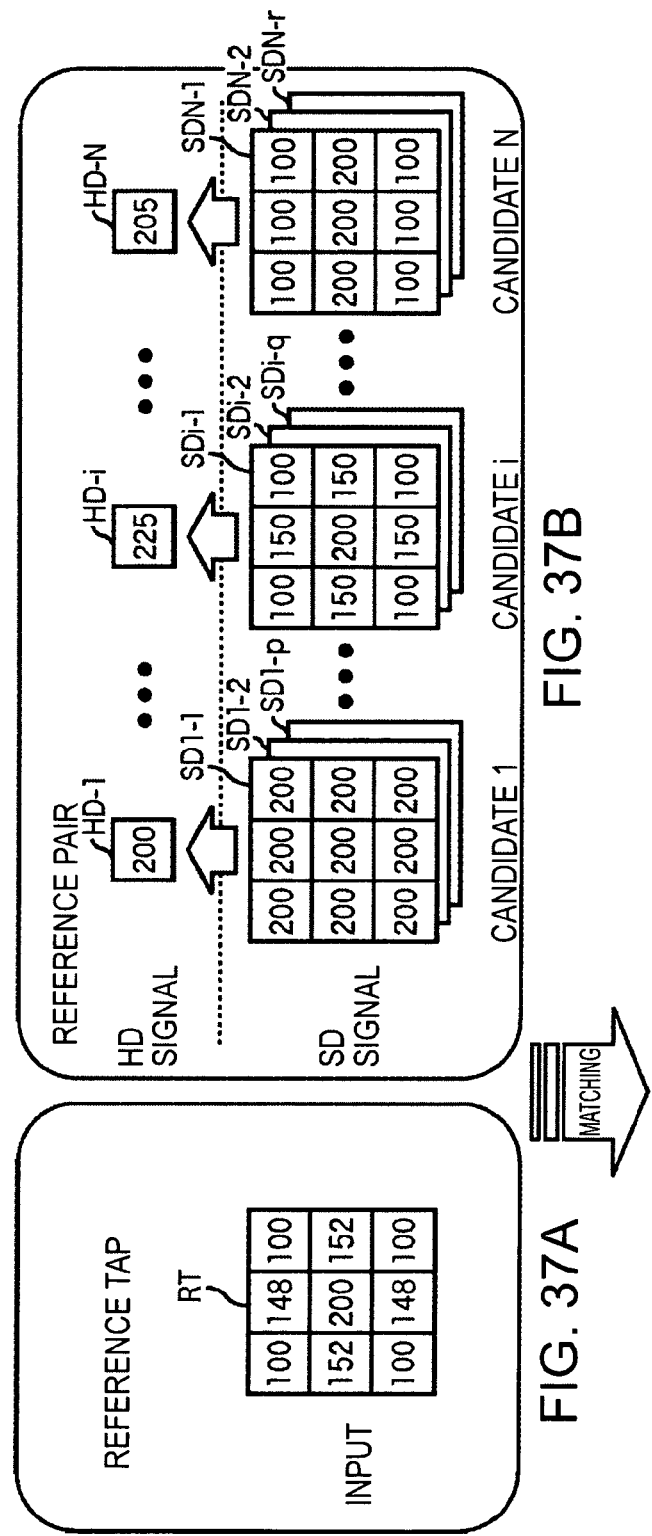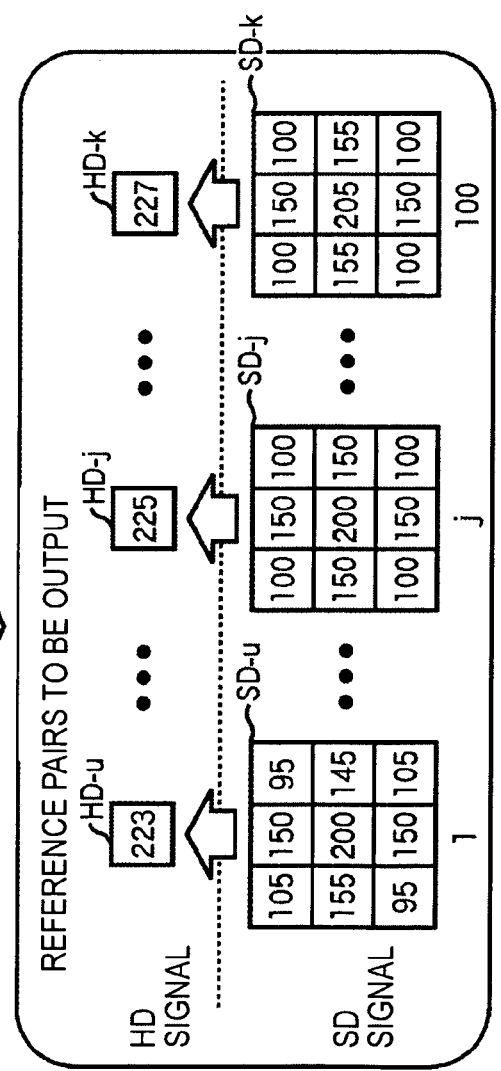
FIG. 37A
FIG. 37B
FIG. 37C

INFORMATION PROCESSING APPARATUS AND METHOD, RECORDING MEDIUM, AND PROGRAM

BACKGROUND OF THE INVENTION

1. Field of the Invention

The present invention relates to an information processing apparatus and method, a recording medium, and a program. In particular, the present invention relates to an information processing apparatus and method, a recording medium, and a program for enabling image signals to be generated with higher prediction accuracy. The present invention also relates to an information processing apparatus and method, a recording medium, and a program for enabling higher-quality information to be obtained in a shorter period of time. The present invention further relates to an information processing apparatus and method, a recording medium, and a program for enabling image signals to be generated more easily with higher prediction accuracy.

2. Description of the Related Art

The assignee has proposed in Japanese Registered Patent Publication No. 3321915 a method of classification adaptive processing for converting a standard-definition (resolution) television signal (SD signal) to a high-definition (resolution) image signal (HD signal). The principle of classification adaptive processing for generating a HD signal from a SD signal will now be described with reference to FIGS. 1 to 4.

FIG. 1 depicts an example structure of an information processing apparatus 1 based on the known classification adaptive processing. In this example structure, an input SD signal is supplied to an area extracting section 11 and an area extracting section 15. The area extracting section 11 extracts, as class taps, predetermined pixels at a predetermined location on a preset frame of the input SD signal, and supplies them to an ADRC processing section 12. The ADRC processing section 12 applies 1-bit ADRC (Adaptive Dynamic Range Coding) processing to the class taps supplied by the area extracting section 11, and then supplies the obtained 1-bit ADRC code to a class-code determining section 13.

The class-code determining section 13 determines a class code based on the input 1-bit ADRC code and supplies it to a prediction coefficient storing section 14. The relationship between the 1-bit ADRC code and the class code is preset. The prediction coefficient storing section 14 pre-stores prediction coefficients corresponding to the class code, and outputs the prediction coefficients corresponding to the input class code to a prediction calculating section 16.

The area extracting section 15 extracts the pixels in a preset area as prediction taps from the input SD signal, and supplies them to the prediction calculating section 16. The prediction calculating section 16 generates a HD signal by applying a linear simple expression using the prediction coefficients supplied by the prediction coefficient storing section 14 to the prediction taps supplied by the area extracting section 15.

HD signal generation processing by the information processing apparatus 1 in FIG. 1 will now be described with reference to the flowchart in FIG. 2. First in step S1, the area extracting section 11 selects one pixel of interest to be processed from the input SD signal. In step S2, the area extracting section 11 extracts class taps corresponding to the pixel of interest. Which pixels are to be set as class taps in relation to the specified pixel of interest are predetermined.

In step S3, the ADRC processing section 12 applies 1-bit ADRC processing to the class taps extracted by the area extracting section 11. In step S4, the class-code determining section 13 determines a class code based on the 1-bit ADRC code generated in step S3 by the ADRC processing section 12.

In step 5, the area extracting section 15 extracts prediction taps from the input SD signal. The locations of the prediction taps corresponding to the pixel of interest are also preset, and the area extracting section 15 extracts the prediction taps corresponding to the pixel of interest selected in step S1 and supplies them to the prediction calculating section 16. In step S6, the prediction calculating section 16 reads prediction coefficients. More specifically, the prediction coefficient storing section 14 reads prediction coefficients stored at the address corresponding to the class code and outputs them to the prediction calculating section 16. The prediction calculating section 16 reads out the prediction coefficients.

In step S7, the prediction calculating section 16 carries out prediction calculation. More specifically, the prediction calculating section 16 applies the prediction coefficients read from the prediction coefficient storing section 14 to the prediction taps supplied by the area extracting section 15, based on a predetermined linear simple expression, to generate a HD signal. In step S8, the prediction calculating section 16 outputs the HD signal predictively generated through the processing in step S7.

In step S9, the area extracting section 11 determines whether the processing of all pixels has been completed. If there still remains a pixel which has not been processed, the flow returns to step S1 to repeat the same processing. If it is determined in step S9 that the processing of all pixels has been completed, the processing of generating a HD signal from a SD signal ends.

FIG. 3 depicts an example structure of an information processing apparatus 31 for producing, through training, prediction coefficients stored in the prediction coefficient storing section 14. In this information processing apparatus 31, a two-dimensional decimation filter 41 generates a SD signal as a trainee signal from an input HD signal as a trainer image and supplies it to an area extracting section 42 and an area extracting section 45. The area extracting section 42 extracts class taps from the SD signal and supplies them to an ADRC processing section 43. The area extracted by the area extracting section 42 (positional relationships of the class taps with the pixel of interest) is the same as in the area extracting section 11 shown in FIG. 1.

The ADRC processing section 43 applies 1-bit ADRC processing to the class taps supplied by the area extracting section 42 and outputs the ADRC code to a class-code determining section 44.

The class-code determining section 44 determines a class code based on the input ADRC code and outputs it to a normal equation generating section 46. The correspondence between the ADRC code and the class code in the class-code determining section 44 is the same as in the class-code determining section 13 shown in FIG. 1.

The area extracting section 45 extracts prediction taps from the SD signal supplied by the two-dimensional decimation filter 41 and supplies them to a normal equation generating section 46. The prediction area extracted by the area extracting section 45 (positional relationships of the prediction taps with the pixel of interest) is the same as in the area extracting section 15 shown in FIG. 1.

The normal equation generating section 46 generates normal equations including linear simple expressions defining the relationship between the SD signal and the HD signal for each class (class code), and supplies them to a prediction coefficient determining section 47. The prediction coefficient determining section 47 determines prediction coefficients by solving the normal equations supplied by the normal equation generating section 46 through, for example, the least squares method and supplies them to a prediction coefficient storing section 48. The prediction coefficient storing section 48 stores the prediction coefficients supplied by the prediction coefficient determining section 47.

The training processing by the information processing apparatus 31 will now be described with reference to the flowchart shown in FIG. 4. In step S21, the two-dimensional decimation filter 41 generates a SD signal as a trainee image by decimating every other pixel of the input HD signal horizontally and vertically. In step S22, the area extracting section 42 extracts class taps from the SD signal supplied by the two-dimensional decimation filter 41. In step S23, the ADRC processing section 43 applies 1-bit ADRC processing to the class taps supplied by the area extracting section 42. In step S24, the class-code determining section 44 determines a class code based on the ADRC code supplied by the ADRC processing section 43.

On the other hand, in step S25 the area extracting section 45 extracts prediction taps from the SD signal supplied by the two-dimensional decimation filter 41 and outputs them to the normal equation generating section 46. In step S26, the normal equation generating section 46 generates normal equations including linear simple expressions defining the relationships between a HD signal, functioning as a trainer image, and prediction taps (SD signal), functioning as a trainee image, for each class code supplied by the class-code determining section 44. In step S27, the prediction coefficient determining section 47 determines prediction coefficients by solving the normal equations generated by the normal equation generating section 46 through, for example, the least squares method. In step S28, the prediction coefficient storing section 48 stores the prediction coefficients supplied by the prediction coefficient determining section 47.

In this manner, the prediction coefficients stored in the prediction coefficient storing section 48 are used in the prediction coefficient storing section 14 shown in FIG. 1.

As described above, a prediction coefficient set is generated through training based on a prepared HD image signal and a SD image signal generated from the HD image signal. This training is carried out based on many types of HD image signals. As a result, a prediction coefficient set based on the relationships between many types of HD image signals and SD image signals is obtained.

Applying this prediction coefficient set to a received SD image signal enables a HD image signal not actually received to be predicted and generated. The prediction coefficient set thus obtained is based on a statistical property that is most likely to generate a signal as similar to an actual HD signal as possible in response to an input SD signal. As a result, when a standard SD image signal is input, a HD image signal with high accuracy on the average for each class can be predicted and generated.

A sufficient number of HD signals are required during training to acquire prediction coefficients through this classification adaptive processing. However, some classes may not experience a sufficient amount of training depending on training materials. A class with a small amount of training cannot generate appropriate coefficients. If a HD signal is generated from a SD signal with prediction coefficients produced in this manner, it is difficult to generate a HD signal with satisfactorily enhanced image quality.

To overcome this problem, the assignee has disclosed, in Japanese Unexamined Patent Application Publication No. 2000-78536, a method for seemingly increasing the number of training materials by intentionally adding random numbers (noise) during training.

With the known classification adaptive processing, in which a predetermined number of classes are prepared and prediction coefficients are generated based on the prepared classes only, images with satisfactorily high quality are not generated in some cases.

The method of adding random numbers does not always ensure a sufficient amount of training depending on classes because the number of classes is reduced and fixed, resulting in a failure to generate images with satisfactorily high quality.

There is another problem that a HD image signal used to generate prediction coefficients through training differs from an actually predicted HD image signal. This makes it difficult to ensure accurate prediction calculation processing.

A sufficient number of classes are required to overcome this problem. Unfortunately, the number of classes is limited, and if an appropriate class is not available during training with HD image signals, a class which is not appropriate has to be used. This often prevents accurate prediction processing.

Moreover, the known method requires a HD image signal to generate a prediction coefficient set. As a result, the processing of generating a prediction coefficient set through training must be carried out at a different time or place from the processing of generating a HD image signal from a SD image signal by the use of the generated prediction coefficient set. In short, the known method is problematic in that real-time processing from generation of coefficients to generation of HD image signals is difficult.

SUMMARY OF THE INVENTION

The present invention is conceived in light of these circumstances, and an object of the present invention is to generate higher quality images. Another object of the present invention is to predictively generate high-quality images more easily and accurately. Still another object of the present invention is to carry out such processing in real-time.

According to one aspect of the present invention, an information processing apparatus includes: a storage unit for storing a signal pair including a signal of a first type and a signal of a second type corresponding to the signal of the first type; a first extraction unit for extracting a signal in a first range from an input signal as a signal of the first type; a retrieval unit for comparing a feature of the extracted input signal in the first range with a feature of the signal of the first type in the first range in the stored signal pair to retrieve a signal pair including the signal of the first type in the first range having a predetermined relationship with the feature of the extracted input signal in the first range; a calculation unit for calculating a prediction coefficient based on the signal of the second type and the signal of the first type in a second range in the retrieved signal pair; a second extraction unit for extracting a signal in the second range from the input signal; and a generation unit for generating an output signal as a signal of the second type from the input signal in the second range based on the calculated prediction coefficient.

The signal of the first type and the signal of the second type may be image signals and the signal of the second type may have higher resolution than the signal of the first type.

The retrieval unit may include: a first detection unit for detecting the feature of the input signal in the first range; a second detection unit for detecting the feature of the stored signal of the first type in the first range; and a selection unit for comparing the detected feature of the input signal with the detected feature of the signal of the first type and selecting the signal pair based on a result of the comparison.

The first detection unit and the second detection unit may detect a pixel value, a normalized pixel value, or a dynamic range in the first range as the features. The selection unit may perform the comparison based on a norm value, a sum of absolute differences, or a coefficient value of detected values.

The first detection unit and the second detection unit may detect an adaptive dynamic range coding code in the first range and the selection unit may perform the comparison based on a coincidence of detected codes.

The calculation unit may generate a normal equation based on the signal of the second type and the signal of the first type in the second range in the detected signal pair and calculate the prediction coefficient by solving the normal equation.

According to another aspect of the present invention, an information processing method includes: a first extraction step of extracting a signal in a first range from an input signal; a retrieval step of comparing a feature of the extracted input signal in the first range with a feature of a signal of a first type in the first range, the signal of the first type and a corresponding signal of a second type being included in a pre-stored signal pair, to retrieve a signal pair including the signal of the first type in the first range having a predetermined relationship with the feature of the extracted input signal in the first range; a calculation step of calculating a prediction coefficient based on the signal of the second type and the signal of the first type in a second range in the retrieved signal pair; a second extraction step of extracting a signal in the second range from the input signal; and a generation step of generating an output signal as a signal of the second type from the input signal in the second range based on the calculated prediction coefficient.

According to still another aspect of the present invention, a computer-readable recording medium stores a program which includes: a first extraction step of extracting a signal in a first range from an input signal; a retrieval step of comparing a feature of the extracted input signal in the first range with a feature of a signal of a first type in the first range, the signal of the first type and a corresponding signal of a second type being included in a pre-stored signal pair, to retrieve a signal pair including the signal of the first type in the first range having a predetermined relationship with the feature of the extracted input signal in the first range; a calculation step of calculating a prediction coefficient based on the signal of the second type and the signal of the first type in a second range in the retrieved signal pair; a second extraction step of extracting a signal in the second range from the input signal; and a generation step of generating an output signal as a signal of the second type from the input signal in the second range based on the calculated prediction coefficient.

According to still another aspect of the present invention, a computer-executable program includes: a first extraction step of extracting a signal in a first range from an input signal; a retrieval step of comparing a feature of the extracted input signal in the first range with a feature of a signal of a first type in the first range, the signal of the first type and a corresponding signal of a second type being included in a pre-stored signal pair, to retrieve a signal pair including the signal of the first type in the first range having a predetermined relationship with the feature of the extracted input signal in the first range; a calculation step of calculating a prediction coefficient based on the signal of the second type and the signal of the first type in a second range in the retrieved signal pair; a second extraction step of extracting a signal in the second range from the input signal; and a generation step of generating an output signal as a signal of the second type from the input signal in the second range based on the calculated prediction coefficient.

According to another aspect of the present invention, an information processing apparatus includes: a first generation unit for generating a signal of a first type from an input signal of a second type; a first extraction unit for extracting a signal in a first range from the generated signal of the first type; a second extraction unit for extracting a signal in a second range from the generated signal of the first type; a second generation unit for generating a signal pair including the signal of the second type and the signal of the first type corresponding to the signal of the second type, the signal of the first type being in a range defined by the logical OR between the extracted first range and the second range; and a storage unit for storing the signal pair.

The signal of the first type and the signal of the second type may be image signals, and the signal of the second type may have higher resolution than the signal of the first type.

The first generation unit may generate the signal of the first type by decimating the signal of the second type.

According to another aspect of the present invention, an information processing method includes: a first generation step of generating a signal of a first type from an input signal of a second type; a first extraction step of extracting a signal in a first range from the generated signal of the first type; a second extraction step of extracting a signal in a second range from the generated signal of the first type; a second generation step of generating a signal pair including the signal of the second type and the signal of the first type corresponding to the signal of the second type, the signal of the first type being in a range defined by the logical OR between the extracted first range and the second range; and a storage step of storing the generated signal pair.

According to another aspect of the present invention, a computer-readable recording medium stores a program which includes: a first generation step of generating a signal of a first type from an input signal of a second type; a first extraction step of extracting a signal in a first range from the generated signal of the first type; a second extraction step of extracting a signal in a second range from the generated signal of the first type; a second generation step of generating a signal pair including the signal of the second type and the signal of the first type corresponding to the signal of the second type, the signal of the first type being in a range defined by the logical OR between the extracted first range and the second range; and a storage step of storing the generated signal pair.

According to another aspect of the present invention, a computer-executable program includes: a first generation step of generating a signal of a first type from an input signal of a second type; a first extraction step of extracting a signal in a first range from the generated signal of the first type; a second extraction step of extracting a signal in a second range from the generated signal of the first type; a second generation step of generating a signal pair including the signal of the second type and the signal of the first type corresponding to the signal of the second type, the signal of the first type being in a range defined by the logical OR between the extracted first range and the second range; and a storage step of storing the generated signal pair.

According to the present invention, the signal pair including the signal of the first type and the signal of the second type is stored, and based on the stored signal pair the prediction coefficient is calculated. The output signal is generated based on the calculated prediction coefficient.

According to another aspect of the present invention, an information processing apparatus includes: a first calculation unit for calculating a reference value in a first range of an input signal that has a predetermined relationship with a signal of a first type and a signal of a second type, the signals of the first and second types constituting a signal pair; a second calculation unit for calculating an average value of the signal of the first type constituting the signal pair; and a third calculation unit for calculating a signal of a third type that has a predetermined relationship with the signal of the first type based on the reference value and the average value.

The input signal may be a signal of the first type.

The first calculation unit may further calculate a dynamic range in the first range of the input signal. The information processing apparatus may further include: a fourth calculation unit for calculating a reference value and a dynamic range in a second range of the signal of the second type constituting the signal pair and a normalization unit for normalizing the signal of the first type constituting the signal pair based on the dynamic range and the reference value of the signal of the second type constituting the signal pair and the dynamic range of the input signal. The second calculation unit may calculate, as the average value of the signal of the first type, the average value of the normalized signal of the first type constituting the signal pair.

The information processing apparatus may further include: a signal generation unit for generating the signal of the second type from the input signal; a first extraction unit for extracting a signal in the first range from the input signal; and a signal-pair generation unit for generating the signal pair including the signal of the second type and the corresponding signal of the first type as the input signal, where the signal of the second type is generated by the signal generation unit and has a predetermined relationship with the input signal in the first range.

The signal-pair generation unit may include: a second extraction unit for extracting the signal in the second range from a predetermined search range of the signal of the second type generated by the signal generation unit; a calculation unit for calculating a correlation between the input signal in the first range and the signal of the second type in the second range; a selection unit for selecting a signal of the second type in the second range, the signal of the second type having a correlation equal to or higher than a threshold with respect to the input signal in the first range, and the input signal corresponding to the signal of the second type; and a registration unit for registering the input signal which is the selected signal of the first type and the signal of the second type in the second range as the signal pair.

The reference value may be a minimum value.

The signals of the first to third types may be image signals with resolution different from one another.

The signal of the second type may be an image signal with lower resolution than that of the signal of the first type. The signal of the third type may be an image signal with higher resolution than that of the signal of the first type.

The input signal may be of the second type and the signal of the third type may be identical to the signal of the first type.

The information processing apparatus may further include: a storage unit for storing the signal pair; a first extraction unit for extracting a signal in the first range from the input signal as a signal of the second type; and a retrieval unit for comparing a feature of the input signal in the first range with a feature of the signal of the second type in the first range in the stored signal pair to retrieve the signal pair including the signal of the second type in the first range having a predetermined relationship with the feature of the input signal in the first range;

The signal of the first type and the signal of the second type may be image signals, and the signal of the first type may have higher resolution than the signal of the second type.

The retrieval unit may include: a first detection unit for detecting the feature of the input signal in the first range; a second detection unit for detecting the feature of the stored signal of the second type in the first range; and a selection unit for comparing the detected feature of the input signal with the detected feature of the stored signal of the second type in the first range and selecting the signal pair based on a result of the comparison.

The first detection unit and the second detection unit may detect a pixel value, a normalized pixel value, or a dynamic range in the first range as the features. The selection unit may perform the comparison based on a norm value, a sum of absolute differences, or a coefficient value of detected values.

The first detection unit and the second detection unit may detect an adaptive dynamic range coding code in the first range and the selection unit may perform the comparison based on a coincidence of detected codes.

According to another aspect of the present invention, an information processing method includes: a first calculation step of calculating a reference value in a first range of an input signal that has a predetermined relationship with a signal of a first type and a signal of a second type, the signals of the first and second types constituting a signal pair; a second calculation step of calculating an average value of the signal of the first type constituting the signal pair; and a third calculation step of calculating a signal of a third type that has a predetermined relationship with the signal of the first type based on the reference value and the average value.

According to another aspect of the present invention, a computer-readable recording medium stores a program which includes: a first calculation step of calculating a reference value in a first range of an input signal that has a predetermined relationship with a signal of a first type and a signal of a second type, the signals of the first and second types constituting a signal pair; a second calculation step of calculating an average value of the signal of the first type constituting the signal pair; and a third calculation step of calculating a signal of a third type that has a predetermined relationship with the signal of the first type based on the reference value and the average value.

According to another aspect of the present invention, a computer-executable program includes: a first calculation step of calculating a reference value in a first range of an input signal that has a predetermined relationship with a signal of a first type and a signal of a second type, the signals of the first and second types constituting a signal pair; a second calculation step of calculating an average value of the signal of the first type constituting the signal pair; and a third calculation step of calculating a signal of a third type that has a predetermined relationship with the signal of the first type based on the reference value and the average value.

According to the present invention, the average value of the signal of the first type included with the signal of the second type in the signal pair is calculated, and based on the average value and the reference value of the signal of the first type, the signal of the third type is calculated.

According to another aspect of the present invention, an information processing apparatus includes: a signal generation unit for generating a signal of a second type from an input signal of a first type; a signal-pair generation unit for generating a signal pair including the signal of the first type and the signal of the second type; a coefficient generation unit for generating a prediction coefficient based on the signal pair; and a calculation unit for calculating a signal of a third type by applying the prediction coefficient to the signal of the first type.

The signals of the first to third types may be image signals with resolution different from one another.

The signal of the second type may be an image signal with lower resolution than that of the signal of the first type. The signal of the third type may be an image signal with higher resolution than that of the signal of the first type.

The signal-pair generation unit may include: a first extraction unit for extracting a signal in a first range from the signal of the first type; a second extraction unit for extracting a signal in a second range from the signal of the second type; a calculation unit for calculating a correlation between the signal of the first type in the first range and the signal of the second type in the second range; a selection unit for selecting a signal of the second type in the second range, the signal of the second type having a correlation equal to or higher than a threshold with respect to the signal of the first type in the first range, and the signal of the first type corresponding to the signal of the second type; and a registration unit for registering the selected signal of the first type and the signal of the second type in the second range as the signal pair.

The coefficient generation unit may include a normal-equation generation unit for generating a normal equation from the signal pair and a calculation unit for calculating the prediction coefficient by solving the normal equation.

The calculation unit may include a third extraction unit for extracting a signal of the first type in the first range from the signal of the first type and a product-sum calculation unit for generating the signal of the third type by calculating the product-sum of the extracted signal of the first type in the first range and the prediction coefficient.

According to another aspect of the present invention, an information processing method includes: a signal generation step of generating a signal of a second type from an input signal of a first type; a signal-pair generation step of generating a signal pair including the signal of the first type and the signal of the second type; a coefficient generation step of generating a prediction coefficient based on the signal pair; and a calculation step of calculating a signal of a third type by applying the prediction coefficient to the signal of the first type.

According to another aspect of the present invention, a computer-readable recording medium stores a program which includes: a signal generation step of generating a signal of a second type from an input signal of a first type; a signal-pair generation step of generating a signal pair including the signal of the first type and the signal of the second type; a coefficient generation step of generating a prediction coefficient based on the signal pair; and a calculation step of calculating a signal of a third type by applying the prediction coefficient to the signal of the first type.

According to another aspect of the present invention, a computer-executable program includes: a signal generation step of generating a signal of a second type from an input signal of a first type; a signal-pair generation step of generating a signal pair including the signal of the first type and the signal of the second type; a coefficient generation step of generating a prediction coefficient based on the signal pair; and a calculation step of calculating a signal of a third type by applying the prediction coefficient to the signal of the first type.

According to the present invention, the signal of the second type is generated from the signal of the first type, and the signal pair includes the signal of the first type and the signal of the second type. The prediction coefficient is generated based on the signal pair and is then applied to the signal of the first type to calculate the signal of the third type.

BRIEF DESCRIPTION OF THE DRAWINGS

FIG. 8 is a flowchart illustrating pattern matching processing of step S53 in FIG. 7;

FIGS. 9A to 9C illustrate pattern matching;

FIG. 10 a block diagram depicting an example structure of an information processing apparatus for generating training pairs according to the present invention;

FIG. 25 illustrates reference taps;

FIGS. 30A to 30C illustrate normalization processing;

FIGS. 37A to 37C depict an example of reference pairs;

DESCRIPTION OF THE PREFERRED EMBODIMENTS

Figure 1:
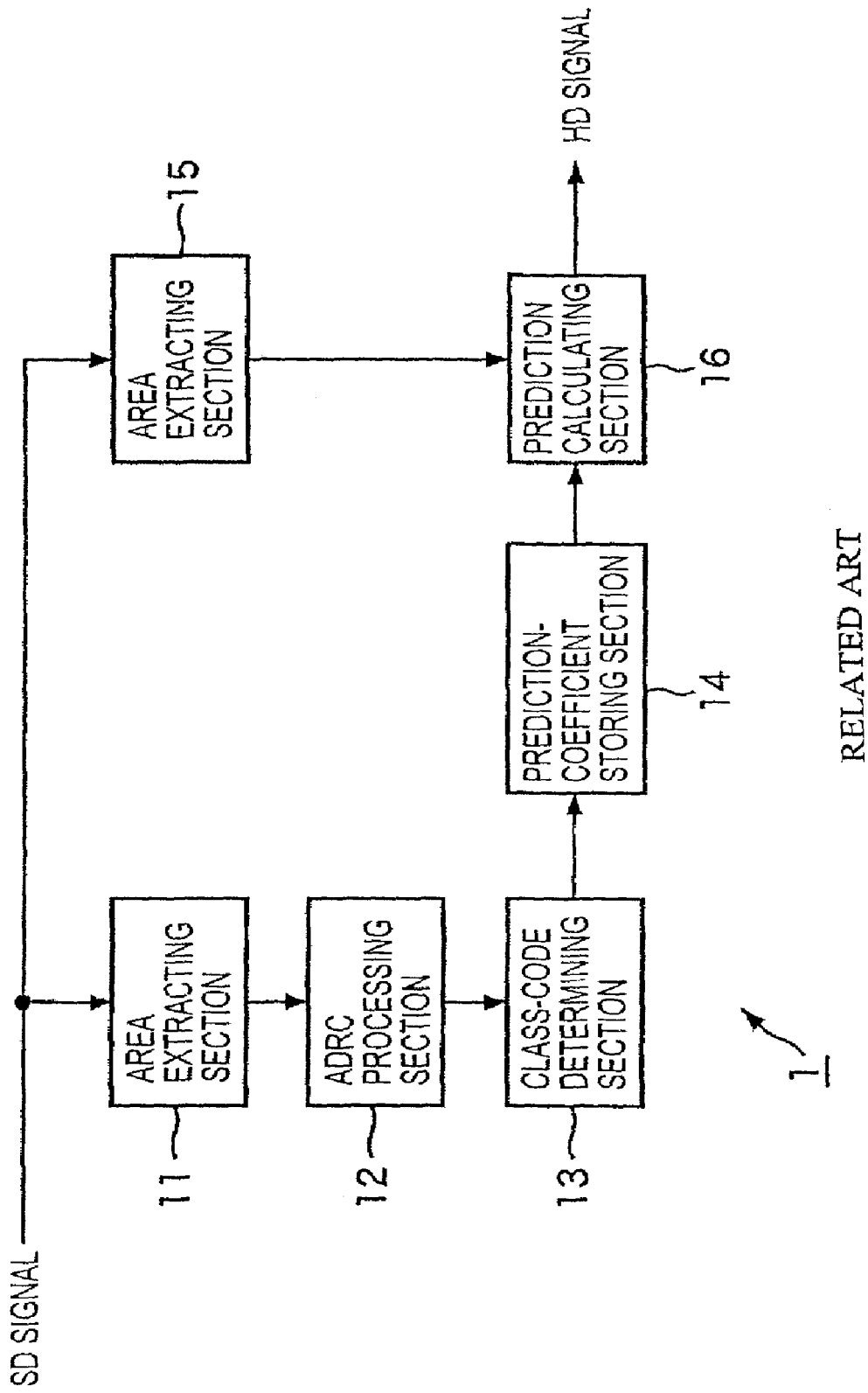
FIG. 1 is a block diagram depicting an example structure of a known information processing apparatus.
Figure 2:
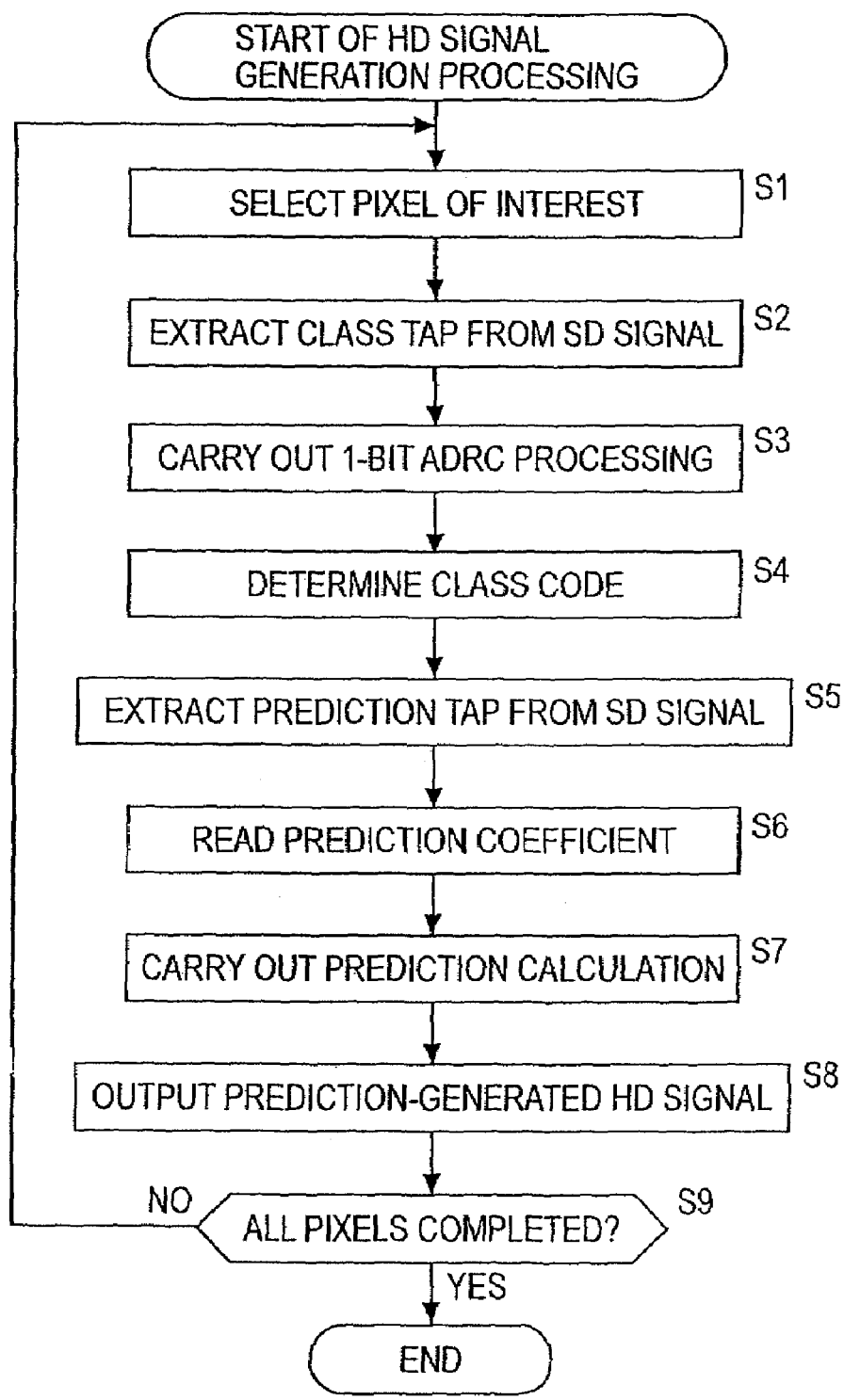
FIG. 2 is a flowchart illustrating HD signal generation processing of the information processing apparatus in FIG. 1.
Figure 3:
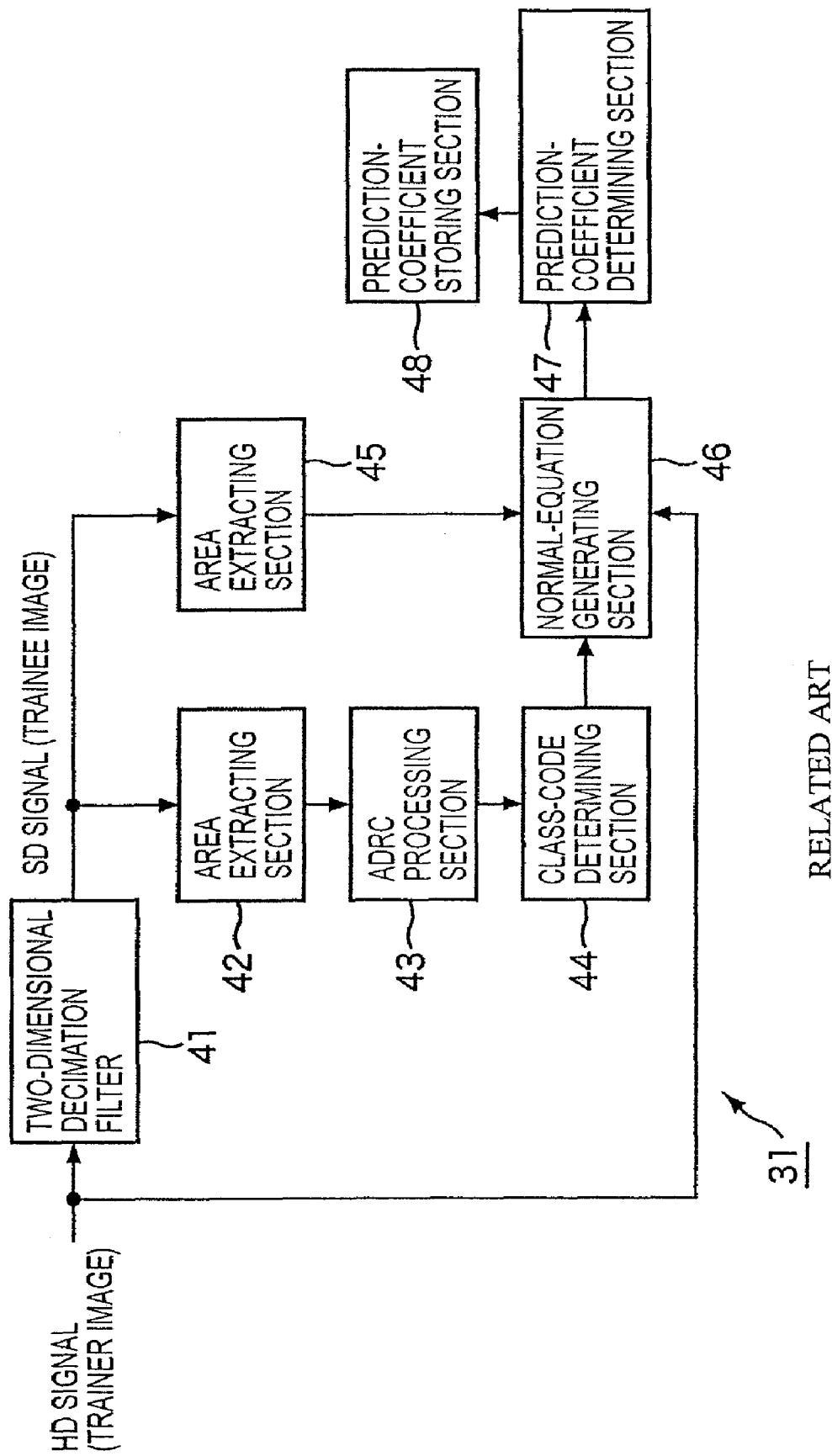
FIG. 3 is a block diagram depicting an example structure of a known information processing apparatus for learning prediction coefficients.
Figure 4:
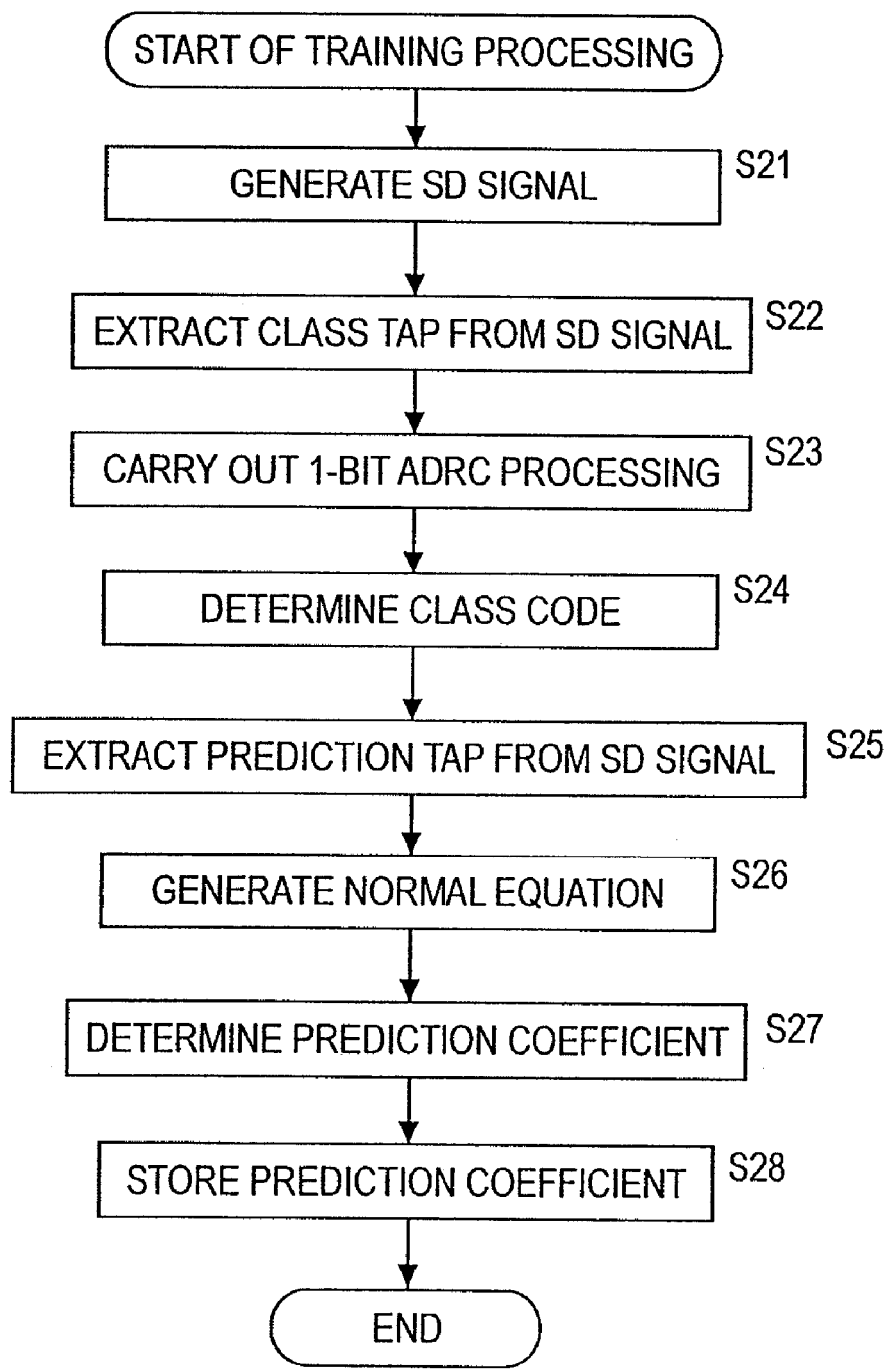
FIG. 4 is a flowchart illustrating training processing of the information processing apparatus in FIG. 3.
Figure 5:
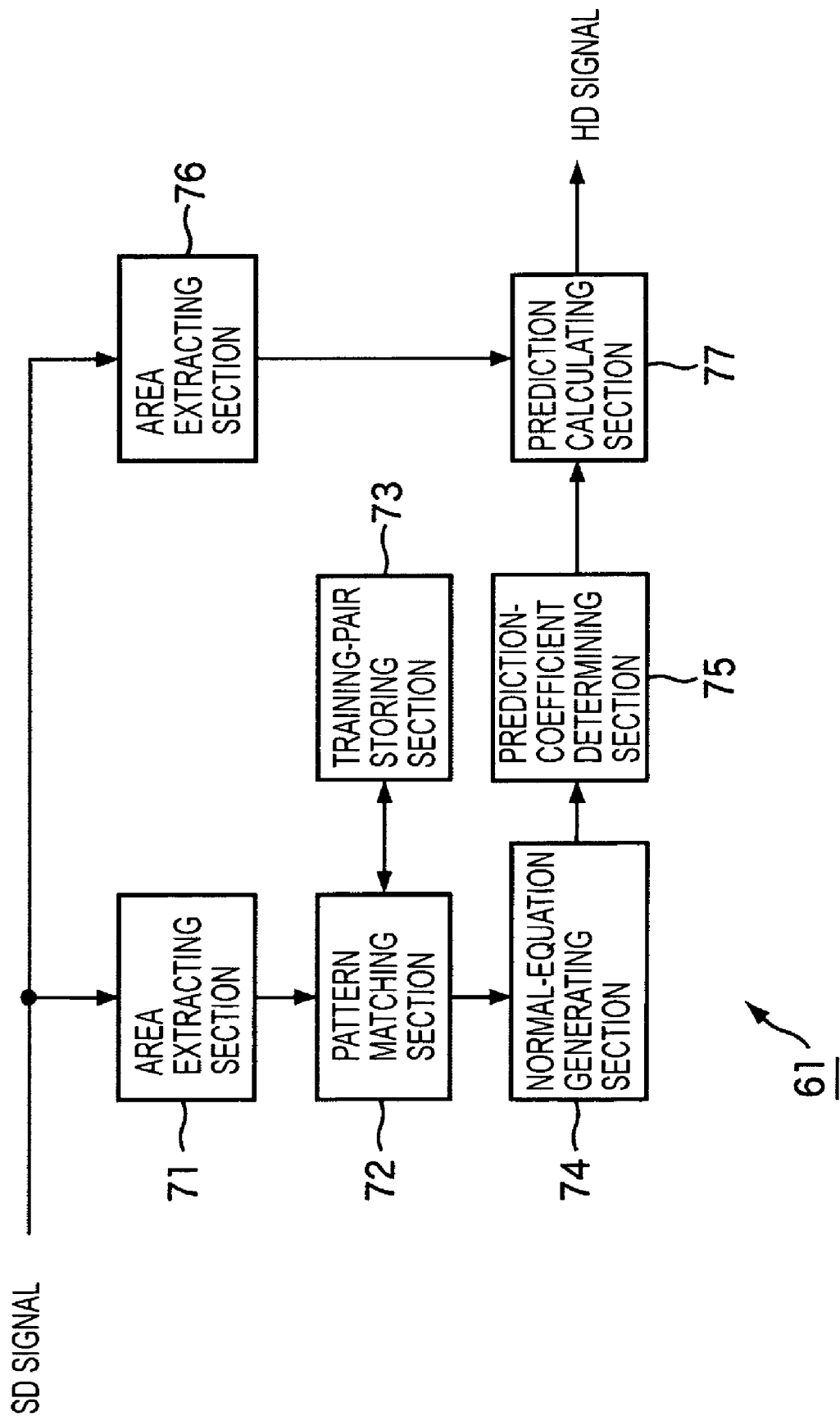
FIG. 5 is a block diagram depicting an example structure of an information processing apparatus to which the present invention is applied.

Embodiments to which the present invention is applied will now be described. FIG. 5 depicts an example structure of an information processing apparatus 61 to which the present invention is applied. This information processing apparatus 61 includes an area extracting section 71, a pattern matching section 72, a training-pair storing section 73, a normal equation generating section 74, a prediction coefficient determining section 75, an area extracting section 76, and a prediction calculating section 77.

Based on an input SD (Standard Definition) signal, the area extracting section 71 extracts as reference taps the pixels in a predetermined area (reference area) with respect to the pixel (pixel of interest) nearest to the target location to be predicted. Through this processing, for example, three pixels are extracted as reference taps. The reference taps extracted by the area extracting section 71 are supplied to the pattern matching section 72.

The training-pair storing section 73 pre-stores training pairs. How to store these training pairs will be described later with reference to FIGS. 10 and 11. These training pairs include a HD (High Definition) signal and a SD signal corresponding thereto. The SD signal includes a reference tap component and a prediction tap component. The pattern matching section 72 searches the training-pair storing section 73 for a training pair having a predetermined relationship with the reference taps, and supplies it to the normal equation generating section 74. The normal equation generating section 74 generates normal equations based on the training pair supplied by the pattern matching section 72, and outputs them to the prediction coefficient determining section 75. The prediction coefficient determining section 75 determines prediction coefficients by solving the normal equations supplied by the normal equation generating section 74 through, for example, the least squares method. The prediction coefficients determined by the prediction coefficient determining section 75 are supplied to the prediction coefficient calculating section 77.

From the input SD signal, the area extracting section 76 extracts as prediction taps the pixels in a prediction area. The relative positional relationships between the pixel of interest and the prediction taps are preset. The prediction area may be the same as or different from the reference area in the area extracting section 71. The area extracting section 76 supplies the extracted prediction taps to the prediction calculating section 77.

The prediction calculating section 77 applies the prediction taps supplied by the area extracting section 76 and the prediction coefficient supplied by the prediction coefficient determining section 75 to a linear simple expression to predictively generate a HD signal.

Figure 6:
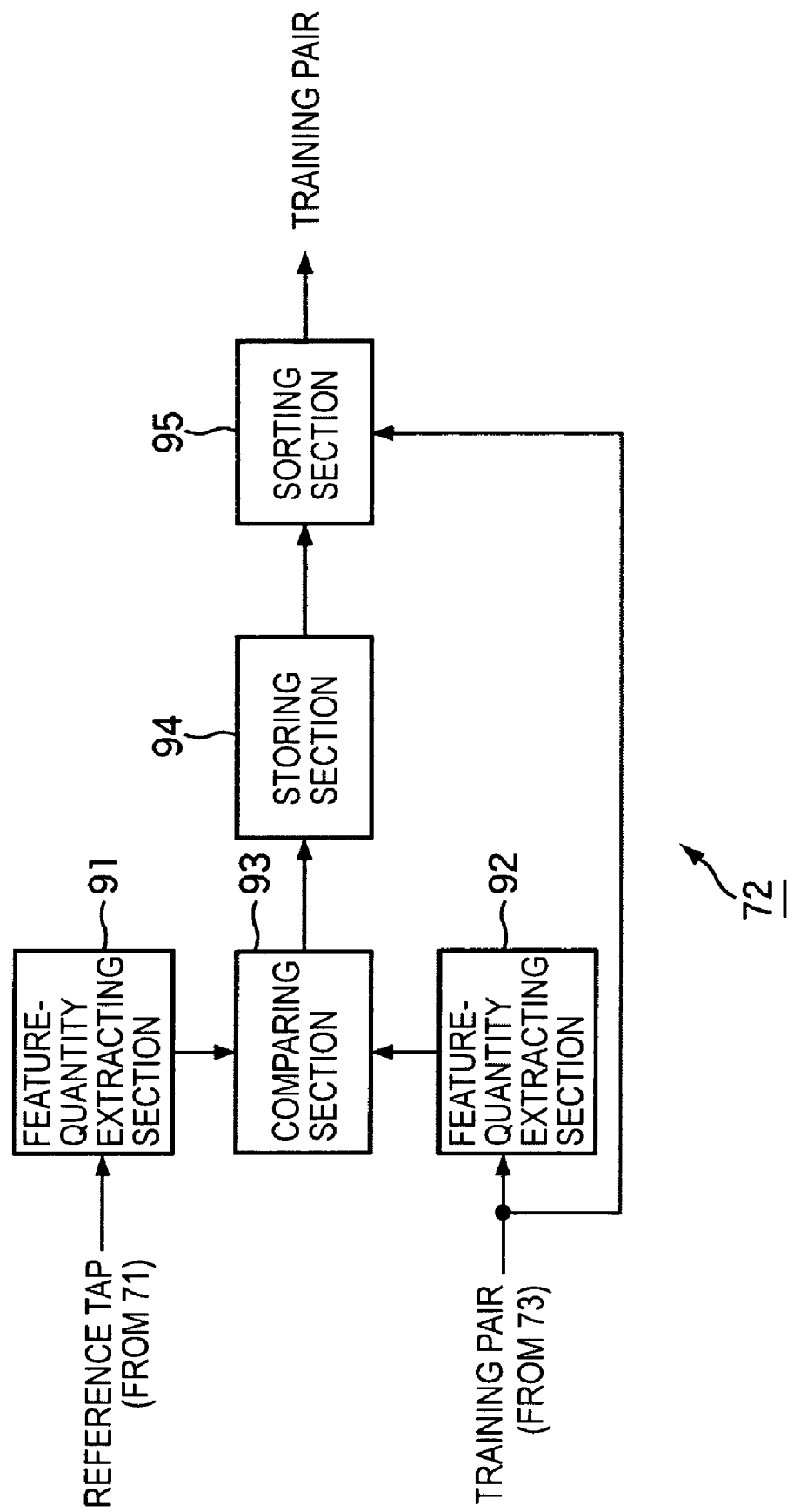
FIG. 6 is a block diagram depicting an example structure of the pattern matching section in FIG. 5.

FIG. 6 depicts an example structure of the pattern matching section 72. This pattern matching section 72 includes a feature-quantity extracting section 91, a feature-quantity extracting section 92, a comparing section 93, a storing section 94, and a sorting section 95.

The feature-quantity extracting section 91 extracts a feature quantity of the reference taps supplied by the area extracting section 71 and supplies it to the comparing section 93. The feature-quantity extracting section 92 extracts a feature quantity of the reference tap component in the training pair supplied by the training-pair storing section 73, and supplies it to the comparing section 93. The comparing section 93 compares the feature quantity supplied by the feature-quantity extracting section 91 with the feature quantity supplied by the feature-quantity extracting section 92 to obtain the correlation between the two feature quantities.

For example, the feature quantities extracted by the feature-quantity extracting section 91 and the feature-quantity extracting section 92 may be pixel values as-is. Alternatively, such feature quantities may be normalized pixel values. A normalized pixel value in reference taps is represented as an intermediate pixel value relative to the maximum and minimum pixel values in the reference taps, where the maximum and minimum pixel values are set to, for example, 1 and 0, respectively. More specifically, the value obtained by subtracting the minimum value from a target pixel value is divided by the difference between the maximum value and the minimum value to obtain the normalized pixel value of the target pixel value.

Alternatively, such feature quantities may be dynamic ranges. The dynamic range is the difference between the maximum value and the minimum value in the reference taps.

The comparing section 93 calculates a norm value, the sum of absolute difference values, or a correlation coefficient value as a comparison value for the pixel value, normalized pixel value, or dynamic range, and carries out comparison based on the comparison value.

A norm value is calculated by the following equation, where (x1, x2, x3) represent the reference taps and (y1, y2, y3) represents the reference tap component included in the training pair.

$$\sqrt{(x_1-y_1)^2+(x_2-y_2)^2+(x_3-y_3)^2} \quad (1)$$

The sum of absolute difference values is represented by Equation (2).

$$\Sigma |x_i - y_i| \quad (2)$$

A correlation coefficient r is represented by Equation (3).

$$r = \frac{\sum (x_i - x_M)(y_i - y_M)}{\sqrt{\sum (x_i - x_M)^2}\sqrt{\sum (y_i - y_M)^2}} \quad (3)$$

where, xM represents the average value of xi and yM represents the average value of yi.

In addition, the feature quantities extracted by the feature-quantity extracting section 91 and the feature-quantity extracting section 92 may be 1-bit ADRC codes. If this is the case, the comparison by the comparing section 93 may be based on the coincidence of 1-bit ADRC codes. A coincidence is defined as the number of bits with equivalent values, where the bit at each location on one part is compared with the bit at the corresponding location on another part.

Say that the 1-bit ADRC code of the reference taps is (001) and the 1-bit ADRC code of the reference tap component in the training pair is also (001). In this case, the values of the bits at all locations in the reference taps are equal to those of the bits at the respective locations in the training pair, and the coincidence is "3". On the other hand, if the 1-bit ADRC code of the reference taps is (001) and the reference tap component in the training pair is (011), only the MSB and LSB have the equivalent values. Thus, the coincidence is "2".

In addition to those described above, other values functioning as determiners of the correlation between the reference taps and the reference tap component in the training pair can be used as a comparison value.

The storing section 94 stores the result of the comparison by the comparing section 93. The sorting section 95 sorts a plurality of values stored in the storing section 94 in this manner, and outputs N comparison results sorted in descending order of correlation. Thereafter, the sorting section 95 reads out N training pairs corresponding to the top N reference tap components from the training-pair storing section 73, and outputs them to the normal equation generating section 74.

Figure 7:
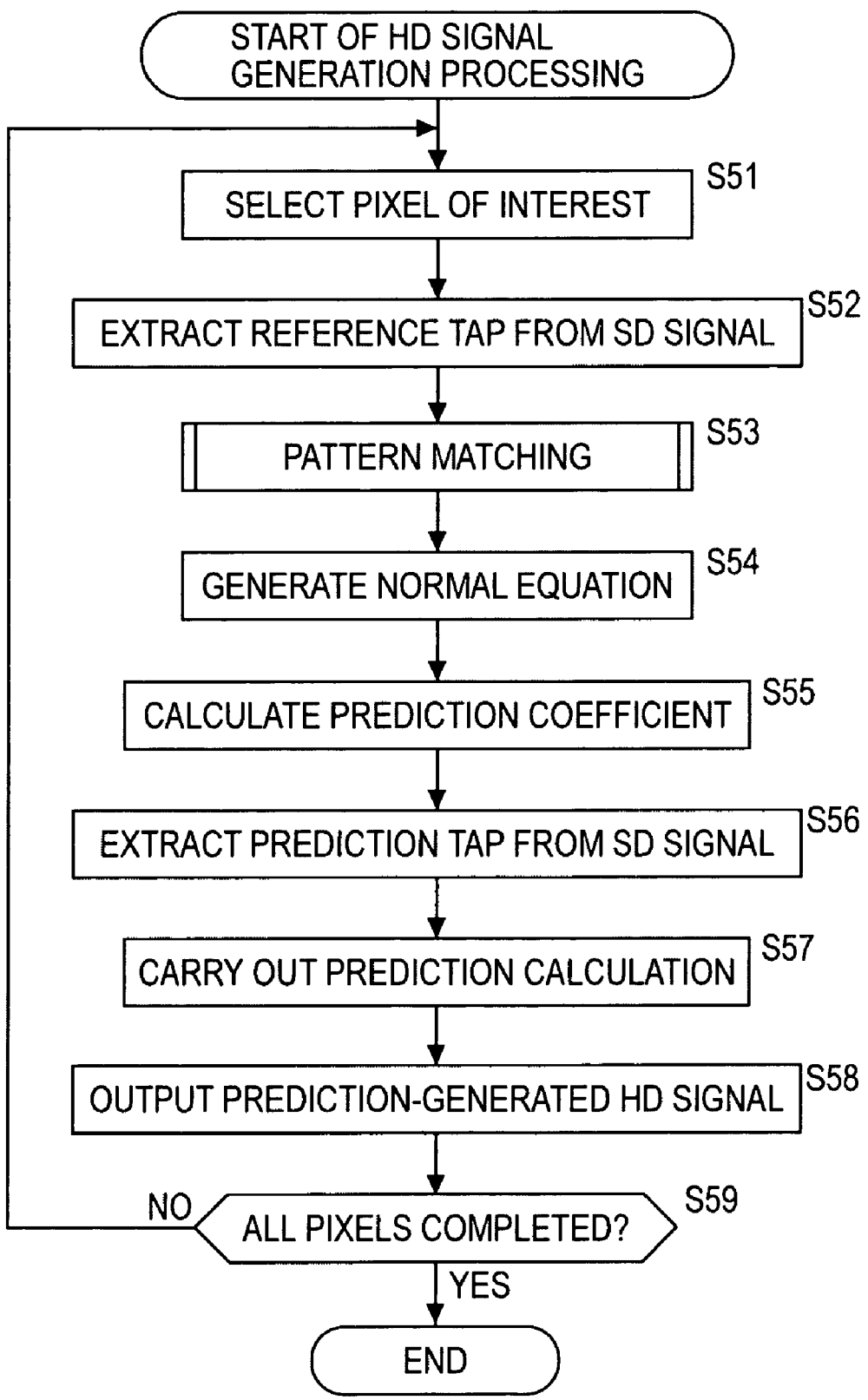
FIG. 7 is a flowchart illustrating HD signal generation processing of the information processing apparatus in FIG. 5.

HD signal generation processing in the information processing apparatus 61 will now be described with reference to the flowchart in FIG. 7. In step S51, the area extracting section 71 and the area extracting section 76 select a pixel of interest from the input SD signal. In step S52, the area extracting section 71 extracts reference taps from the input SD signal. The relative positional relationships of the reference taps with the pixel of interest are predetermined, and the reference taps for the pixel of interest selected in step S51 are extracted in step S52. In the example in FIGS. 9A to 9C, one pixel of interest and its neighboring eight pixels, i.e., a total of nine pixels, are set as reference taps.

In step S53, the pattern matching section 72 performs pattern matching between the training pair stored in the training-pair storing section 73 and the reference taps extracted in the processing of step S52. Details of pattern matching are shown in FIG. 8.

More specifically, in step S71, the feature-quantity extracting section 91 extracts a feature quantity of the reference taps. If it is presumed that the pixel values are extracted as the feature quantity, the feature-quantity extracting section 91 extracts the pixel values as the feature quantity of the reference taps supplied by the area extracting section 71. The extracted pixel values are supplied to the comparing section 93.

In step S72, the feature-quantity extracting section 92 extracts a feature quantity of the reference tap component in the training pair.

More specifically, the feature-quantity extracting section 92 reads out one training pair stored in the training-pair storing section 73, extracts the pixel values of the reference tap component included in the training pair, and outputs them to the comparing section 93. In step S73, the comparing section 93 calculates the comparison value of the supplied feature quantities for comparison. More specifically, the comparing section 93 calculates as a comparison value, for example, the sum of the absolute difference values between the pixel values in the reference taps supplied by the feature-quantity extracting section 91 and the pixel values in the reference tap component in the training pair supplied by the feature-quantity extracting section 92.

As shown in FIGS. 9A to 9C, if the reference taps include, for example, a total of nine (3×3) pixel values including one pixel of interest and its neighboring eight pixels (one each above, below, left, right, upper left, upper right, lower left, and lower right), a SD signal component of the training pair also has a reference tap component composed of nine (3×3) pixel values. In the example of FIG. 9A, the pixel values of reference taps RT are (100, 148, 100, 152, 200, 152, 100, 148, 100), where the pixel of interest is the pixel with the median value 200. If the feature-quantity extracting section 92 extracts a first SD signal "SD1-1", the pixel values are (200, 200, 200, 200, 200, 200, 200, 200, 200). The comparing section 93 calculates the sum of the absolute difference values as a comparison value based on the following equation.

$$600 = |100-200|+|148-200|+|100-200|+|152-200|+ \\ |200-200|+|152-200|+|100-200|+|148-200|+ \\ |100-200| \quad (4)$$

In step S74, the storing section 94 stores the comparison result. More specifically, the storing section 94 stores the sum of the absolute difference values "600" calculated in the manner described above as the comparison value.

The feature-quantity extracting section 92 then selects, for example, SD1-2 as a second SD signal and outputs it to the comparing section 93. The comparing section 93 obtains the sum of the absolute difference values between the pixel values in the reference taps RT and the pixel values in the reference tap component of the SD signal SD1-2 as described above, and supplies the value to the storing section 94, which then stores the value.

The processing described above is repeated to calculate the same number of sums of the absolute difference values as the number of training pairs stored in the training-pair storing section 73. In step S75, the sorting section 95 sorts the comparison results. More specifically, the sorting section 95 sorts the sums of the absolute difference values, i.e., the obtained comparison values in ascending order, and selects the top 100 values. The sorting section 95 then reads out the training pairs having the 100 reference tap components from the training-pair storing section 73, and supplies them to the normal equation generating section 74.

In this manner, as shown in, for example, FIG. 9C, 100 training pairs composed of SD signals and HD signals are supplied to the normal equation generating section 74. In the example of FIG. 9C, 100 training pairs, including the training pair composed of a HD signal HD-u and a SD signal SD-u, the training pair composed of a HD signal HD-j and a SD signal SD-j, and the training pair composed of a HD signal HD-k and a SD signal SD-k, are selected and supplied to the normal equation generating section 74.

In the example of FIGS. 9A to 9C, the reference taps are the same as the prediction taps, and hence all of the training pairs are supplied to the normal equation generating section 74; however, the HD signals and the corresponding prediction tap components only may be supplied.

Referring back to FIG. 7, in step S54 the normal equation generating section 74 generates normal equations based on the 100 training pairs supplied by the pattern matching section 72 as described above. Then in step S55, the prediction coefficient determining section 75 calculates prediction coefficients by solving the normal equations generated in the processing of step S54 by, for example, the least squares method.

If the HD signal component of a training pair is "Y", the SD signal component as a prediction tap component is "X", and the prediction coefficients are "W", the observation equation of a linear combination model is represented by Equation (5) below.

$$XW=Y \tag{5}$$

X, W, and Y in Equation (5) are represented as follows.

$$X = \begin{pmatrix} x_{11} & x_{12} & \cdots & x_{1n} \\ x_{21} & x_{22} & \cdots & x_{2n} \\ \cdots & \cdots & \cdots \\ x_{m1} & x_{m2} & \cdots & x_{mn} \end{pmatrix} \tag{6}$$

$$W = \begin{pmatrix} w_1 \\ w_2 \\ \vdots \\ w_n \end{pmatrix} \tag{7}$$

$$Y = \begin{pmatrix} y_1 \\ y_2 \\ \vdots \\ y_m \end{pmatrix} \tag{8}$$

Taking into consideration the fact that the HD signal component "Y" includes errors, Equation (5) is converted into the following equation.

$$XW=Y+E \tag{9}$$

where, E is represented by the following equation.

$$E = \begin{pmatrix} e_1 \\ e_2 \\ \vdots \\ e_m \end{pmatrix} \tag{10}$$

To find the most probable value of each of the coefficients wj (j=1, 2, ... n) from Equation (9), the coefficients w1, w2, ..., wn that satisfy n conditions, as shown in Equation (11), giving the minimum squared-sum of the elements in the residual E are obtained.

$$e_1 \frac{\partial e_1}{\partial w_i} + e_2 \frac{\partial e_2}{\partial w_i} + \ldots + e_m \frac{\partial e_m}{\partial w_i} = 0 \tag{11}$$

$$(i = 0, 1, 2, \ldots, n)$$

Equation (12) shown below is obtained from Equations (9) and (10), and Equation (13) shown below is obtained from Equation (11) with conditions j=1, 2, ..., n.

$$\frac{\partial e_i}{\partial w_1} = x_{i_1}, \frac{\partial e_i}{\partial w_2} = x_{i_2}, \ldots, \frac{\partial e_i}{\partial w_n} = x_{i_n} \tag{12}$$

$$(i = 1, 2, \ldots, m)$$

$$\sum_{i=1}^{m} e_i x_{i_1} = 0, \sum_{i=1}^{m} e_i x_{i_2} = 0, \ldots, \sum_{i=1}^{m} e_i x_{i_n} = 0 \tag{13}$$

Normal equations represented by Equation (14) are obtained from Equations (9) and (13).

$$\begin{cases} \left(\sum_{i=1}^{m} x_{i_1} x_{i_1}\right) w_1 + \left(\sum_{i=1}^{m} x_{i_1} x_{i_2}\right) w_2 + \ldots + \left(\sum_{i=1}^{m} x_{i_1} x_{i_n}\right) w_n = \left(\sum_{i=1}^{m} x_{i_1} y_i\right) \\ \left(\sum_{i=1}^{m} x_{i_2} x_{i_1}\right) w_1 + \left(\sum_{i=1}^{m} x_{i_2} x_{i_2}\right) w_2 + \ldots + \left(\sum_{i=1}^{m} x_{i_2} x_{i_n}\right) w_n = \left(\sum_{i=1}^{m} x_{i_2} y_i\right) \\ \cdots \\ \left(\sum_{i=1}^{m} x_{i_n} x_{i_1}\right) w_1 + \left(\sum_{i=1}^{m} x_{i_n} x_{i_2}\right) w_2 + \ldots + \left(\sum_{i=1}^{m} x_{i_n} x_{i_n}\right) w_n = \left(\sum_{i=1}^{m} x_{i_n} y_i\right) \end{cases} \tag{14}$$

The number of these normal equations (simultaneous equations) is n, that is, the same as the number of prediction coefficients wj functioning as unknowns. Therefore, the prediction coefficients wj as the most probable values can be obtained by solving the normal equations. More accurately, the normal equations can be solved if the matrices of the coefficient terms of wj in Equation (14) are nonsingular. In practice, the simultaneous equations can be solved by a method such as the Gauss-Jordan's elimination (sweeping-out method).

For the known classification adaptive processing, the same number of prediction coefficients "w1 to wn" as the number of classes are provided. In contrast, according to the present invention, the concept of class does not exist, and a prediction coefficient wj is generated as required, and hence a sufficiently large number of (virtually infinite) coefficients can be obtained. Consequently, more accurate, high-resolution HD signals can be generated.

After the prediction coefficients have been obtained as described above, in step S56 the area extracting section 76 extracts prediction taps from the input SD signal. The relative positional relationships of the prediction taps with the pixel of interest selected in the processing of step S51 are also preset. These prediction taps can be the same as the reference taps extracted in the area extracting section 71. In many cases, more prediction taps are extracted than reference taps.

In step S57, the prediction calculating section 77 carries out predictive calculation based on the following equation.

$$y = w1 x1 + w2 x2 + \ldots + wnxn \tag{15}$$

xi in the above-described Equation (15) is the prediction taps supplied by the area extracting section 76, wi is the prediction coefficients supplied by the prediction coefficient determining section 75, and y is a generated HD signal.

In step S58, the prediction calculating section 77 outputs the HD signal that has been predicted and generated as described above.

In step S59, the area extracting section 71 and the area extracting section 76 determine whether the processing of all pixels has been completed. If there is a pixel that has not been processed, the flow returns to step S51 to repeat the same processing. If all pixels have been processed, the HD-signal generation processing ends.

As described above, the information processing apparatus 61 requires training pairs. The generation of training pairs will now be described.

FIG. 10 depicts an example structure of an information processing apparatus 121 for generating training pairs. The information processing apparatus 121 includes a two-dimensional decimation filter 131, an area extracting section 132, an area extracting section 133, a training-pair generating section 134, and a training-pair storing section 135. The two-dimensional decimation filter 131 generates a SD signal as a trainee image by decimating every other pixel of a HD signal as a trainer image horizontally and vertically. The area extracting section 132 extracts reference taps from the SD signal supplied by the two-dimensional decimation filter 131. The reference taps extracted by the area extracting section 132 are the same as the reference taps extracted by the area extracting section 71 in FIG. 5.

The area extracting section 133 extracts prediction taps from the SD signal supplied by the two-dimensional decimation filter 131. The prediction taps extracted by the area extracting section 133 are also the same as the prediction taps extracted by the area extracting section 76 in FIG. 5.

The training-pair generating section 134 receives the HD signal as a trainer image as-is, as well as the reference taps supplied by the area extracting section 132 and the prediction taps extracted by the area extracting section 133. The training-pair generating section 134 generates a SD signal to be included in a training pair by calculating the logical OR between the reference taps supplied by the area extracting section 132 and the prediction taps supplied by the area extracting section 133. If, for example, the number of reference taps is 3 and the number of prediction taps is 9, where the taps are different from one another, then 12 (=3+9) taps are generated for the SD signal to be included in the training pair. If two of the 12 taps are the same, 10 taps are used for the SD signal to be included in the training pair. If all reference taps are included in the prediction taps, the number of taps to be included in the training pair is 9.

The common taps are extracted by one of the area extracting section 132 and the area extracting section 133, and the other extracts the remaining taps. If all reference taps are included in the prediction taps, the physical area extracting section 132 can be omitted. If this is the case, the area extracting section 133 includes two portions: one for logically extracting reference taps and the other for extracting prediction taps. In this sense, the area extracting section 132 and the area extracting section 133 exist as logical entities, even if the physical area extracting section 132 is omitted.

The training-pair generating section 134 generates a training pair composed of the SD signal (generated by calculating logical OR between the reference taps and prediction taps) and the input HD signal, supplies the training pair to the training-pair generating section 135, which then stores it.

Figure 11:
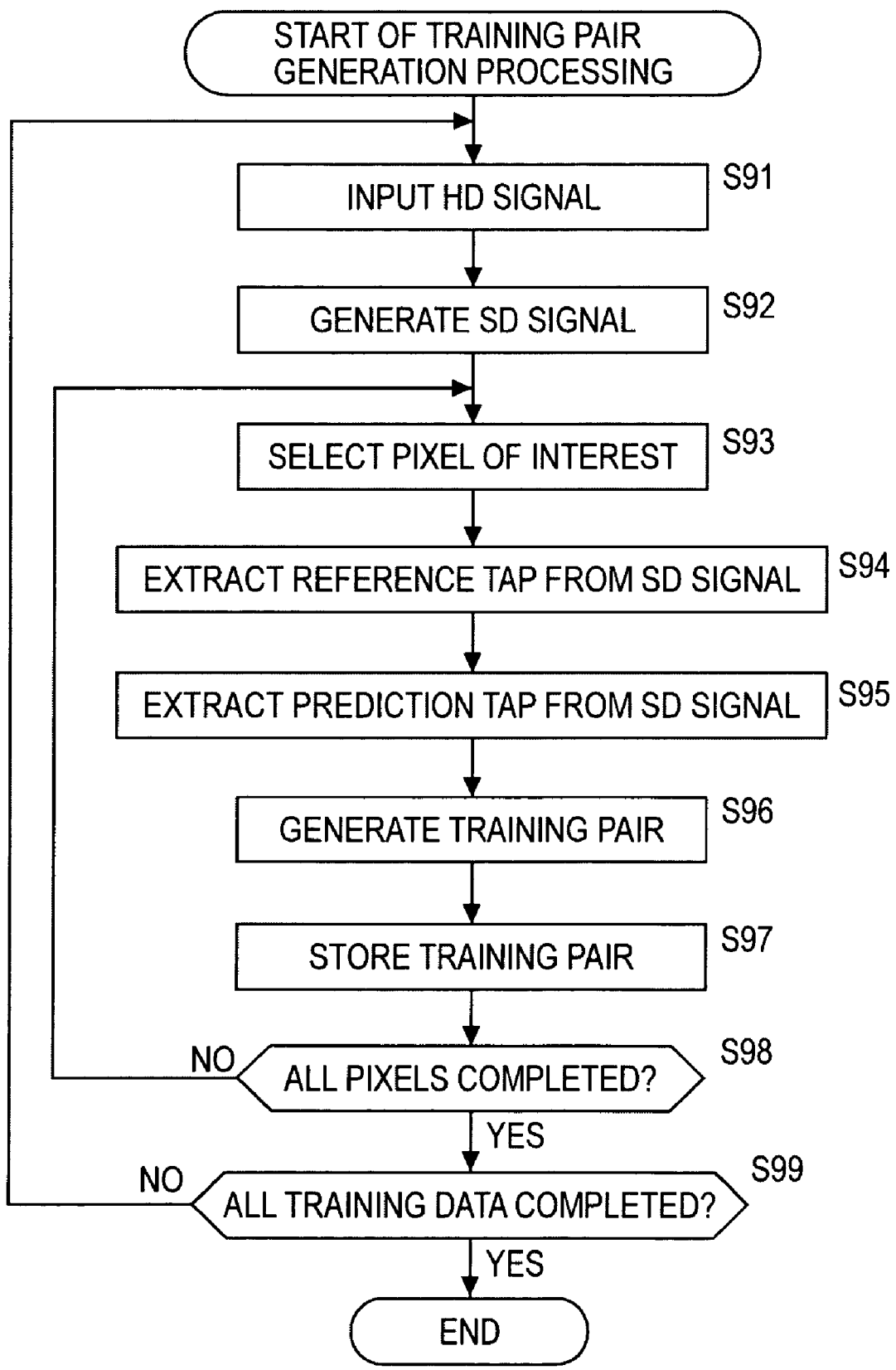
FIG. 11 is a flowchart illustrating training pair generation processing of the information processing apparatus in FIG. 10.

Training pair generation processing in the information processing apparatus 121 will now be described with reference to the flowchart in FIG. 11.

In step S91, the two-dimensional decimation filter 131 inputs a HD signal as a trainer image. In step S92, the two-dimensional decimation filter 131 generates a SD signal from the input HD signal. This processing can be carried out by decimating, for example, every other pixel of the input HD signal horizontally and vertically. In step S93, the area extracting section 132 and the area extracting section 133 select a pixel of interest of the input SD signal. In step S94, the area extracting section 132 extracts reference taps with respect to the pixel of interest selected in the processing of step S93. The relative positional relationships between the pixel of interest and the reference taps are the same as those in the area extracting section 71 of FIG. 5. In step S95, the area extracting section 133 extracts prediction taps from the input SD signal. The relative positional relationships between the pixel of interest selected in step S93 and the prediction taps are the same as those in the area extracting section 76 of FIG. 5.

In step S96, the training-pair generating section 134 generates a training pair. More specifically, a SD signal for the training pair is generated by performing logical OR between the reference taps extracted by the area extracting section 132 and the prediction taps extracted by the area extracting section 133.

Figure 12:
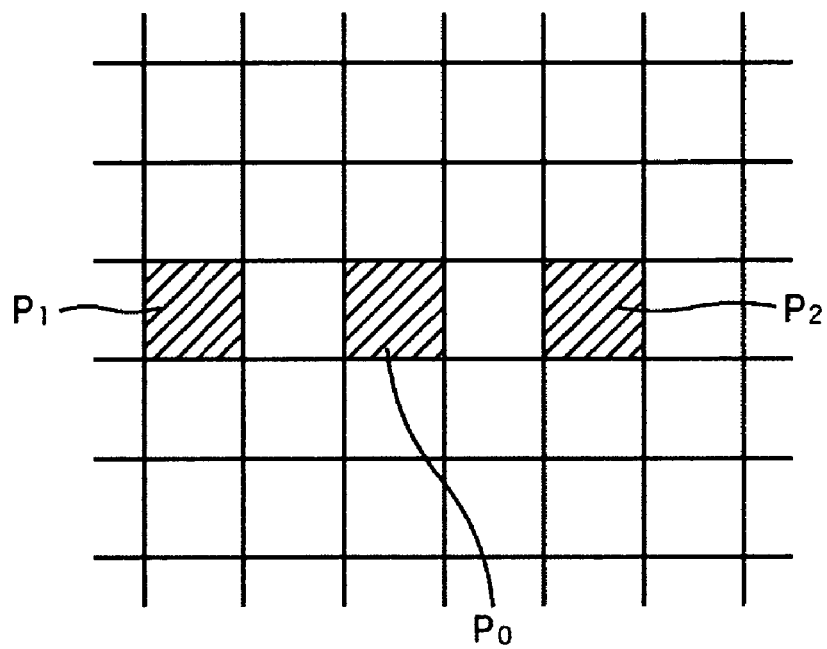
FIG. 12 illustrates reference taps.
Figure 13:
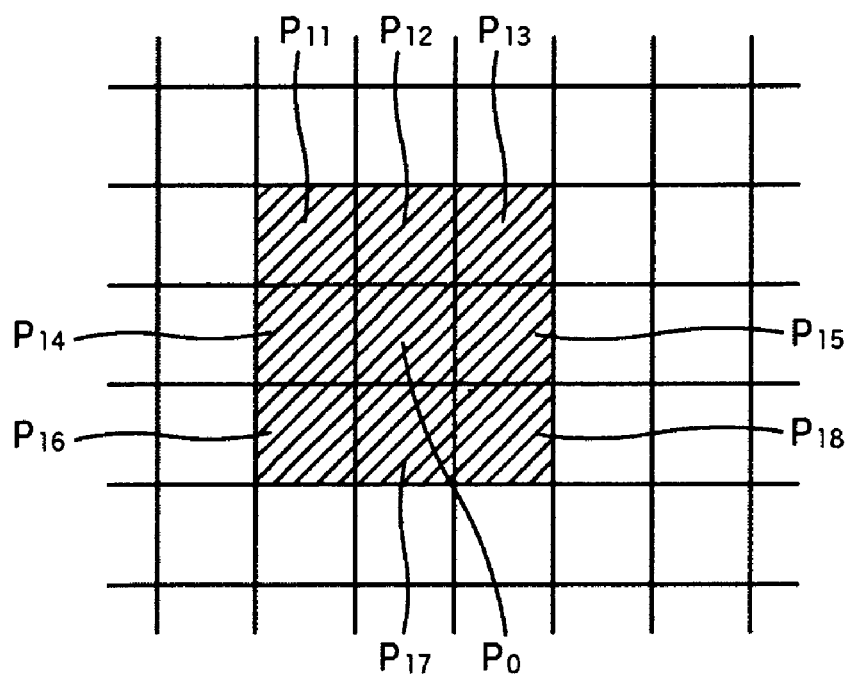
FIG. 13 illustrates prediction taps.

For example, as shown in FIG. 12, the reference taps include three pixels: a pixel of interest P0, a pixel P1 in the left of the pixel of interest P0, and a pixel P2 in the right of the pixel of interest P0, where the pixels P1 and P2 are one pixel away from the pixel of interest P0. As shown in FIG. 13, the prediction taps include nine pixels: a pixel of interest P0 and its neighboring eight pixels P11 to P18 (one each above, below, right, left, lower left, lower right, upper left, and upper right).

Figure 14:
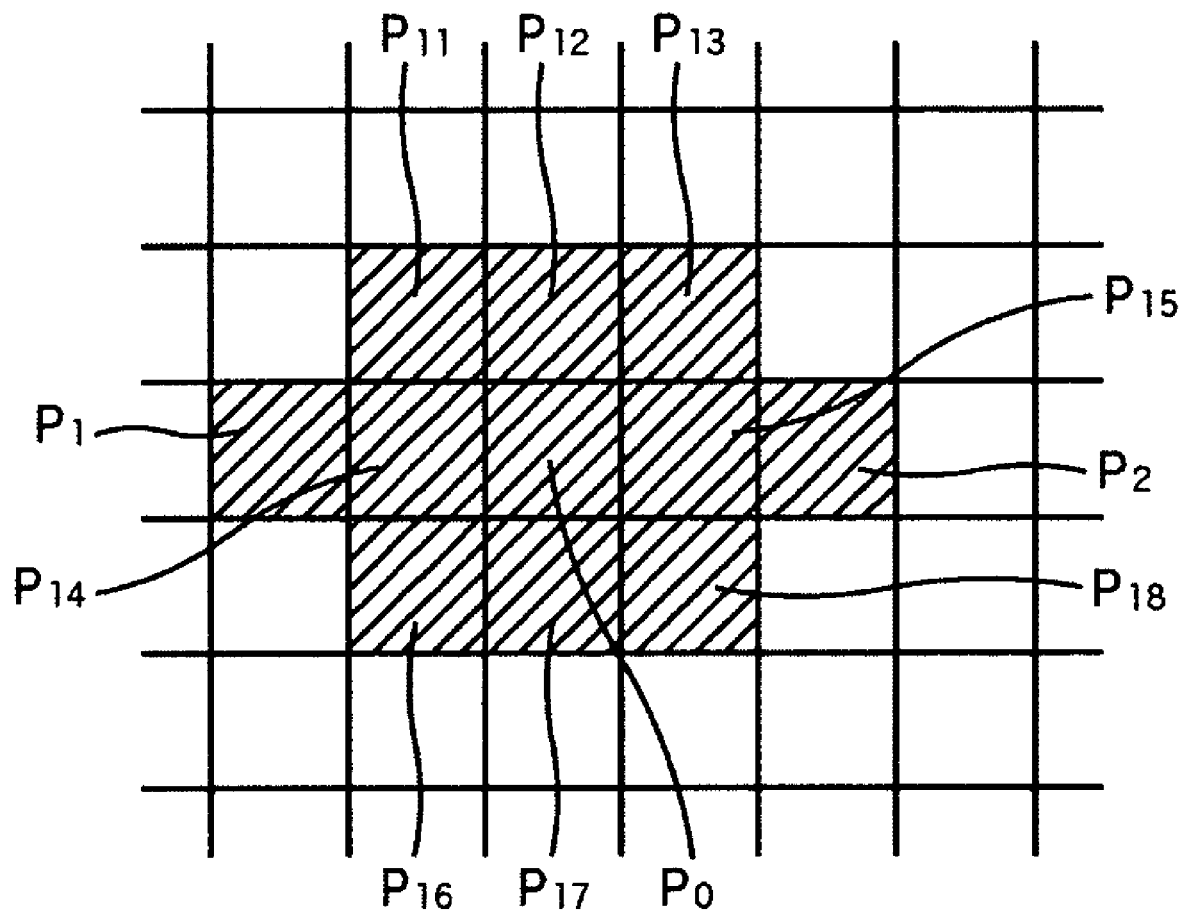
FIG. 14 illustrates a SD signal for training pairs.

In this case, the logical OR between the reference taps and the prediction taps generates, as shown in FIG. 14, a total of 11 pixels including pixels P0, P1, P2, and P11 to P18 for the SD signal for the training pair, because the pixel of interest P0 is shared. For the SD signal for the training pair generated in this manner, the pixels P0, P1, and P2 are the reference tap component, and the pixels P0 and P11 to P18 are the prediction tap component.

Furthermore, the training-pair generating section 134 uses one pixel of the HD signal corresponding to the pixel of interest P0 for the HD signal for the training pair. The training-pair generating section 134 then generates the training pair from the HD signal and the SD signal.

In step S97, the training-pair storing section 135 carries out the processing of storing the training pair. In short, the training pair generated in this manner is supplied to and stored in the training-pair storing section 135.

In step S98, the area extracting section 132 and the area extracting section 133 determine whether the above-described processing of all pixels has been completed. If there is a pixel that has not been processed, the flow returns to step S93, where the following pixel of interest is selected, and the newly selected pixel of interest is subjected to the same processing.

If it is determined in step S98 that all pixels have been processed, the flow proceeds to step S99, where the area extracting section 132 and the area extracting section 133 determine whether all training data has been processed. If there is training data that has not been processed, the flow returns to step S91, where a new HD signal is input, and based on the selected HD signal, the same training pair generation processing is repeated. If it is determined in step S99 that all training data has been processed, the training pair generation processing ends.

In this manner, the training pairs stored in the training-pair storing section 135 are used in the training-pair storing section 73 of FIG. 5.

The above-described sequence of processing can be carried out not only with hardware but also with software. If software is used to carry out the above-described sequence of processing, for example, the information processing apparatus can be realized by, for example, a personal computer as shown in FIG. 15.

Figure 15:
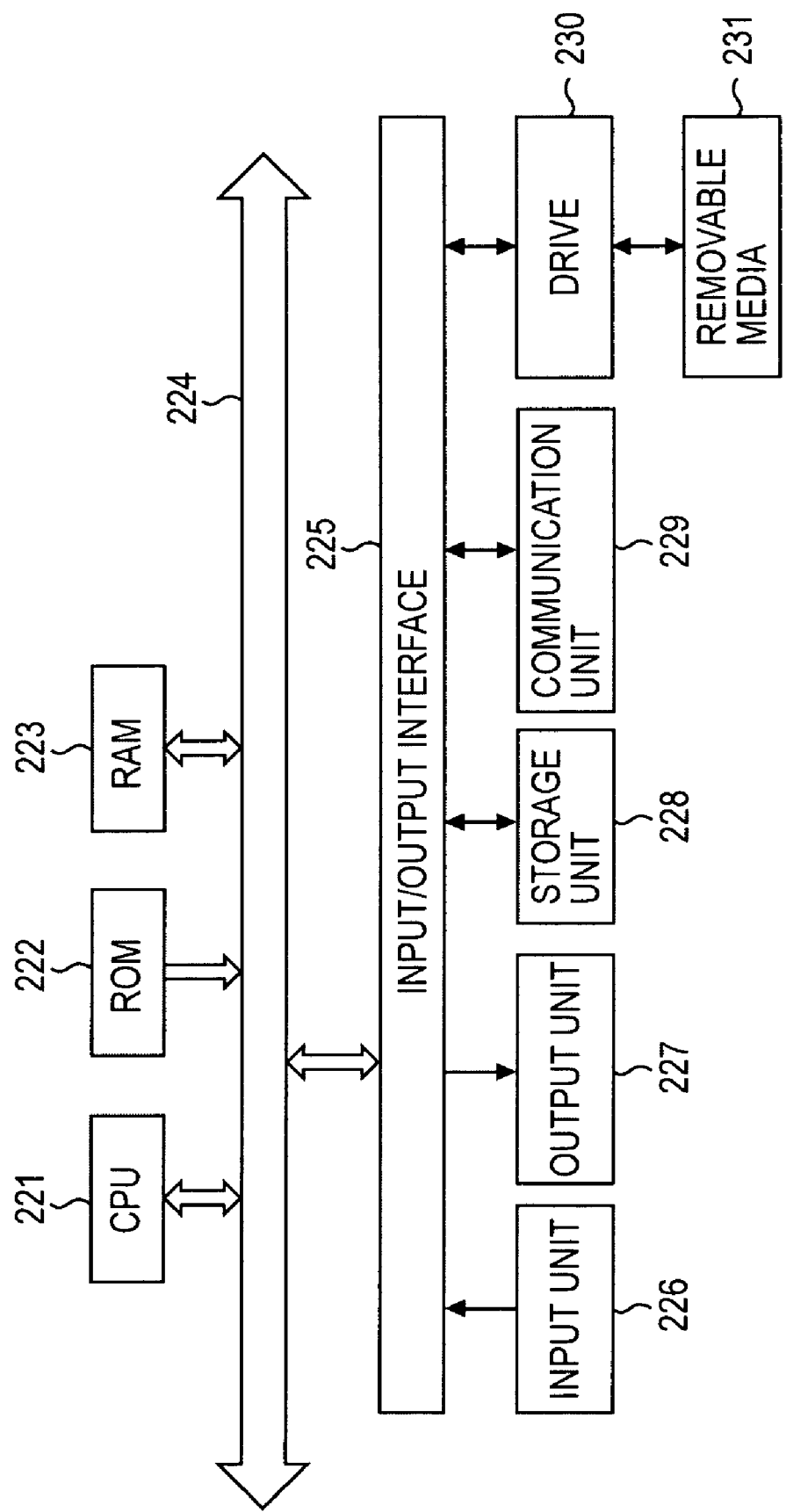
FIG. 15 is a block diagram depicting an example structure of a personal computer.

In FIG. 15, a CPU (Central Processing Unit) 221 carries out various processing according to programs stored in a ROM (Read Only Memory) 222 or programs loaded from a storage unit 228 to a RAM (Random Access Memory) 223. The RAM 223 also stores data required by the CPU 221 to carry out various processing.

The CPU 221, the ROM 222, and the RAM 223 are interconnected via a bus 224. An input/output interface 225 is also connected to the bus 224.

An input unit 226 including, for example, a keyboard and a mouse; an output unit 227 including, for example, a display section, such as a CRT (Cathode Ray Tube) and an LCD (Liquid Crystal display), and a speaker; the storage unit 228 including, for example, a hard disk; and a communicating unit 229 including, for example, a modem are connected to the input/output interface 225. The communicating unit 229 carries out communication via a network including the Internet.

A drive 230 is connected to the input/output interface 225, as required. A magnetic disk, an optical disk, a magneto-optical disk, or a semiconductor memory is mounted to the drive 230 so that computer programs are read from the drive 230 and stored in the storage unit 228.

If the sequence of processing is to be implemented using software, a program constituting the software is installed from a network or recording medium to a computer built into dedicated hardware or to, for example, a general-purpose personal computer that requires programs to be installed to carry out the corresponding functions.

As shown in FIG. 15, the recording medium containing the program may be a removable medium 231, such as a package medium including a magnetic disk (including a flexible disk); an optical disk (including a compact disc-read only memory, i.e., CD-ROM and a digital versatile disk, i.e., DVD); a magneto-optical disk (including a mini-disc, i.e., MD); or a semiconductor memory, if such a program is supplied separately from a user's computer. The recording medium may be the ROM 222 or a hard disk in the storage unit 228 if the program on the recording medium is supplied preinstalled on the user's computer.

In the present invention, the steps of programs recorded on the recording medium may or may not be followed time-sequentially in order of described steps. Furthermore, the steps may be followed in parallel or independently from one another.

In addition, in the present description, the system represents an entire apparatus including a plurality of devices.

Figure 16:
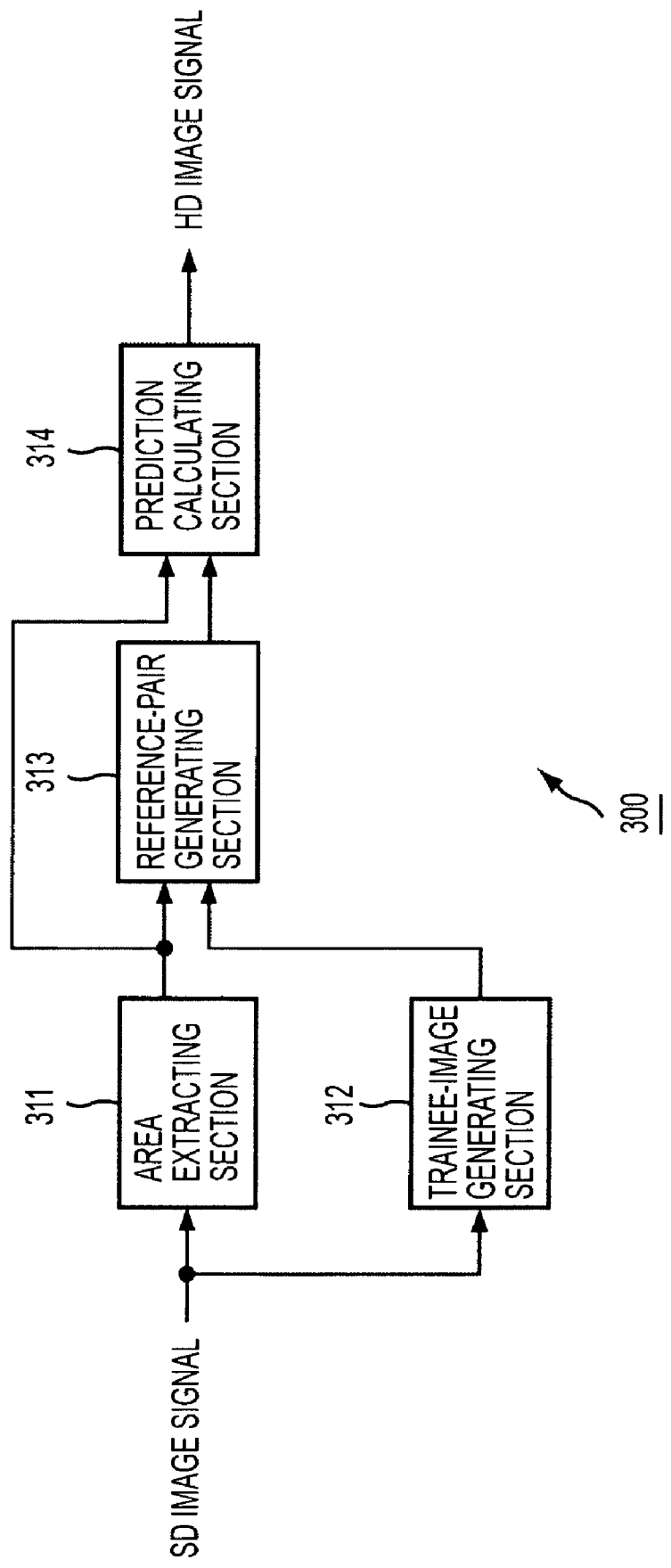
FIG. 16 is a block diagram depicting an example structure of an information processing apparatus to which the present invention is applied.

Another embodiment of the present invention will now described. FIG. 16 depicts an example structure of an information processing apparatus 300 to which the present invention is applied. The information processing apparatus 300 includes an area extracting section 311, a trainee-image generating section 312, a reference-pair generating section 313, and a prediction calculating section 314.

The area extracting section 311 extracts, as prediction taps, the pixels in the preset prediction area from an input SD (Standard Definition) image signal, and supplies them to the reference-pair generating section 313 and the prediction calculating section 314. The trainee-image generating section 312 generates a CIF (Common Intermediate Format) image signal as a trainee image by decimating, for example, every other pixel of the input SD signal horizontally and vertically, and supplies it to the reference-pair generating section 313. The reference-pair generating section 313 generates a signal pair as a reference pair based on the prediction taps supplied by the area extracting section 311 and the CIF image signal as a trainee image signal supplied by the trainee-image generating section 312. The prediction calculating section 314 generates a HD (High Definition) image signal based on the prediction taps supplied by the area extracting section 311 and the reference pair supplied by the reference-pair generating section 313.

Figure 17:
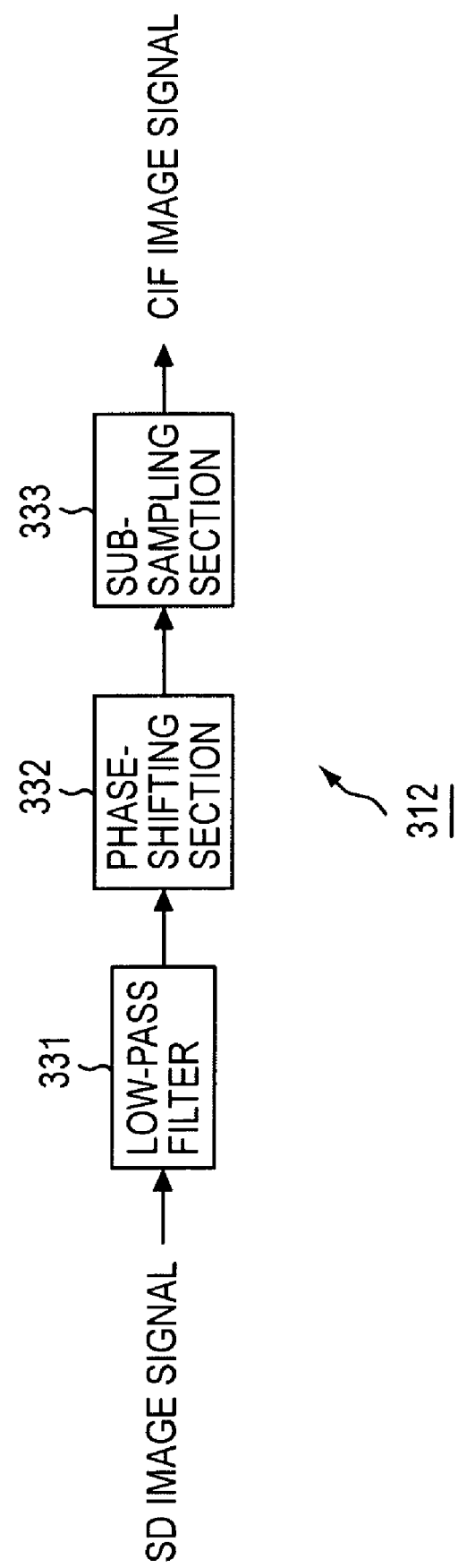
FIG. 17 is a block diagram depicting an example structure of the trainee-image generating section in FIG. 16.

The trainee-image generating section 312 has a structure, for example, as shown in FIG. 17. The trainee-image generating section 312 shown in FIG. 17 includes a low-pass filter 331, a phase-shifting section 332, and a sub-sampling section 333.

The low-pass filter 331 halves the horizontal and vertical bands of the input SD image signal. According to this embodiment in which a SD image signal is converted into a HD image signal with resolution four times that of the SD signal, the low-pass filter 331 is realized as a half-band filter.

The phase-shifting section 332 applies phase-shifting to the band-narrowed SD image signal data supplied by the low-pass filter 331 and then supplies it to the sub-sampling section 333. The sub-sampling section 333 generates a CIF image signal by decimating horizontally and vertically every other pixel of the band-narrowed SD image signal supplied by the phase-shifting section 332.

According to this embodiment, the prediction calculating section 314 generates a HD image signal from a SD image signal. For this SD-to-HD conversion in the prediction calculating section 314, the trainee-image generating section 312 carries out the inverse (HD-to-SD) conversion. If the prediction calculating section 314 carries out ×1 magnification conversion, such as HD-to-HD conversion, the phase-shifting section 332 and the sub-sampling section 333 in the trainee-image generating section 312 can be omitted.

Figure 18:
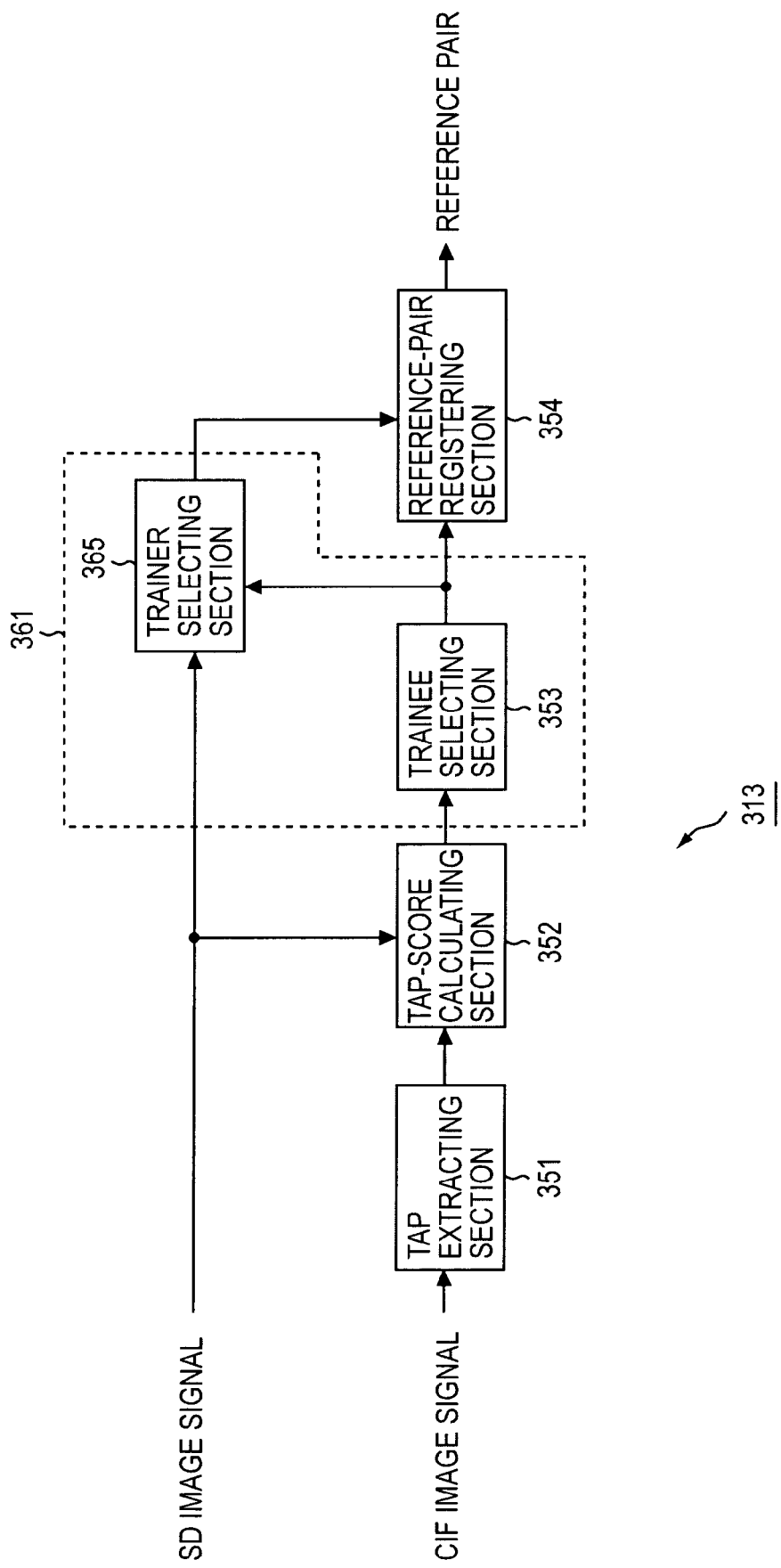
FIG. 18 is a block diagram depicting an example structure of the reference-pair generating section in FIG. 16.

FIG. 18 depicts an example structure of the reference-pair generating section 313. The reference-pair generating section 313 includes a tap extracting section 351, a tap-score calculating section 352, a trainee selecting section 353, a reference-pair registering section 354, and a trainer selecting section 355.

The tap extracting section 351 extracts, from the CIF image signal supplied by the trainee-image generating section 312, reference taps which are pixels existing in an area (reference area) having preset relative positional relationships with the target pixel of interest.

The relative positional relationships of the reference taps in the tap extracting section 351 with the pixel of interest are set so as to be substantially the same as the relative positional relationships of the prediction taps in the area extracting section 311 with the pixel of interest (such that score calculation can be performed).

The tap-score calculating section 352 determines the correlation between the reference taps extracted by the tap extracting section 351 and the prediction taps extracted by the area extracting section 311. More specifically, the correlation coefficient of each tap is calculated.

If the reference taps are, for example, X (X1, X2, X3, X4, X5) and the prediction taps are, for example, Y (Y1, Y2, Y3, Y4, Y5), a correlation coefficient C is calculated based on the following equation in the same manner as in Equation (3).

$$C = \frac{\sum_i (X_i - X_M)(Y_i - Y_M)}{\sqrt{\sum_i (X_i - X_M)^2} \sqrt{\sum_i (Y_i - Y_M)^2}} \quad (15)$$

where, $X_M$ and $Y_M$ represent the average values of $X_i$ and $Y_i$, respectively.

Alternatively, the tap-score calculating section 352 may use the waveform distance between the reference taps and the prediction taps to determine the correlation between the two types of taps. If this is the case, a waveform distance D is calculated based on the following equation.

$$D = \sqrt{\sum_i (X_i - Y_i)^2} \quad (16)$$

If the correlation with the prediction taps is a preset threshold or higher (if the correlation is high), the trainee selecting section 353 selects the reference taps as a trainee image signal, and supplies it to the reference-pair registering section 354 for registration. If the waveform distance D is used as a score and is smaller than a preset threshold, the reference taps are selected by the trainee selecting section 353 and then supplied to and registered in the reference-pair registering section 354.

The trainer selecting section 355, which constitutes a selection section 361 with the trainee selecting section 353, selects as a trainer image signal the SD image signal corresponding to the reference taps selected by the trainee selecting section 353. The reference-pair registering section 354 registers the reference pair, i.e., the signal pair including the CIF image signal as a trainee image signal supplied by the trainee selecting section 353 and the SD image signal as a trainer image signal supplied by the trainer selecting section 355.

Figure 19:
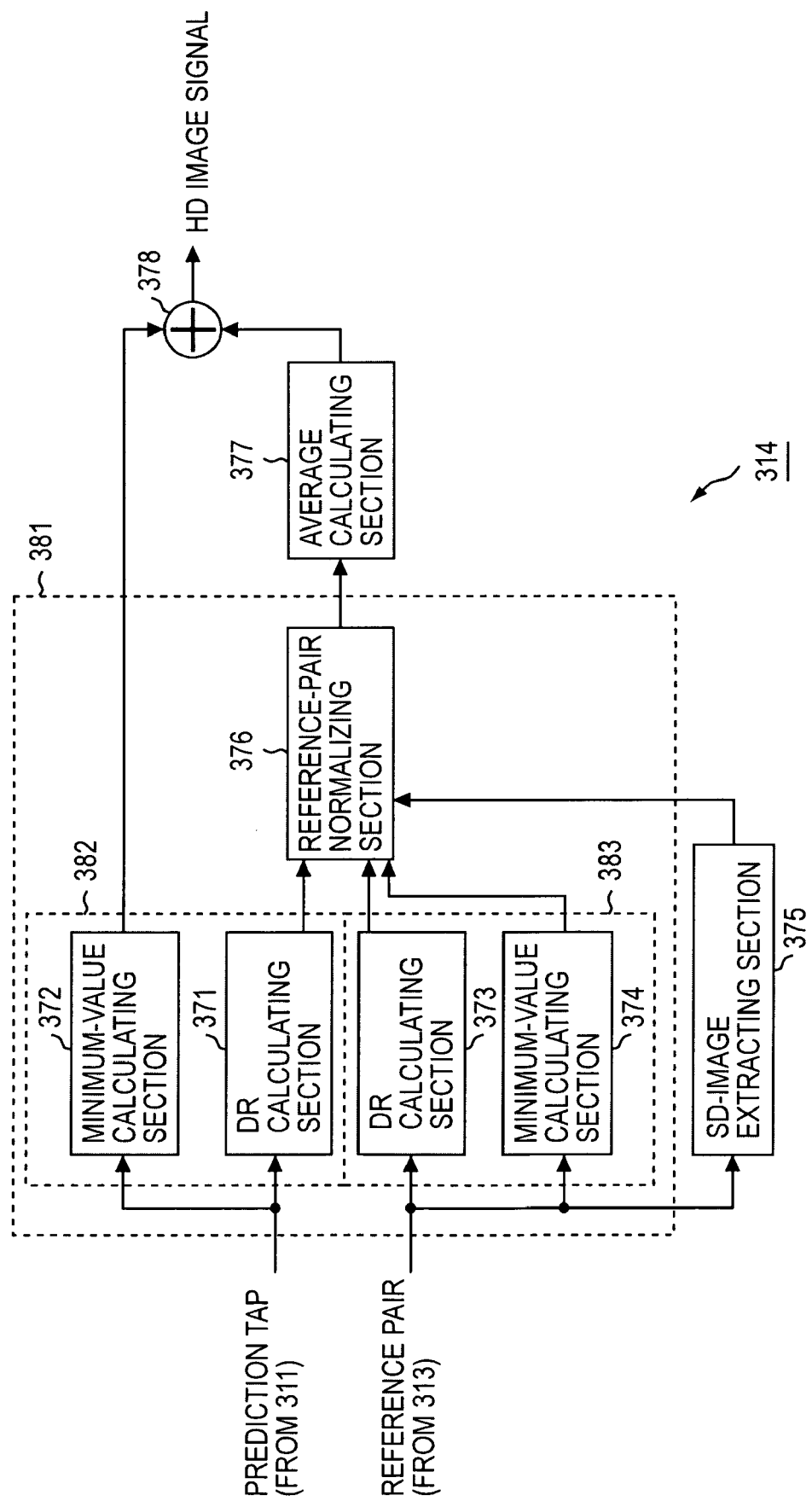
FIG. 19 is a block diagram depicting an example structure of the prediction calculating section in FIG. 16.

FIG. 19 depicts an example structure of the prediction calculating section 314. The prediction calculating section 314 includes a dynamic-range (DR) calculating section 371, a minimum-value calculating section 372, a dynamic-range (DR) calculating section 373, a minimum-value calculating section 374, a SD-image extracting section 375, a reference-pair normalizing section 376, an average calculating section 377, and a synthesizing section 378.

The DR calculating section 371 calculates the dynamic range, that is, the difference between the maximum value and the minimum value, of the prediction taps supplied by the area extracting section 311, and outputs it to the reference-pair normalizing section 376. The minimum-value calculating section 372 calculates the minimum value of the input prediction taps and outputs it to the synthesizing section 378. This DR calculating section 371 and the minimum-value calculating section 372 can be integrated as a prediction-tap calculating section 382.

The DR calculating section 373 calculates the dynamic range, that is, the difference between the maximum value and the minimum value, of the reference pair supplied by the reference-pair generating section 313, and outputs it to the reference-pair normalizing section 376. The minimum-value calculating section 374 calculates the minimum value of the input reference pair, and outputs it to the reference-pair normalizing section 376. This DR calculating section 373 and the minimum-value calculating section 374 can be integrated as a reference-pair calculating section 383. The SD-image extracting section 375 extracts the SD image signal component in the input reference pair (including the SD image signal component and the CIF image signal component) and outputs it to the reference-pair normalizing section 376.

The reference-pair normalizing section 376 normalizes the SD image signal component supplied by the SD-image extracting section 375 based on the minimum value supplied by the minimum-value calculating section 374, the dynamic range supplied by the DR calculating section 373, and the dynamic range supplied by the DR calculating section 371. The average calculating section 377 calculates the average value of the SD image signal normalized by the reference-pair normalizing section 376, and outputs it to the synthesizing section 378. The synthesizing section 378 generates a HD image signal by adding the minimum value supplied by the minimum-value calculating section 372 to the average value supplied by the average calculating section 377.

As described above, in this prediction calculating section 314, the SD image signal component constituting the reference pair extracted by the SD-image extracting section 375 is normalized by the normalizing section 381 including the prediction-tap calculating section 382, the reference-pair calculating section 383, and the reference-pair normalizing section 376. The average value of the normalized SD image signal component is then calculated by the average calculating section 377. If normalization is omitted, the normalizing section 381 can be omitted.

HD-image-signal generation processing by the information processing apparatus 300 will now be described with reference to the flowchart in FIG. 20.

First in step S101, the area extracting section 311 selects a pixel of interest from the input SD image signal. In step S102, the area extracting section 311 extracts prediction taps from the input signal. In other words, pixels existing at preset locations relative to the pixel of interest selected in step S101 are extracted as prediction taps.

Figure 21:
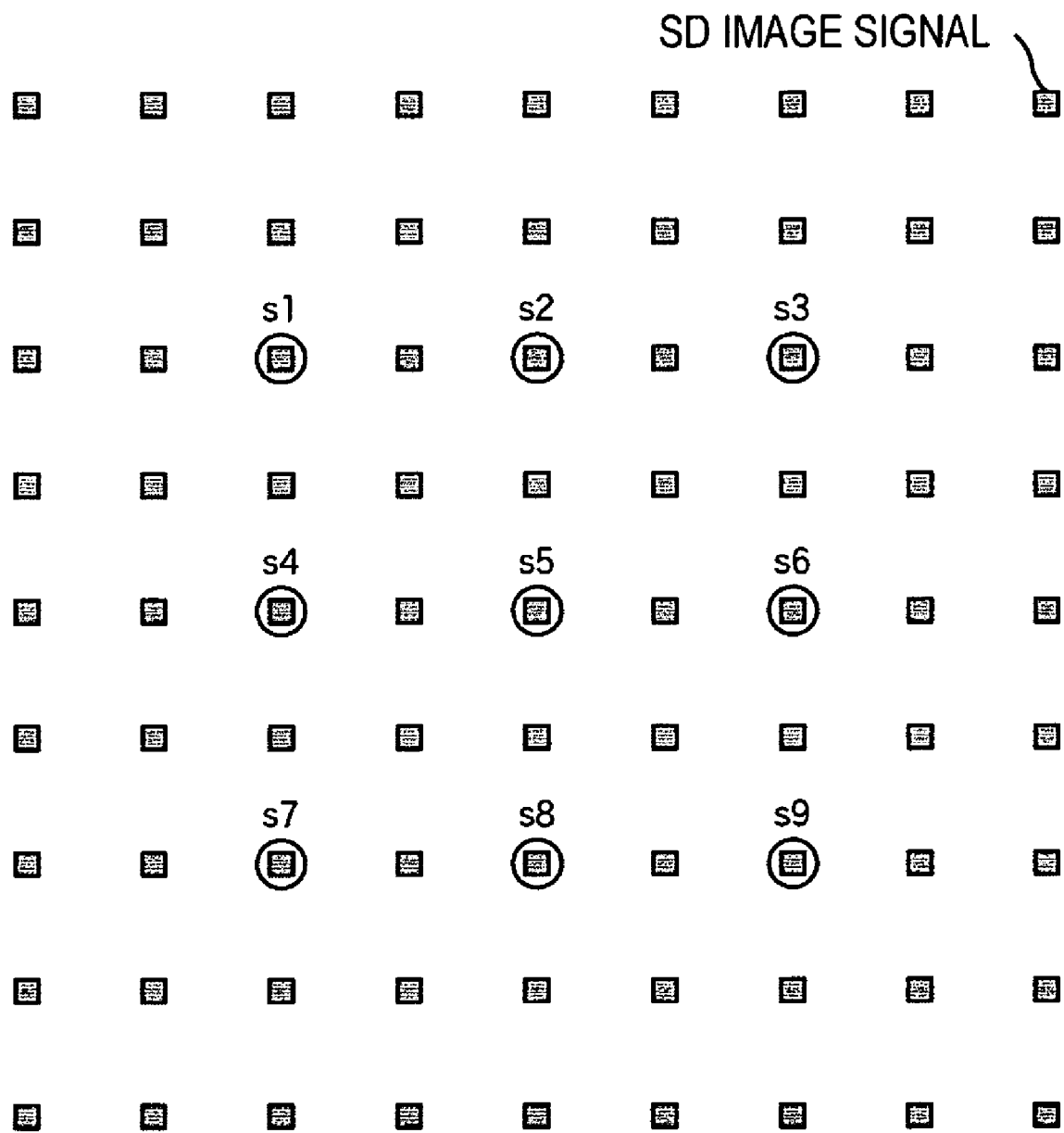
FIG. 21 illustrates prediction taps.

FIG. 21 illustrates an example of such prediction taps. In the example shown in FIG. 21, nine pixel data items s1 to s9 of the SD image signal are set as prediction taps. Also in the example shown in FIG. 21, the prediction taps include pixel data S5 (pixel of interest), pixel data S4 in the left of S5, pixel data S6 in the right of S5, pixel data S2 above S5, pixel data S1 in the left of S2, pixel data S3 in the right of S2, pixel data S8 below S5, pixel data S7 in the left of S8, and pixel data S9 in the right of S8. The pixel data s1 to s9 are located one pixel away from one another as shown in FIG. 21.

Figure 22:
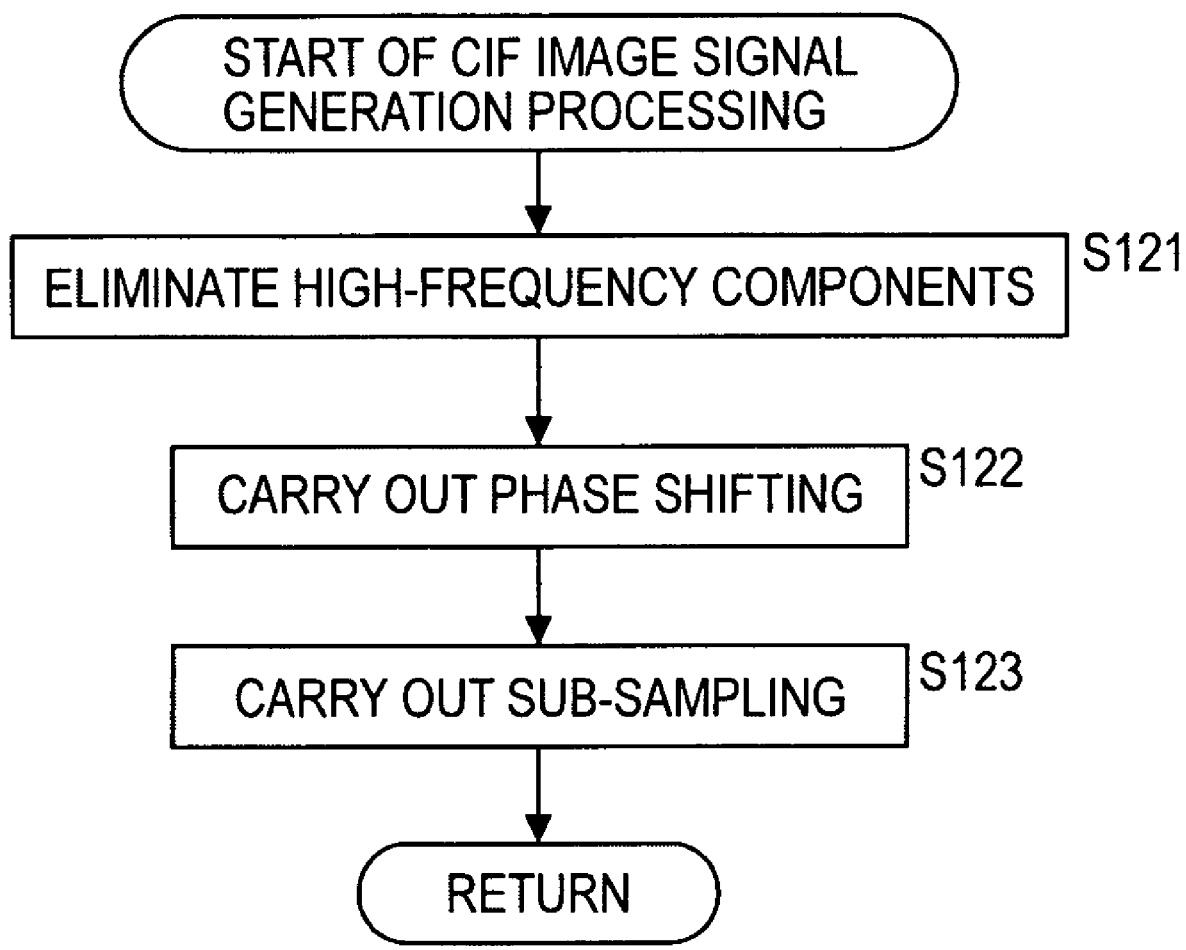
FIG. 22 is a flowchart illustrating CIF image signal generation processing of step S103 in FIG. 20.

Next in step S103, the trainee-image generating section 312 carries out CIF-image-signal generation processing. This CIF-image-signal generation processing is shown as the flowchart in FIG. 22.

First in step S121, the low-pass filter 331 removes high-frequency components from the input SD image signal. This prevents aliasing from occurring. Next in step S122, the phase-shifting section 332 applies phase shifting to the SD image signal without high-frequency components (SD image signal supplied by the low-pass filter 331) by shifting the SD image signal by ½ pixel horizontally and vertically. In step S123, the sub-sampling section 333 generates a CIF image signal by sub-sampling. In short, a CIF image signal is generated by decimating every other pixel of the phase-shifted SD image signal horizontally and vertically.

Figure 23:
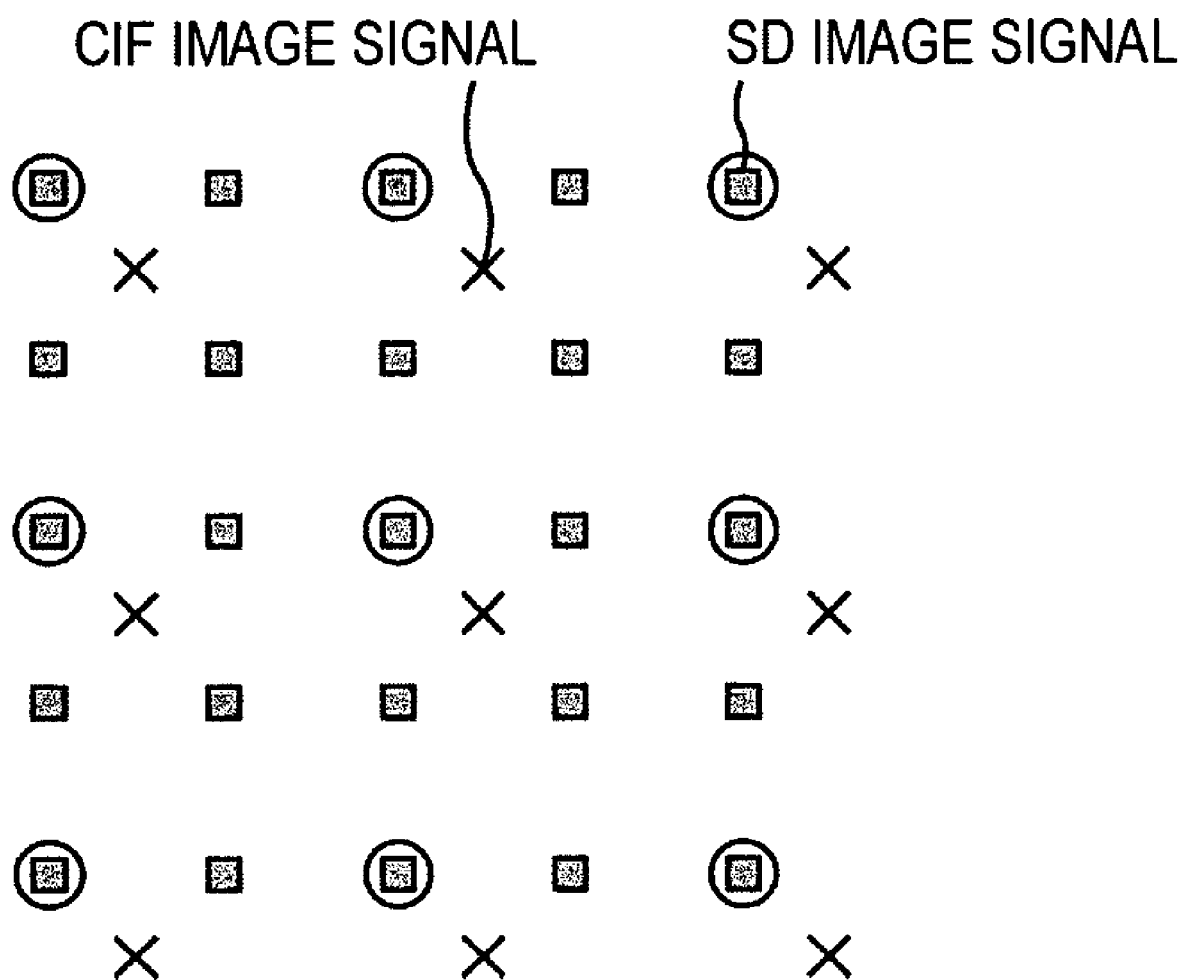
FIG. 23 illustrates sub-sampling.

More specifically, as shown in FIG. 23, after high-frequency components of the SD image signal have been removed by the low-pass filter 331, pixels (indicated by squares in the figure) of the SD image signal are phase-shifted by ½ pixel rightward and downward and are finally decimated every other pixel, so that the pixels of the CIF image signal are generated as indicated by "x" in FIG. 23. In this case, one pixel of the CIF image signal corresponds to four pixels of the SD image signal.

Figure 24:
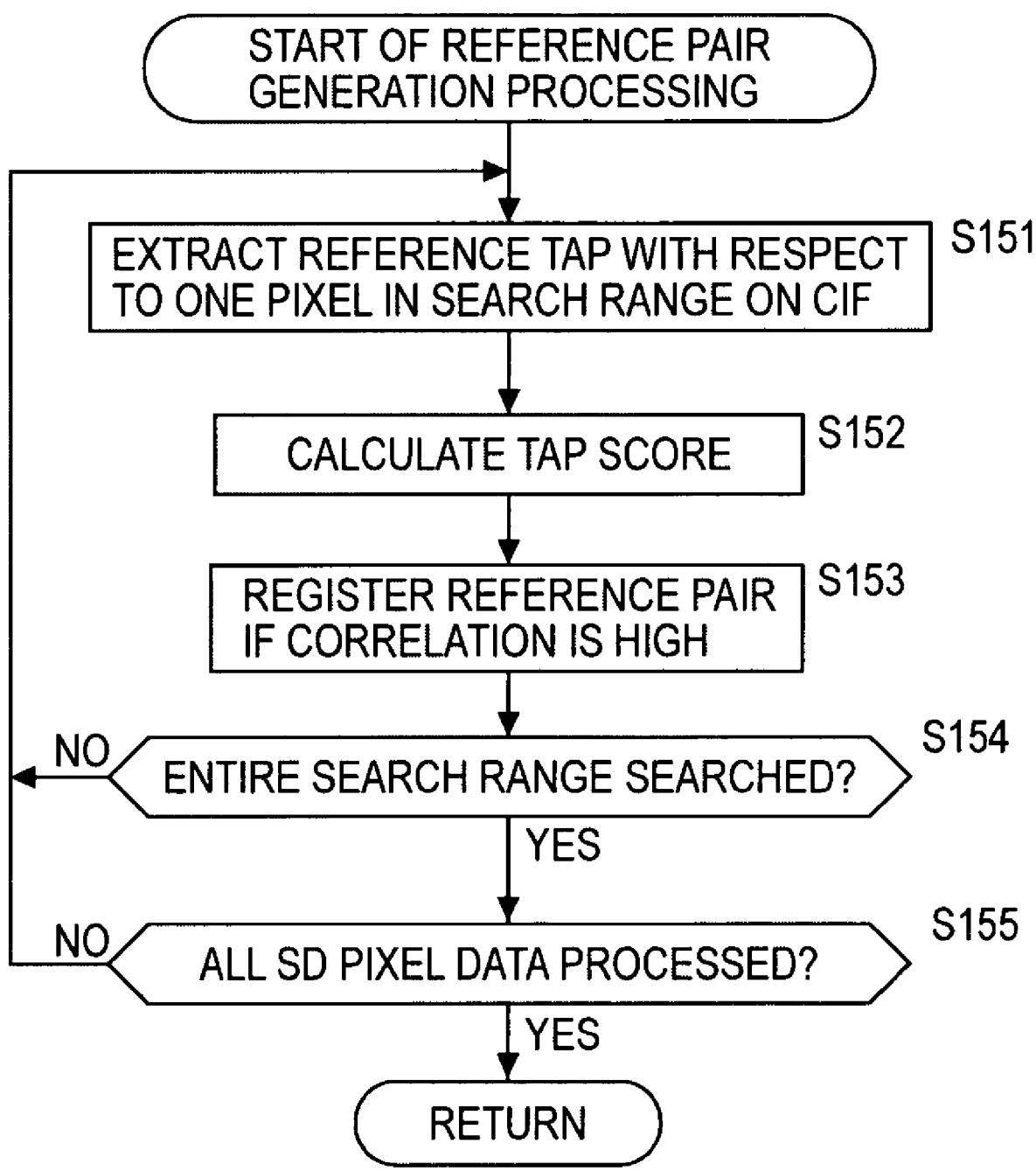
FIG. 24 is a flowchart illustrating reference-pair generation processing of step S104 in FIG. 20.

Referring back to FIG. 20, in step S104, the reference-pair generating section 313 carries out reference tap generation processing. Details of this reference tap generation processing is shown as the flowchart in FIG. 24.

Figure 25:
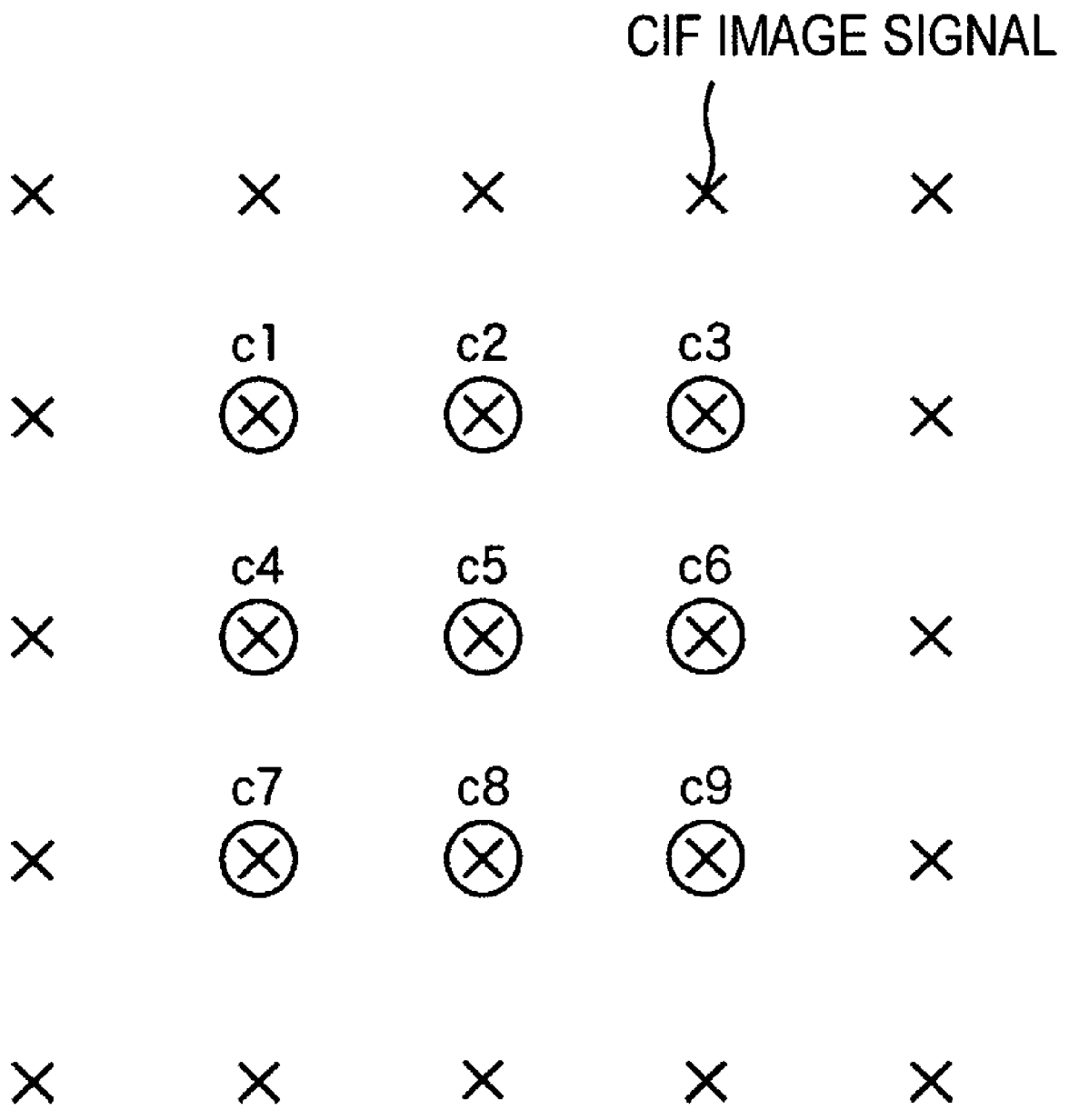

In step S151, the tap extracting section 351 extracts reference taps whose center tap corresponds to one pixel in the search range of the CIF image signal supplied by the sub-sampling section 333. These reference taps are preset such that they have the same relative positional relationships as the prediction taps extracted by the area extracting section 311. More specifically, as shown in FIG. 25, a total of nine pixel data items are extracted as reference taps from the CIF image signal indicated by "x" in the figure. These pixels are pixel data c5, pixel data c4 in the left of c5, pixel data c6 in the right of c5, pixel data c2 above c5, pixel data c1 in the left of c2, pixel data c3 in the right of c2, pixel data c8 below pixel data c5, pixel data c7 in the left of c8, and pixel data c9 in the right of c8.

Next in step S152, the tap-score calculating section 352 calculates a tap score. If, for example, a correlation value is used as the score, a correlation coefficient C between the nine prediction taps s1 to s9 extracted in step S102 of FIG. 20 and the reference taps c1 to c9 extracted in step S151 is calculated based on Equation (15) as shown in FIG. 26.

To ensure that the above-described calculation is carried out, the prediction taps extracted by the area extracting section 311 in step S102 and the reference taps extracted by the tap extracting section 351 in step S151 are predetermined so as to correspond to each other. More specifically, as shown in FIG. 26, the relative positional relationships between the reference taps and the prediction taps are determined such that the pixel data items C1 to C9 as the reference taps correspond to the pixel data items S1 to S9 as the prediction taps, respectively.

Next in step S153, the trainee selecting section 353 compares the score (correlation coefficient C in this example) calculated in the processing of step S152 with a predetermined threshold. If the correlation value C is the threshold or higher, i.e., if the CIF image signal (reference taps) has a high correlation with the prediction taps of the HD image signal, the reference taps are selected and supplied to the reference-pair registering section 354. The reference-pair registering section 354 registers the reference taps. More specifically, the pixel data items C1 to C9 as the reference taps extracted in step S151 shown in FIG. 25 and FIG. 26 are registered in the reference-pair registering section 354.

Figure 26:
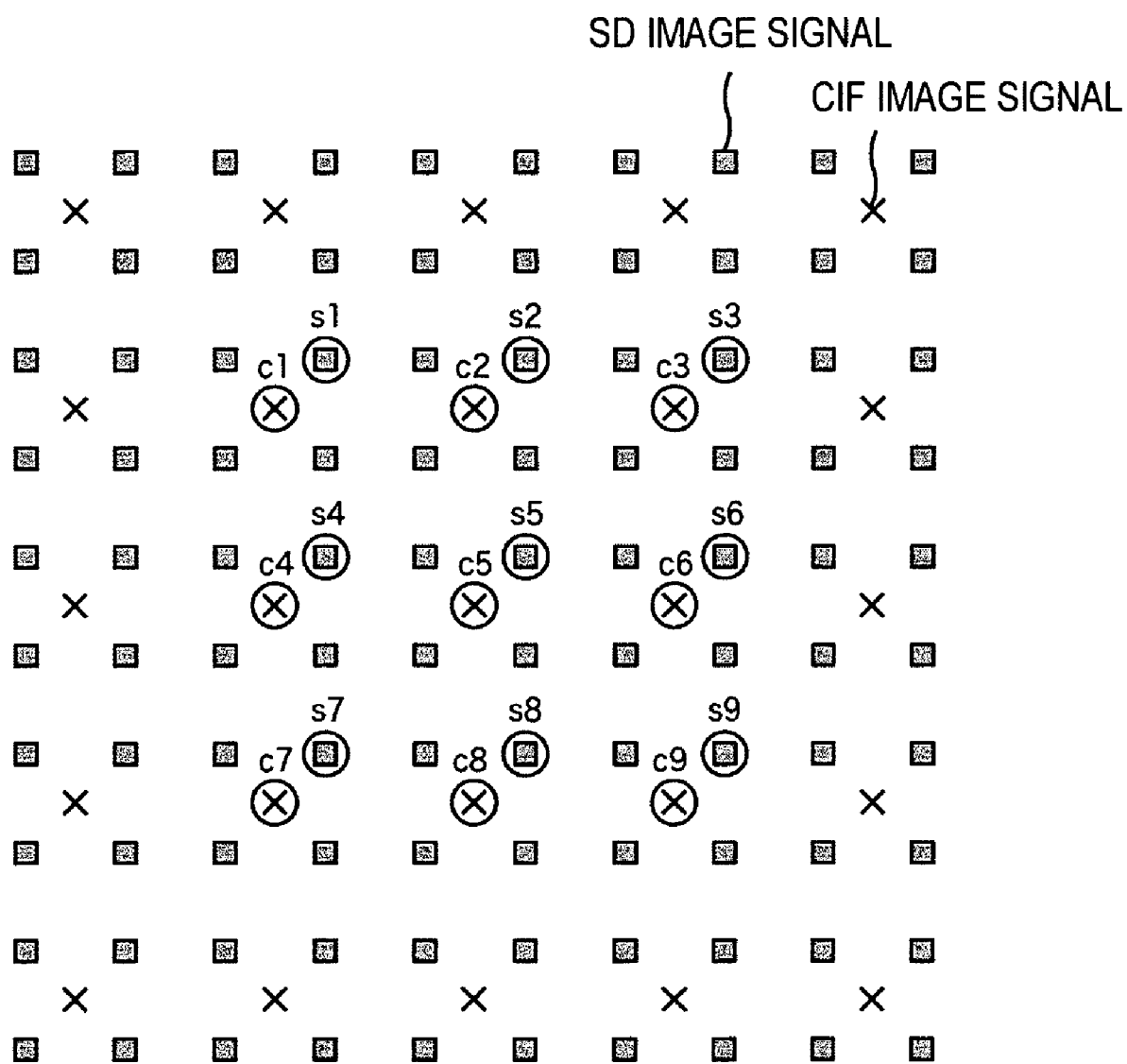
FIG. 26 illustrates the relationship between prediction taps and reference taps.

At this time, as shown in FIG. 26, the trainer selecting section 355 selects the pixel of interest S5 of the SD image signal extracted in step S103 as the pixel data for training the reference taps C1 to C9 (corresponding pixel of interest). This will be described later with reference to FIG. 28. The reference-pair registering section 354 registers this pixel data S5 as to constitute a reference pair corresponding to the pixel data items C1 to C9.

In step S154, the tap extracting section 351 determines if the entire search range is searched. If not the entire search range is searched, the flow returns to step S151, where a subsequent pixel in the search range is selected, and reference taps having the selected pixel as its center are extracted. In step S152, the tap-score calculating section 352 calculates the score of the reference taps selected newly in step S151 in the same manner as described above. In step S153, the trainee selecting section 353 determines whether the score calculated in the processing of step S152 is the threshold or higher. If the score is the threshold or higher, the trainee selecting section 353 supplies the reference taps to the reference-pair registering section 354, which then stores them. If the score is below the threshold, this registration processing is not carried out. The trainer selecting section 355 selects the pixel data item S5 of the SD image signal as the trainer data for the pixel data items C1 to C9 selected by the trainee selecting section 353 and supplies it to the reference-pair registering section 354. The reference-pair registering section 354 registers the reference taps C1 to C9 (trainee image signal) and the pixel data S5 of the SD image signal (trainer image signal) as a reference pair.

Figure 27:
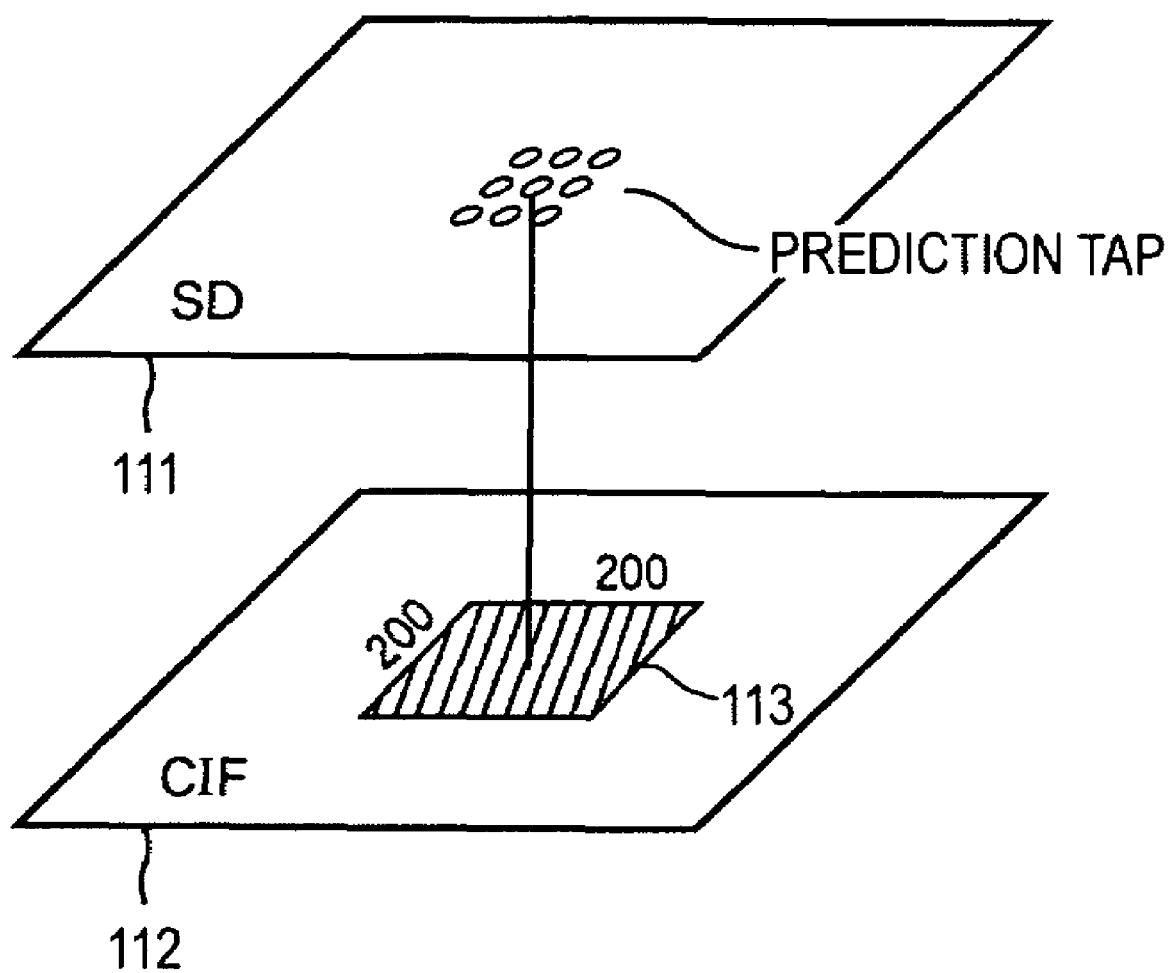
FIG. 27 illustrates the relationship between prediction taps and a search range.

As shown in FIG. 27, the above-described processing is to search a search range 113 on a CIF image plane 112 for taps correlated with the prediction taps with respect to one pixel of interest on a SD image plane 111. The search range 113 is, for example, an area of 200×200 pixels. The search range 113 is searched for reference taps having a correlation of the threshold or higher with the prediction taps surrounding the pixel of interest, and then the reference taps and the corresponding pixel of interest of the SD image signal are registered as a reference pair.

Figure 28:
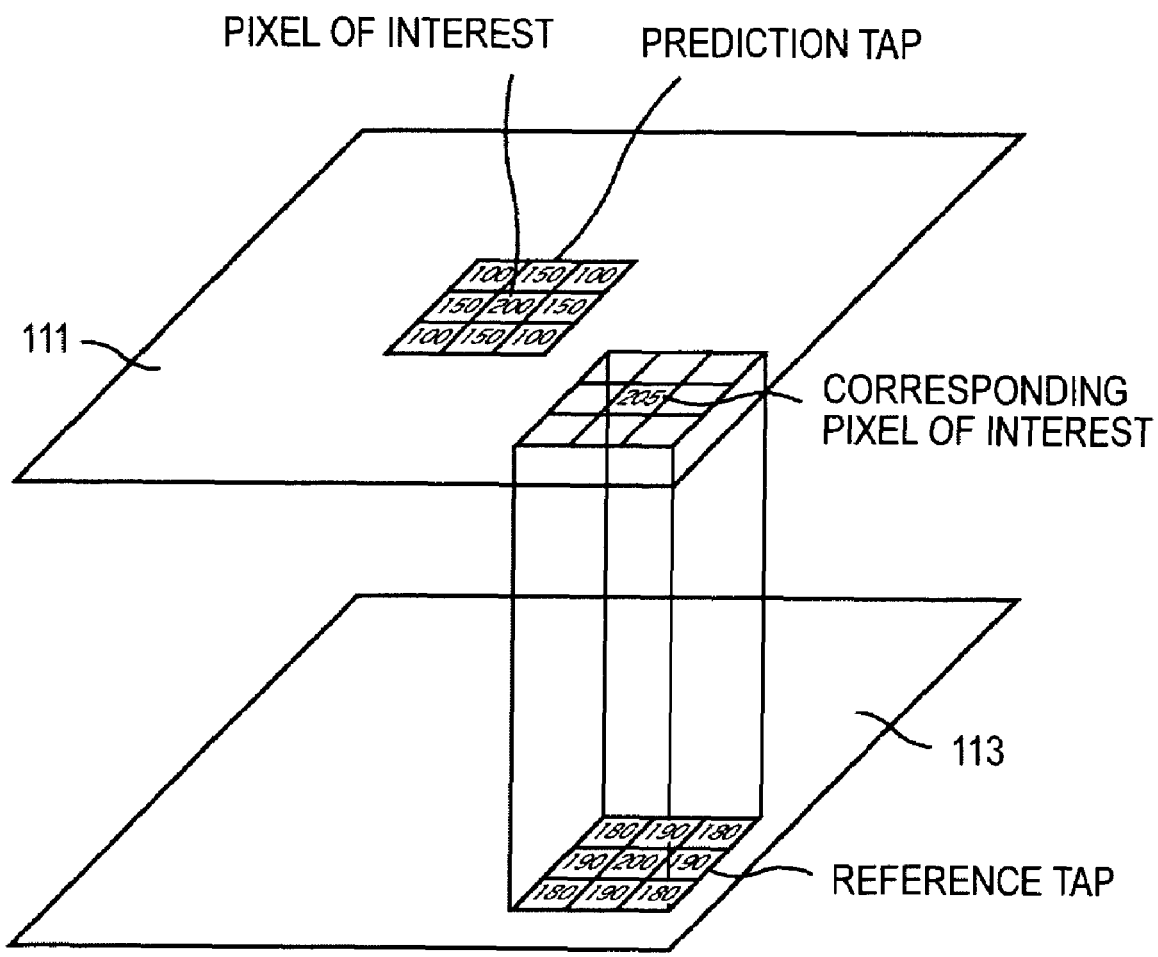
FIG. 28 illustrates the relationship between reference taps and corresponding pixel of interest.

More specifically, as shown in FIG. 28, the search range 113 is searched for reference taps having a correlation of the threshold or higher with the prediction taps. If reference taps having a correlation of the threshold or higher with the prediction taps are found in the search range 113, the pixel of interest corresponding to the reference taps is extracted in the SD image plane 111. In the example of FIG. 28, the prediction taps are (100, 150, 100, 150, 200, 150, 100, 150, 100), and the reference taps having a correlation value of the threshold or higher in the search range 113 is (180, 190, 180, 190, 200, 190, 180, 190, 180). The locations of the reference taps are any locations in the search range 113. They are not always the locations corresponding to the prediction taps. The pixel on the SD image plane 111, that corresponds to the tap at the center of the 3×3 reference taps (tap with a pixel value "200"), is extracted as the corresponding pixel of interest. In the example of FIG. 28, the pixel with a pixel value of "205" is the pixel of interest corresponding to the reference taps. In this case, the reference taps (180, 190, 180, 190, 200, 190, 180, 190, 180) and the corresponding pixel of interest (205) are combined as a reference pair for registration.

Referring back to FIG. 24, the above-described processing is repeated until it is determined in step S154 that the entire search range is searched. If it is determined that the search range is searched, the flow proceeds to step S155, where the tap extracting section 351 determines whether all SD pixel data has been processed. If there is SD pixel data that has not been processed, the flow returns to step S151 to repeat the subsequent processing.

If it is determined in step S155 that all SD pixel data has been processed, the reference tap generation processing ends.

Figure 29:
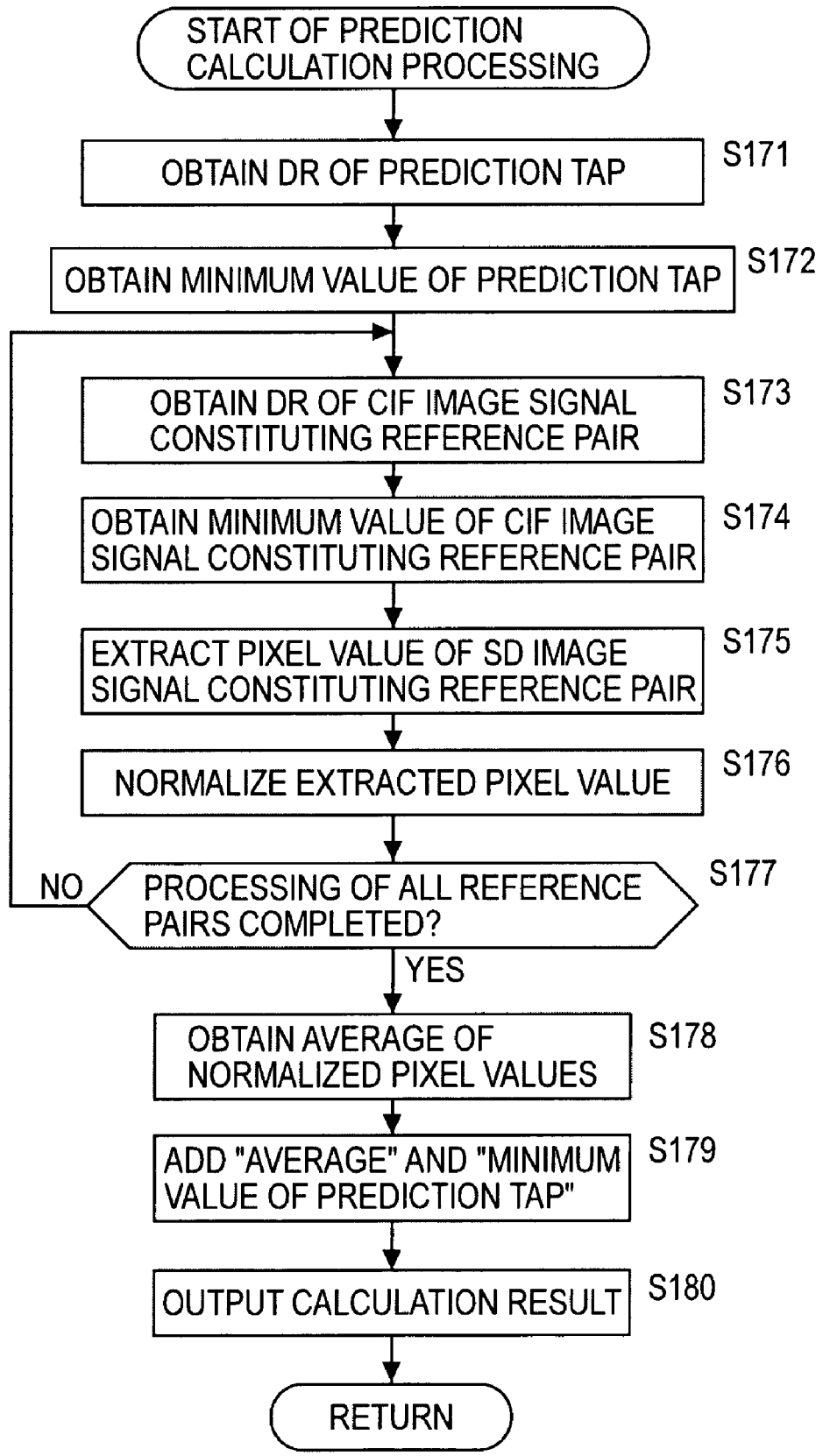
FIG. 29 is a flowchart illustrating prediction calculation processing of step S105 in FIG. 20.

After the reference tap generation processing described above in step S104 of FIG. 20 has been finished, prediction calculation processing is carried out in step S105. Details of this prediction calculation processing are shown as the flowchart in FIG. 29.

Figure 20:
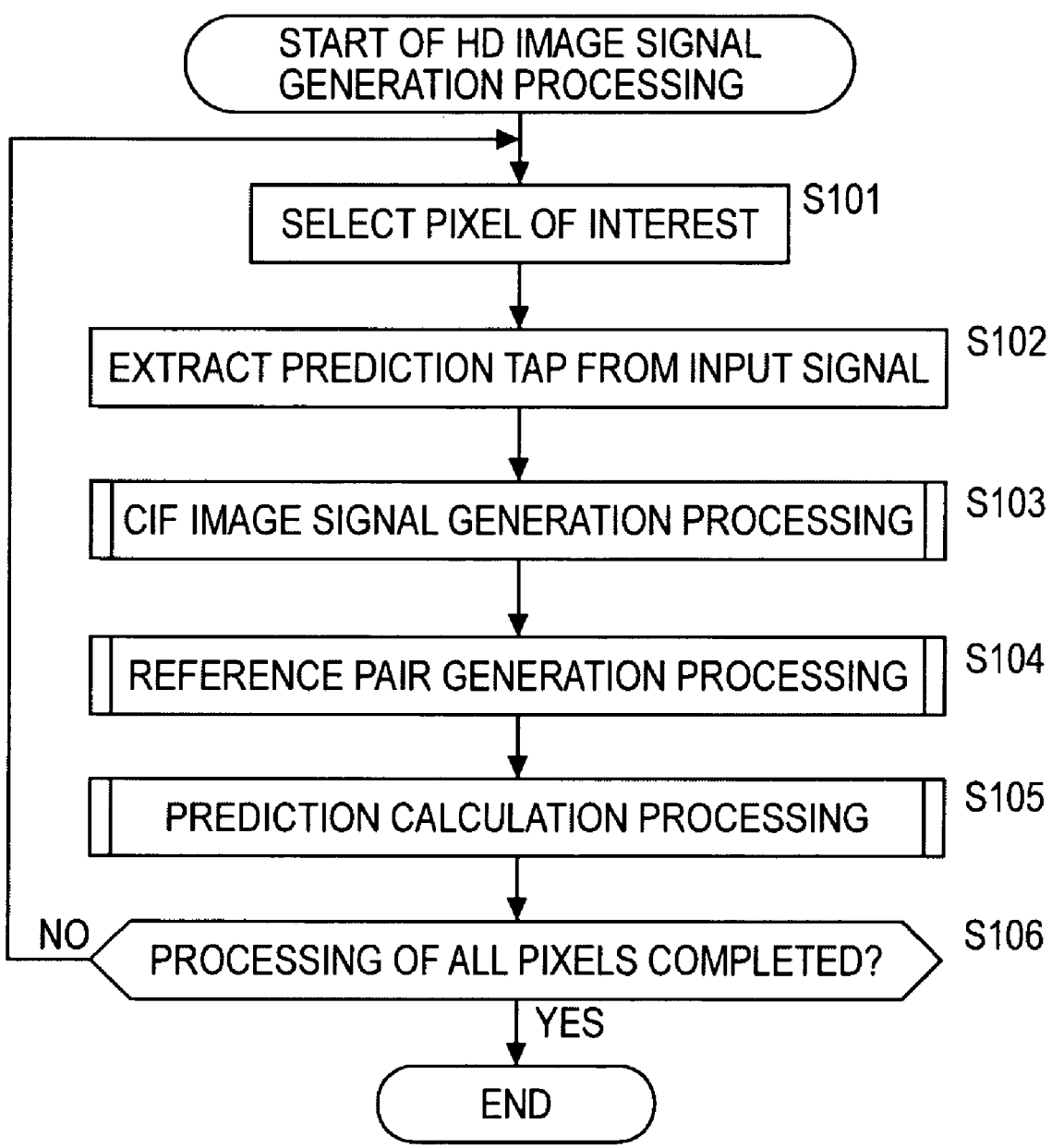
FIG. 20 is a flowchart illustrating HD image signal generation processing of the information processing apparatus in FIG. 16.

In step S171, the DR calculating section 371 obtains the dynamic range of the prediction taps extracted through the processing in step S102 of FIG. 20. More specifically, the difference between the maximum value and the minimum value of the pixel values of the nine taps (pixels) included in the prediction taps is calculated as a dynamic range. In step S172, the minimum-value calculating section 372 obtains the minimum value in the prediction taps. The minimum value is also required to calculate the dynamic range, and therefore, the minimum-value calculating section 372 can be integrated with the DR calculating section 371.

In step S173, the DR calculating section 373 selects one reference pair from the reference pairs registered in the reference-pair registering section 354 through the processing in step S153, and obtains the dynamic range, i.e., the difference between the maximum value and the minimum value of the CIF image signal constituting the selected reference pair. In step S174, the minimum-value calculating section 374 obtains the minimum value of the CIF image signal constituting the reference pair. Also in this case, the minimum value has already been acquired to calculate the dynamic range, and therefore the minimum-value calculating section 374 can be integrated with the DR calculating section 373.

In step S175, the SD-image extracting section 375 extracts the pixel values of the SD image signal constituting the reference pair. Then in step S176, the reference-pair normalizing section 376 normalizes the pixel values extracted through the processing in step S175 based on Equation (17).

$$s'j = (sj - cjmin) \times DRPT/DRj \quad (17)$$

where, s'j represents the normalized SD pixel data, sj represents the SD image data extracted in step S175, cjmin represents the minimum value of the CIF image data obtained in step S174, DRPT represents the dynamic range of the prediction taps obtained in step S171, and DRj represents the dynamic range of the CIF image data obtained in step S173.

In step S177, the reference-pair normalizing section 376 determines whether all reference pairs have been processed. If there is a reference pair that has not been processed, the flow returns to step S173 to repeat the subsequent processing.

Details of the above-described processing will now be described with reference to FIGS. 30A to 30C. In the example shown in FIGS. 30A to 30C, the prediction taps PT are (100, 150, 100, 150, 200, 150, 100, 150, 100) as shown in FIG. 30A. The minimum value and the maximum value are "100" and "200", respectively. Therefore, the dynamic range of the prediction taps PT is calculated as "100" in step S171, and the minimum value of the prediction taps PT is calculated as "100" in step S172.

In FIG. 30B, 100 reference pairs are shown. The first reference pair includes SD-image-signal pixel data S1 having a value "205" and CIF pixel data C1 (180, 190, 180, 190, 200, 190, 180, 190, 180). In this reference pair, the maximum value of the CIF image signal is "200" and the minimum value is "180". Therefore, a dynamic range of "20" and a minimum value of "180" are obtained in steps S173 and S174, respectively. Then, in step S175, the SD pixel data S1 having a pixel value "205" is extracted.

In the same manner, the i-th reference pair includes CIF pixel data Ci (120, 160, 120, 160, 200, 160, 120, 160, 120) and SD pixel data Si (220). The maximum value of the CIF pixel data Ci is "200" and the minimum value of the CIF pixel data Ci is "120". The dynamic range is therefore "80". Thus, the SD pixel data si (220) is extracted.

The 100-th reference pair includes CIF pixel data C100 (100, 120, 100, 120, 140, 120, 100, 20, 100) and SD pixel data S100 (148). The maximum value of the CIF pixel data C100 is "140" and the minimum value of the CIF pixel data C100 is "100". The dynamic range is therefore "40". The SD pixel data S100 (148) is then extracted.

In the first reference pair, therefore, the SD pixel data S1 (205) is normalized based on Equation (17) to be "125", as shown in the following equation.

$$125 = (205 - 180) \times 100 / 20 \quad (18)$$

In the i-th reference pair, the value "220" of the SD pixel data Si is normalized to "125" as shown in the following equation.

$$125 = (220 - 120) \times 100 / 80 \quad (19)$$

In the 100-th reference pair, the value "148" of the SD pixel data S100 is normalized to "120", as shown in the following equation.

$$120 = (148 - 100) \times 100 / 40 \quad (20)$$

If all reference pairs have been processed, in step S178 the average calculating section 377 carries out the processing of obtaining the average value of the normalized pixel values. In the example of FIGS. 30A to 30C, the average value of the 100 normalized SD pixel data items s'1 to s'100 (shown in FIG. 30C) is calculated.

In step S179, the synthesizing section 378 carries out the processing of adding the average value and the minimum value of the prediction taps. More specifically, the synthesizing section 378 generates pixel data h for the HD image signal by adding the average value A calculated through the processing in step S178 and the minimum value MIN of the prediction taps obtained through the processing in step S172, as shown in the following equation.

$$h = MIN + A \quad (21)$$

In the example of FIGS. 30A to 30C, the average value of the normalized pixel values is "124" and the minimum value of the prediction taps PT is "100". Thus, as shown in the following equation, "224" is obtained as the pixel data for the HD image signal corresponding to the pixel of interest (200) of the prediction taps PT.

$$224 = 100 + 124 \quad (22)$$

This pixel value is the pixel value for the HD image signal corresponding to the pixel of interest.

In step S180, the synthesizing section 378 outputs the calculation result obtained through the processing in step S179.

As shown in FIG. 28, according to the present invention, each of the corresponding pixels of interest in reference pairs is normalized based on the minimum value MINSD and the dynamic range DRSD of the prediction taps on the SD image plane 111 and the minimum value MINCIF and the dynamic range DRCIF of the reference taps in the search range 113 on the CIF image plane 112 (with ¼ the resolution of the SD image plane 111) below the SD image plane 111. In short, according to this embodiment, the value obtained by subtracting the minimum value MINCIF (reference value) from the pixel data of the SD image signal in each reference pair is weighted by DRSD/DRCIF, and the resultant value is added to the minimum value MINSD to generate the pixel data for the HD image signal.

Figure 31A:
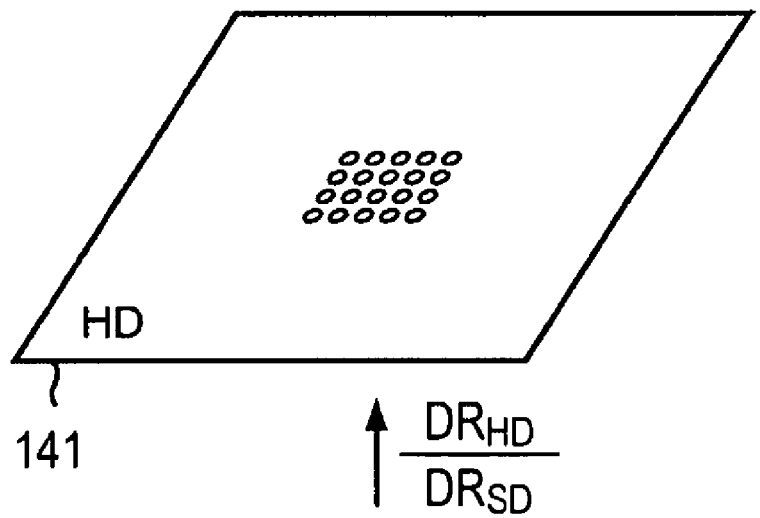
FIGS. 31A to 31C illustrate the relationships between a CIF image signal, a SD image signal, and a HD image signal.
Figure 31B:
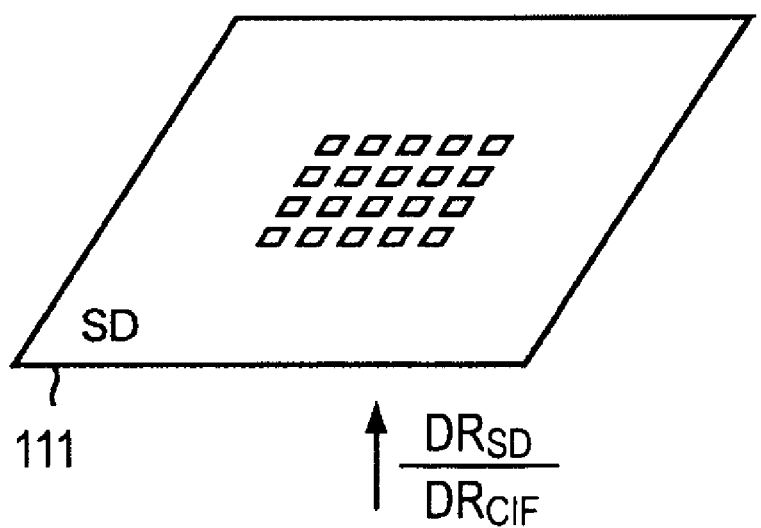
Figure 31C:
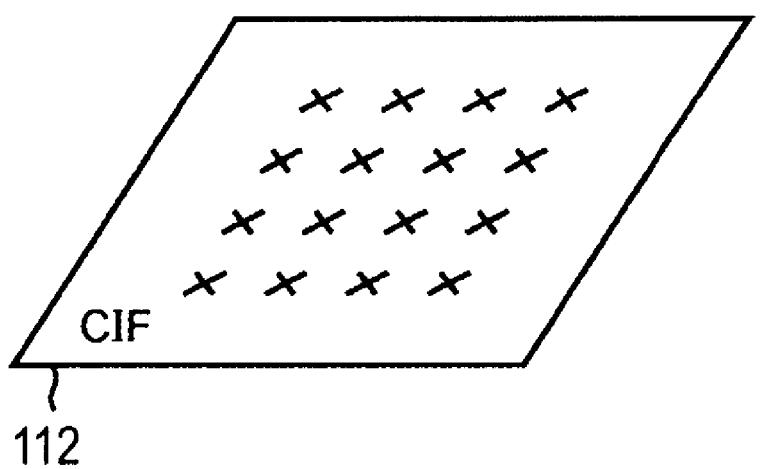

In other words, as shown in FIGS. 31A to 31C, the present invention is based on a principle that the relationship between the 3×3 pixel data items (reference taps) of the CIF image signal constituting a reference pair and the one pixel data item (corresponding pixel of interest) of the SD image signal with four time the resolution is similar to the relationship between the 3×3 pixel data items of the SD image signal constituting the prediction taps and one pixel data item for the HD image signal with four times the resolution.

According to the present invention, the minimum value and the dynamic range of nine pixel data items are extracted as the features of the nine pixel data items (the dynamic range can be interpreted as the maximum value in relation to the minimum value). The (normalized) corresponding pixel of interest in a reference pair when the minimum value and the dynamic range of reference taps are adjusted (normalized) to the minimum value and the dynamic range of the prediction taps can be regarded as the HD image signal.

A reference pair and the ratio DRSD/DRCIF can be obtained without a HD image signal, as long as a SD image signal is available. Therefore, real-time processing is possible. The use of average values does not require intensive computation of inverse matrix calculation as when the least squares method is used. This enables processing to be carried out at high speed and a HD image signal to be generated easily.

Furthermore, the robustness can be enhanced compared with when the least squares method is used to calculate coefficients. More specifically, when coefficients are calculated by the use of the least squares method, over-fitting of coefficients may be caused (loss of robustness) if the number of input/output populations used for training is small. Prediction calculation based on coefficients obtained in this manner may lead to a failure in obtaining appropriate pixel values (output pixel values may be lost). Furthermore, the robustness can also be enhanced by averaging normalized values to enable many reference pairs with a certain level or higher of correlation to be obtained in a limited search range.

Figure 32A:
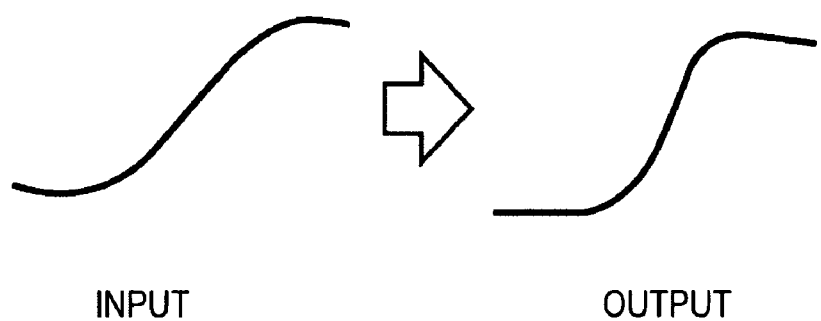
FIGS. 32A and 32B illustrate edge enhancement processing.
Figure 32B:
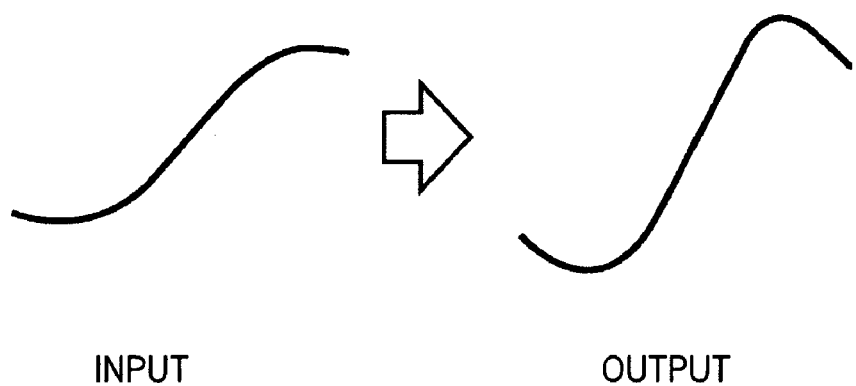

In addition, edges can be sharpened while suppressing ringing, compared with when the known classification adaptive processing is employed. More specifically, although normal high-pass processing causes ringing, which appears as an overstressed rising edge and trailing edge as shown in FIG. 32B, according to this embodiment edges can be sharpened as shown in FIG. 32A while such ringing is suppressed.

The same advantages can also be achieved through standard general classification adaptive processing. However, when classification is carried out through, for example, 1-bit ADRC processing, various input patterns are categorized into the same class. Although this gives the same effect on all inputs in a class on the average, it is less effective due to mixed different input patterns. For example, if pixel values "120" or more are assigned "1" and pixel values less than "120" are assigned "0" for a 5-bit class code "00111", gradation data (100, 110, 120, 130, 140) and edge data (100, 100, 140, 140, 140) are subjected to training prediction in the same class.

In contrast, according to this embodiment, only reference pairs similar in shape to actually processed input waveforms are used to prevent ringing from occurring while edges are sharpened.

Referring back to FIG. 20, after the prediction calculation processing in step S105 is completed as described above, in step S106 the area extracting section 311 determines whether all pixels have been processed. If there is a pixel that has not been processed, the flow returns to step S101, where another pixel of the input SD image signal is set as a new pixel of interest and prediction taps in relation to the pixel of interest are extracted. Thereafter, the prediction taps are processed in the same manner as described above.

If it is determined in step S106 that all pixels have been processed, the HD pixel generation processing ends.

In the above-described processing, when a high-quality image with four times the resolution of an input image is to be generated, an image with ¼ the resolution of the input image is generated to include the original input image and the generated image with ¼ resolution in a reference pair. More generally, to produce an image n-times the resolution of an input image, an image 1/n the resolution of the input image is produced to include the input image and the generated image with 1/n resolution in a reference pair. Although "n=4" in the above-described example, n is generally one or a larger number.

Figure 33:
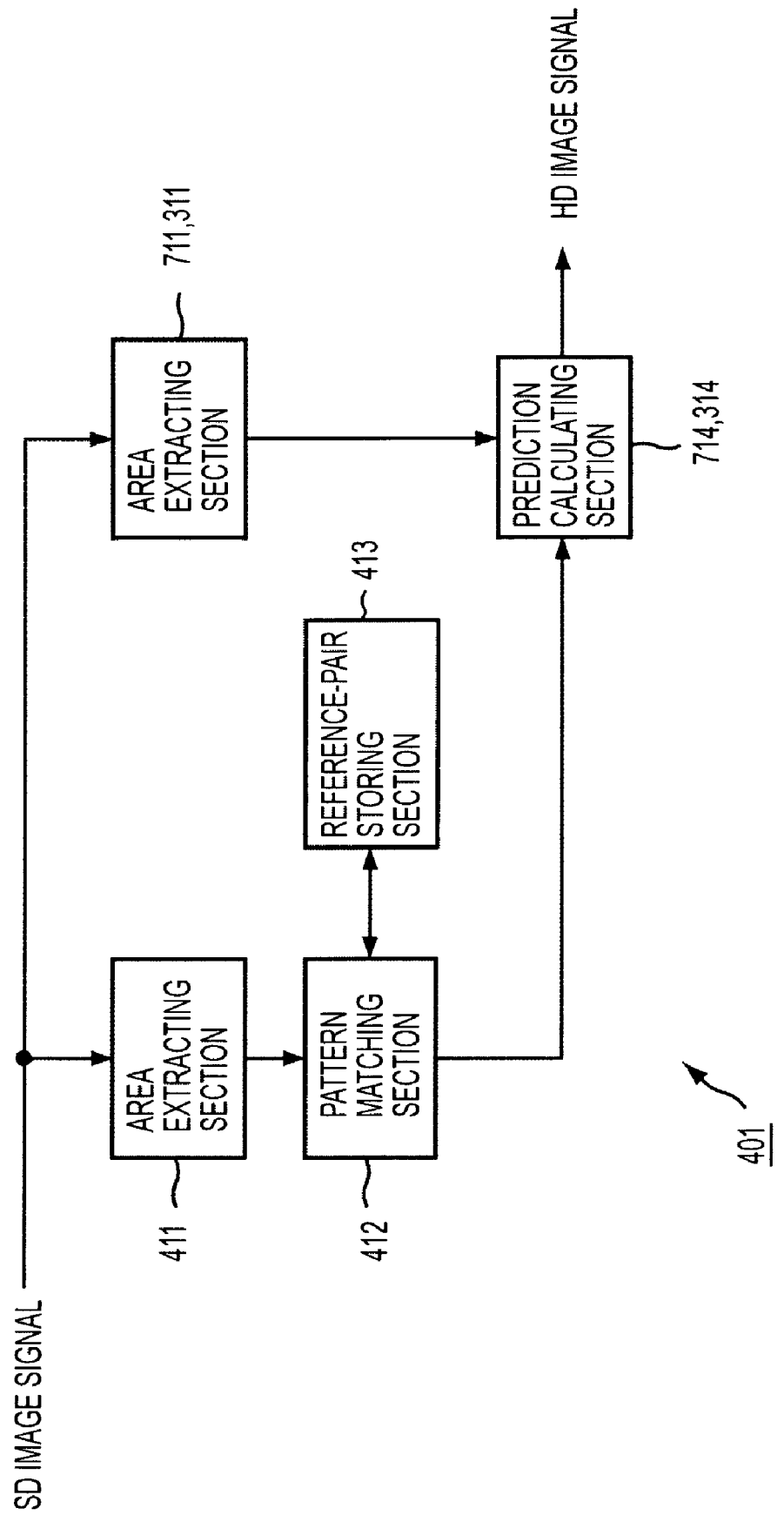
FIG. 33 is a block diagram illustrating an example structure of another information processing apparatus to which the present invention is applied.

If real-time processing is not necessary, trained reference pairs can be pre-stored for use. FIG. 33 depicts an example structure of an information processing apparatus 401 used when real-time processing is not required. The information processing apparatus 401 includes an area extracting section 411, a pattern matching section 412, a reference-pair storing section 413, an area extracting section 711, and a prediction calculating section 714.

Based on an input SD signal, the area extracting section 411 extracts as reference taps the pixels in a predetermined area (reference area) with respect to a pixel of interest. Through this processing, for example, nine pixels are extracted as reference taps. The reference taps extracted by the area extracting section 411 are supplied to the pattern matching section 412.

The reference-pair storing section 413 pre-stores reference pairs. How to store these reference pairs will be described later with reference to FIGS. 38 and 39. The reference pairs include a HD image signal component and a SD image signal component. The pattern matching section 412 searches the reference-pair storing section 413 for a reference pair having a predetermined relationship with the reference taps, and supplies it to the prediction calculating section 714.

From the input SD signal, the area extracting section 711 extracts as prediction taps the pixels in a prediction area. The relative positional relationships between the pixel of interest and the prediction taps are preset. The prediction area is the same as the reference area in the area extracting section 411. Thus, one of the area extracting section 411 and the area extracting section 711 may be omitted. The area extracting section 711 supplies the extracted prediction taps to the prediction calculating section 714.

The prediction calculating section 714 predictively calculates a HD image signal based on the prediction taps supplied by the area extracting section 711 and the reference pair supplied by the pattern matching section 412.

Figure 34:
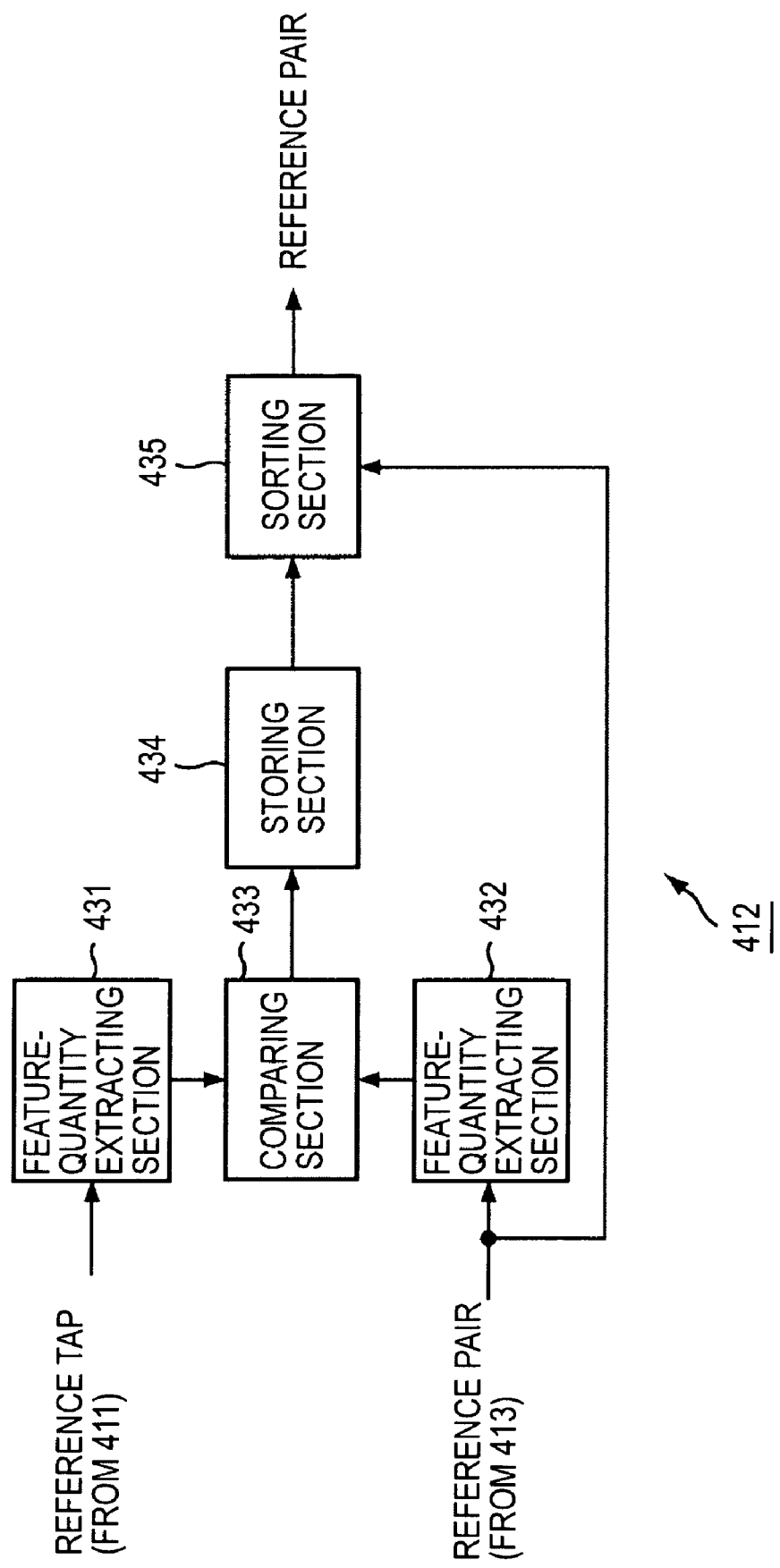
FIG. 34 is a block diagram depicting an example structure of the pattern matching section in FIG. 33.

FIG. 34 depicts an example structure of the pattern matching section 412. The pattern matching section 412 includes a feature-quantity extracting section 431, a feature-quantity extracting section 432, a comparing section 433, a storing section 434, and a sorting section 435.

The feature-quantity extracting section 431 extracts a feature quantity of the reference taps supplied by the area extracting section 411 and supplies it to the comparing section 433. The feature-quantity extracting section 432 extracts a feature quantity of the SD image signal component in the reference pair supplied by the reference-pair storing section 413, and supplies it to the comparing section 433. The comparing section 433 compares the feature quantity supplied by the feature-quantity extracting section 431 with the feature quantity supplied by the feature-quantity extracting section 432 to obtain the correlation between the two feature quantities.

For example, the feature quantities extracted by the feature-quantity extracting section 431 and the feature-quantity extracting section 432 may be pixel values as-is. Alternatively, such feature quantities may be normalized pixel values. A normalized pixel value in reference taps is represented as an intermediate pixel value relative to the maximum and minimum pixel values in the reference taps, where the maximum and minimum pixel values are set to, for example, 1 and 0, respectively. More specifically, the value obtained by subtracting the minimum value from a target pixel value is divided by the difference between the maximum value and the minimum value to obtain the normalized pixel value of the target pixel value.

Alternatively, such feature quantities may be dynamic ranges. The dynamic range is the difference between the maximum value and the minimum value in the reference taps.

The comparing section 433 calculates a norm value, the sum of absolute difference values, or a correlation coefficient value as a comparison value for the pixel value, normalized pixel value, or dynamic range, and carries out comparison based on the comparison value.

A norm value is calculated by the following equation, where (x1, x2, x3 ..., x8, x9) represent the reference taps and (y1, y2, y3 . . . , y8, y9) represent the SD image signal component included in the reference pair.

$$\sqrt{(x_1-y_1)^2+(x_2-y_2)^2+(x_3-y_3)^2+...+(x_9-y_9)^2} \quad (23)$$

The sum of absolute difference values is represented by Equation (24).

$$\Sigma|x_i-y_i| \quad (24)$$

A correlation coefficient C is represented by Equation (15), as described above.

In addition, the feature quantities extracted by the feature-quantity extracting section 431 and the feature-quantity extracting section 432 may be 1-bit ADRC codes. If this is the case, the comparison by the comparing section 433 may be based on the coincidence of 1-bit ADRC codes. A coincidence is defined as the number of bits with equivalent values, where the bit at each location on one part is compared with the bit at the corresponding location on another part.

Say that the 1-bit ADRC code of the reference taps is (000000001) and the 1-bit ADRC code of the SD image signal component in the reference pair is also (000000001). In this case, the values of the bits at all locations in the reference taps are equal to those of the bits at the respective locations in the SD image signal component, and the coincidence is "9". On the other hand, if the 1-bit ADRC code of the reference taps is (000000001) and the SD image signal component in the reference pair is (000000001), the seven bits on the MSB side and the LSB have the equivalent values. Thus, the coincidence is "8".

In addition to those described above, other values functioning as determiners of the correlation between the reference taps and the SD image signal component in the reference pair can be used as a comparison value.

The storing section 434 stores the result of the comparison by the comparing section 433. The sorting section 435 sorts a plurality of values stored in the storing section 434 in this manner, and outputs N comparison results sorted in descending order of correlation. Thereafter, the sorting section 435 reads out N reference pairs corresponding to the top N SD image signal components from the reference-pair storing section 413, and outputs them to the prediction calculating section 714.

Figure 35:
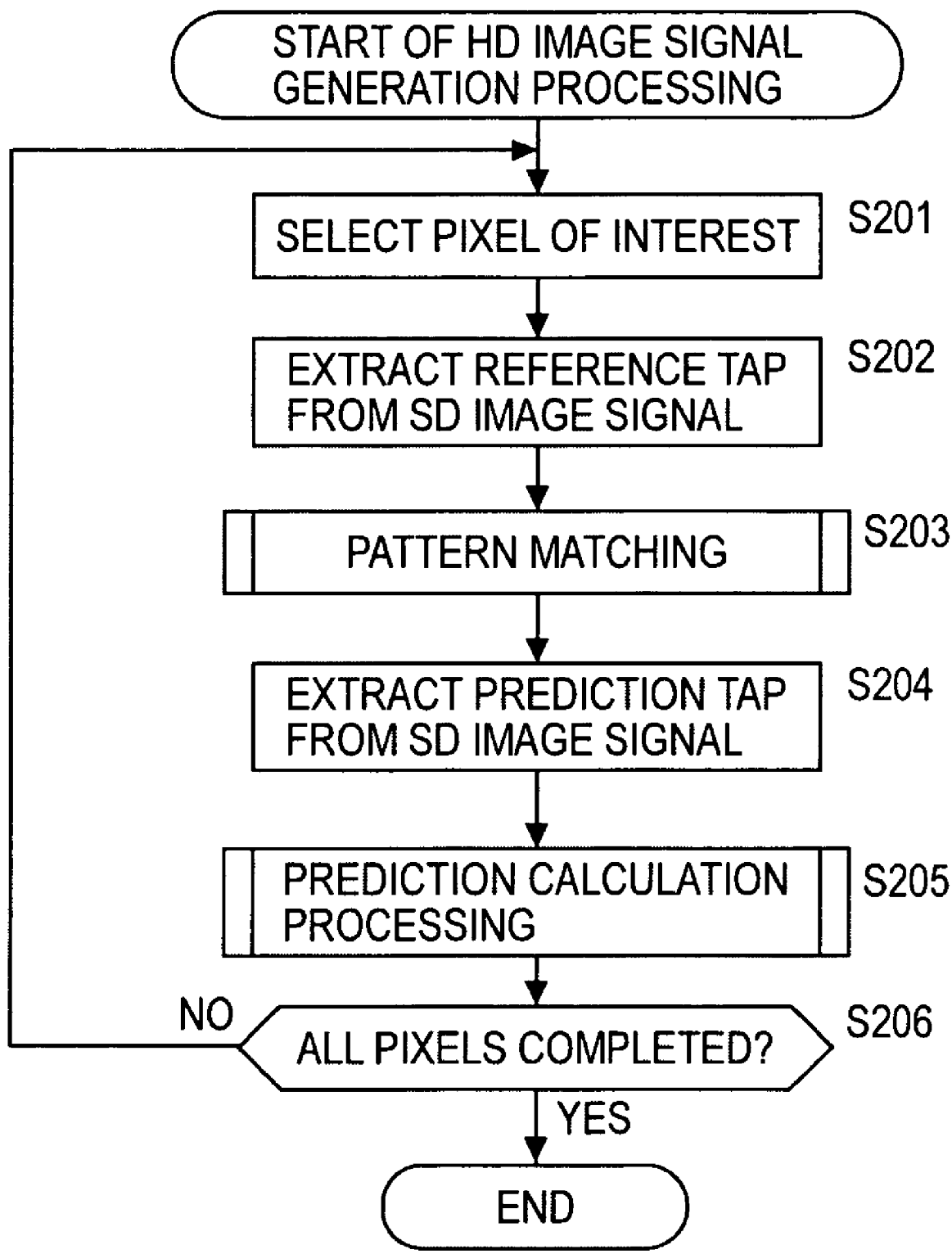
FIG. 35 is a flowchart illustrating HD image signal generation processing of the information processing apparatus in FIG. 33.

HD signal generation processing in the information processing apparatus 401 will now be described with reference to the flowchart in FIG. 35. In step S201, the area extracting section 411 and the area extracting section 711 select a pixel of interest from the input SD signal. In step S202, the area extracting section 411 extracts reference taps from the input SD signal. The relative positional relationships of the reference taps with the pixel of interest are predetermined.

Figure 36:
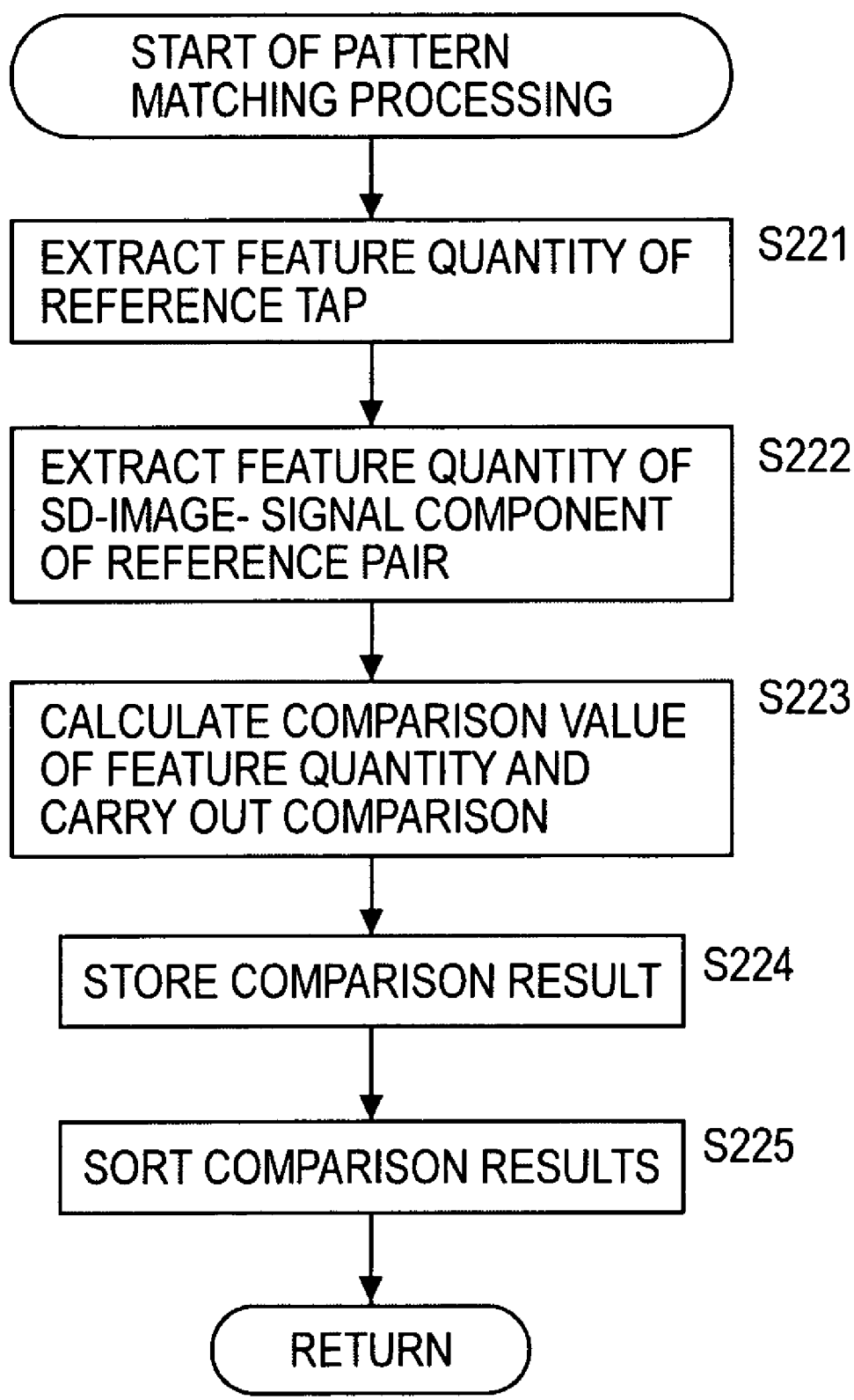
FIG. 36 is a flowchart illustrating pattern matching processing of step S203 in FIG. 35.

In step S203, the pattern matching section 412 performs pattern matching between the reference pair stored in the reference-pair storing section 413 and the reference taps extracted in the processing of step S202. Details of the pattern matching are shown in FIG. 36.

More specifically, in step S221, the feature-quantity extracting section 431 extracts a feature quantity of the reference taps. If it is presumed that the pixel values are extracted as the feature quantity, the feature-quantity extracting section 431 extracts the pixel values as the feature quantity of the reference taps supplied by the area extracting section 411. The extracted pixel values are supplied to the comparing section 433.

In step S222, the feature-quantity extracting section 432 extracts a feature quantity of the SD image signal component in the reference pair.

More specifically, the feature-quantity extracting section 432 reads out one reference pair stored in the reference-pair storing section 413, extracts the pixel values of the SD image signal component included in the reference pair, and outputs them to the comparing section 433. In step S223, the comparing section 433 calculates the comparison value of the supplied feature quantities for comparison. More specifically, the comparing section 433 calculates as a comparison value, for example, the sum of the absolute difference values between the pixel values in the reference taps supplied by the feature-quantity extracting section 431 and the pixel values in the SD image signal component in the reference pair supplied by the feature-quantity extracting section 432.

As shown in FIGS. 37A to 37C, if reference taps RT include, for example, a total of nine (3×3) pixel values including one pixel of interest and its neighboring eight pixels (one each above, below, left, right, upper left, upper right, lower left, and lower right), the SD signal component of the reference pair also has nine (3×3) pixel values. In the example of FIG. 97A, the pixel values of the reference taps RT are (100, 148, 100, 152, 200, 152, 100, 148, 100), where the pixel of interest is the pixel with the median value 200. If the feature-quantity extracting section 432 extracts a first SD image signal "SD1-1", the pixel values are (200, 200, 200, 200, 200, 200, 200, 200, 200). The comparing section 433 calculates the sum of the absolute difference values as a comparison value based on the following equation.

$$600=|100-200|+|148-200|+|100-200|+|152-200|+$$
$$|200-200|+|152-200|+|100-200|+|148-200|+$$
$$|100-200| \quad (11)$$

In step S224, the storing section 434 stores the comparison result. More specifically, the storing section 434 stores the sum of the absolute difference values "600" calculated in the manner described above as the comparison value.

The feature-quantity extracting section 432 then selects, for example, SD1-2 as a second SD image signal in the reference pair and output it to the comparing section 433. The comparing section 433 calculates the sum of the absolute differences between the pixel values of the reference taps RT and the pixel values of the SD image signal component SD1-2 in the same manner as described above, and supplies the obtained sum to the storing section 434, which then stores the sum.

The processing described above is repeated to calculate the same number of sums of the absolute difference values as the number of reference pairs stored in the reference-pair storing section 413. In step S225, the sorting section 435 sorts the comparison results. More specifically, the sorting section 435 sorts the sums of the absolute difference values, i.e., the obtained comparison values in ascending order, and selects the top 100 values. The sorting section 435 then reads out the reference pairs having the 100 SD image signal components from the reference-pair storing section 413, and supplies them to the prediction calculating section 714.

In this manner, as shown in, for example, FIG. 37C, 100 reference pairs composed of SD image signals and HD image signals are supplied to the prediction calculating section 714. In the example of FIG. 37C, 100 reference pairs, including the reference pair composed of a HD image signal HD-u and a SD image signal SD-u, the reference pair composed of a HD image signal HD-j and a SD image signal SD-j, and the reference pair composed of a HD image signal HD-k and a SD image signal SD-k, are selected and supplied to the prediction calculating section 714.

Referring back to FIG. 35, in step S204 the area extracting section 711 extracts prediction taps from the input SD image signal. The relative positional relationships of the prediction taps with the pixel of interest selected in the processing of step S201 are also preset. These prediction taps are the same as the reference taps extracted in the area extracting section 411.

In step S205, the prediction calculating section 714 carries out predictive calculation processing. This processing is the same as that shown in FIG. 29, and thus will not be described.

In step S206, the area extracting section 411 and the area extracting section 711 determine whether the processing of all pixels has been completed. If there is a pixel that has not been processed, the flow returns to step S201 to repeat the same processing. If all pixels have been processed, the HD-image-signal generation processing ends.

As described above, this information processing apparatus 401 requires reference pairs to be pre-generated and pre-stored. The generation of reference pairs will now be described.

Figure 38:
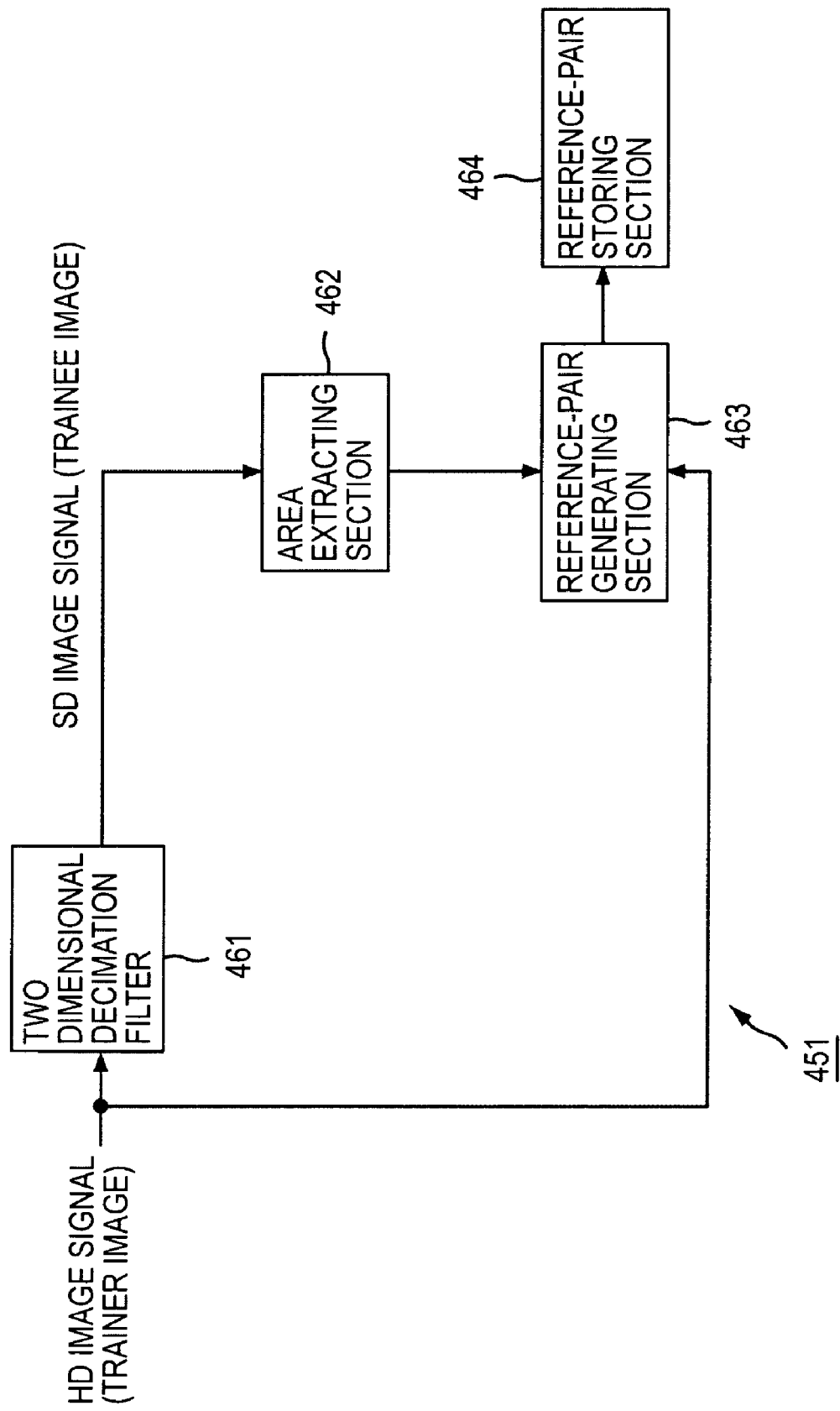
FIG. 38 is a block diagram depicting an example structure of an information processing apparatus for generating reference pairs.

FIG. 38 depicts an example structure of an information processing apparatus 451 for generating reference pairs. The information processing apparatus 451 includes a two-dimensional decimation filter 461, an area extracting section 462, a reference-pair generating section 463, and a reference-pair storing section 464. The two-dimensional decimation filter 461 generates a SD image signal as a trainee image by decimating every other pixel of a HD image signal as a trainer image horizontally and vertically.

The area extracting section 462 extracts reference taps from the SD image signal supplied by the two-dimensional decimation filter 461. The reference taps extracted by the area extracting section 462 are the same as the reference taps extracted by the area extracting section 411 (i.e., prediction taps extracted by the area extracting section 711) in FIG. 33.

The reference-pair generating section 463 receives the HD image signal as a trainer image as-is, as well as the reference taps supplied by the area extracting section 462. The reference-pair generating section 463 generates a reference pair including the reference taps supplied by the area extracting section 462 and the corresponding input HD image signal, and supplies it to the reference-pair storing section 464 for storage.

Figure 39:
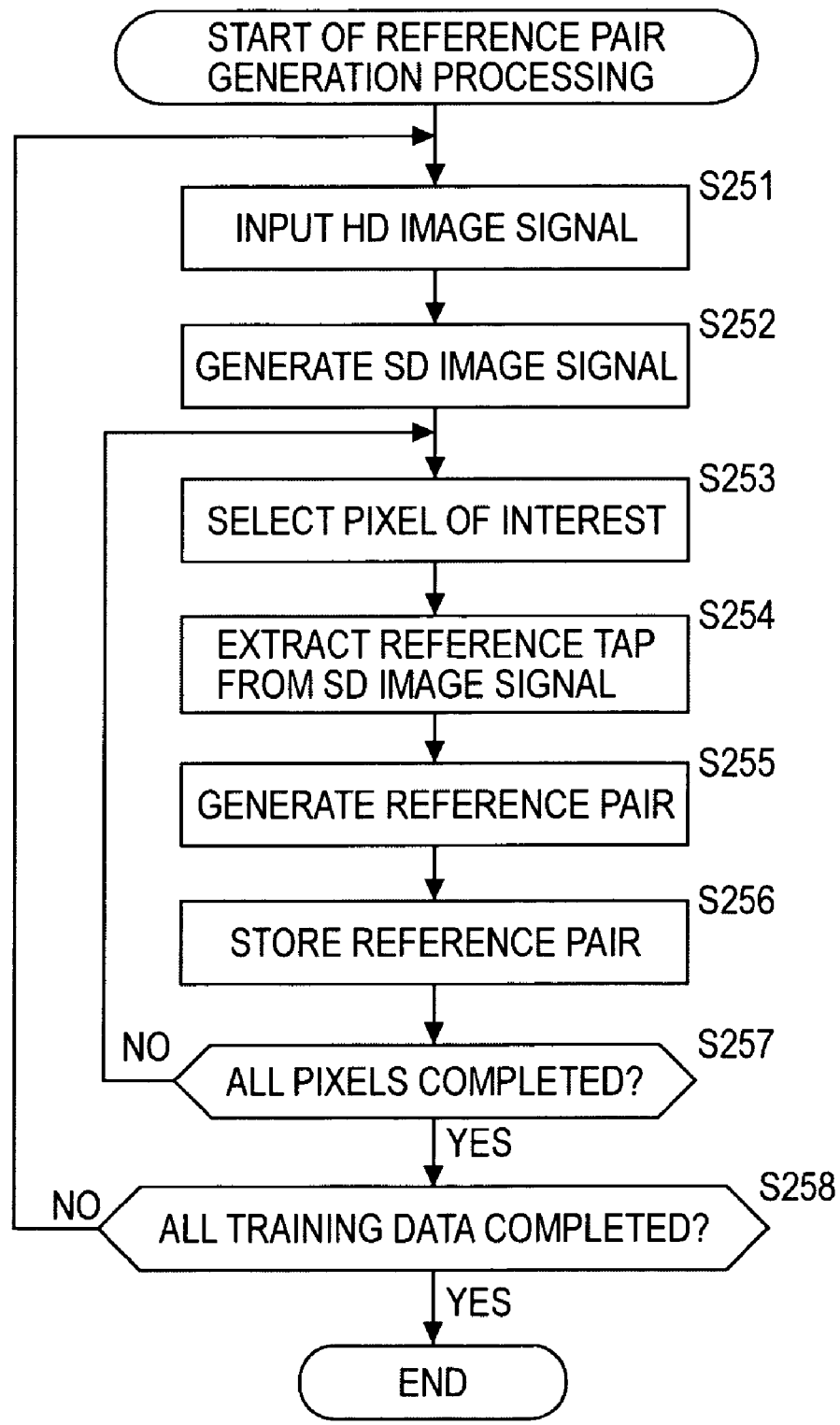
FIG. 39 is a flowchart illustrating reference tap generation processing of the information processing apparatus in FIG. 38.

Reference-pair generation processing in the information processing apparatus 451 will now be described with reference to the flowchart in FIG. 39.

In step S251, the two-dimensional decimation filter 461 inputs a HD image signal as a trainer image. In step S252, the two-dimensional decimation filter 461 generates a SD image signal from the input HD image signal. This processing can be carried out by decimating, for example, every other pixel of the input HD image signal horizontally and vertically. Details of this processing are the same as those in FIG. 22. In step S253, the area extracting section 462 selects a pixel of interest of the input SD image signal. In step S254, the area extracting section 462 extracts reference taps from the input SD image signal. The relative positional relationships between the pixel of interest selected through the processing of step S253 and the reference taps are the same as those in the area extracting section 411 of FIG. 33.

In step S255, the reference-pair generating section 463 generates a reference pair. More specifically, the reference taps extracted by the area extracting section 462 in step S254 and the HD image corresponding to the reference taps that was input in step S251 generate a reference pair.

As a result of this processing, as shown in, for example, FIG. 37B, SD pixel data SD1-1 (200, 200, 200, 200, 200, 200, 200, 200, 200) as the reference taps and corresponding HD pixel data HD-1 (200) are generated as a reference pair.

In step S256, the reference-pair storing section 464 carries out the processing of storing the reference pair. In short, the reference pair generated in this manner is supplied to and stored in the reference-pair storing section 464.

In step S257, the area extracting section 462 determines whether the above-described processing of all pixels has been completed. If there is a pixel that has not been processed, the flow returns to step S253, where the following pixel of interest is selected, and the newly selected pixel of interest is subjected to the same processing.

If it is determined in step S257 that all pixels have been processed, the flow proceeds to step S258, where the area extracting section 462 determines whether all training data has been processed. If there is training data that has not been processed, the flow returns to step S251, where a new HD image signal is input, and based on the selected HD image signal, the same reference-pair generation processing is repeated. If it is determined in step S258 that all training data has been processed, the reference-pair generation processing ends.

In this manner, the reference pairs stored in the reference-pair storing section 464 are used by the reference-pair storing section 413 in FIG. 33.

Although higher-quality images are generated in the above-described example, the present invention can be applied to the generation of various types of signals. Furthermore, the present invention can be applied to the processing of not only image signals but also sound signals and other signals.

The above-described sequence of processing can be carried out not only with hardware but also with software. If software is used to carry out the above-described sequence of processing, for example, the information processing apparatus can be realized by, for example, a personal computer as shown in FIG. 15.

In the present invention, the steps of programs recorded on the recording medium may or may not be followed time-sequentially in order of described steps. Furthermore, the steps may be followed in parallel or independently from one another.

Figure 40:
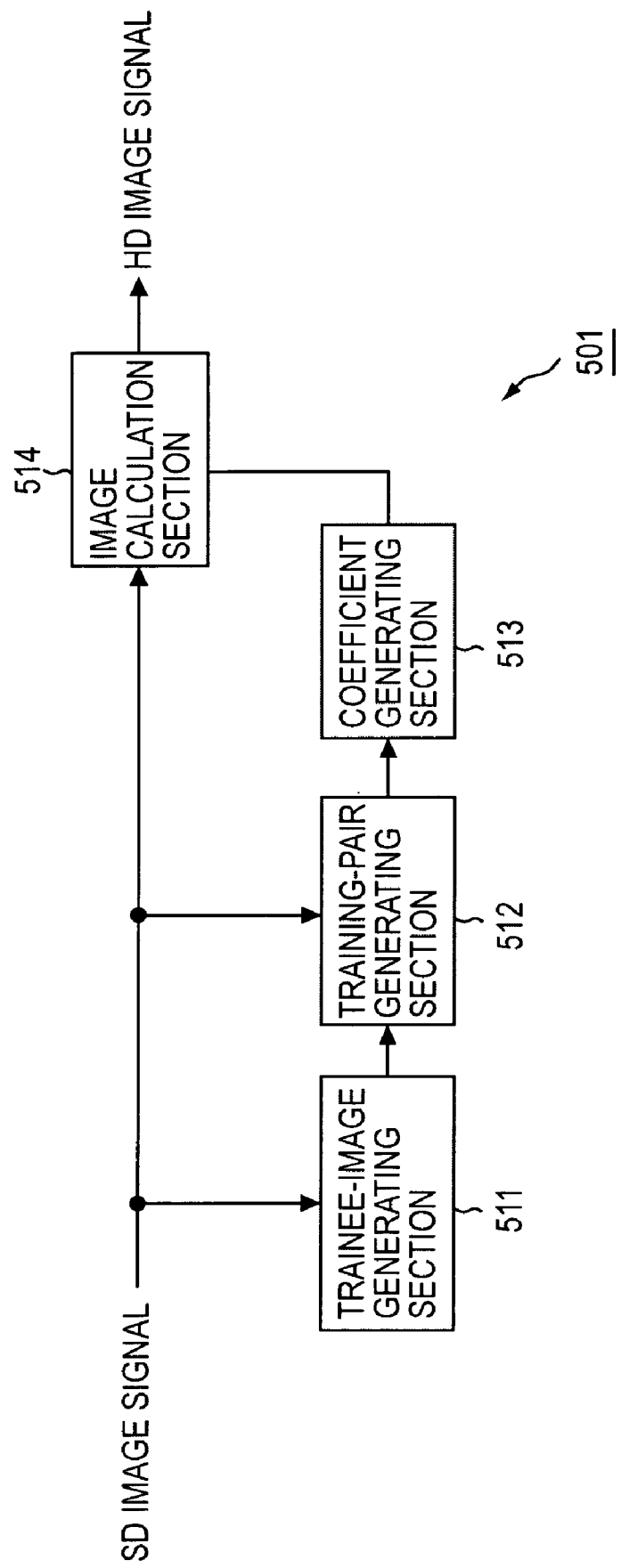
FIG. 40 is a block diagram depicting an example structure of an information processing apparatus to which the present invention is applied.

Still another embodiment of the present invention will now be described. FIG. 40 depicts an example structure of an information processing apparatus 501 to which the present invention is applied. The information processing apparatus 501 includes a trainee-image generating section 511, a training-pair generating section 512, a coefficient generating section 513, and an image calculation section 514.

The trainee-image generating section 511 generates a CIF (Common Intermediate Format) image signal as a trainee image by decimating, for example, every other pixel of an input SD (Standard Definition) image signal horizontally and vertically, and supplies it to the training-pair generating section 512. The training-pair generating section 512 generates a signal pair as a training pair based on the CIF image signal as a trainee image signal supplied by the trainee-image generating section 511 and the corresponding SD image signal.

The coefficient generating section 513 generates prediction coefficients based on the training pair supplied by the training-pair generating section 512, and outputs them to the image calculation section 514. The image calculation section 514 generates a HD (High Definition) image signal by applying the prediction coefficients to the SD image signal.

The trainee-image generating section 511 may have the same structure as described with reference to FIG. 17.

Figure 41:
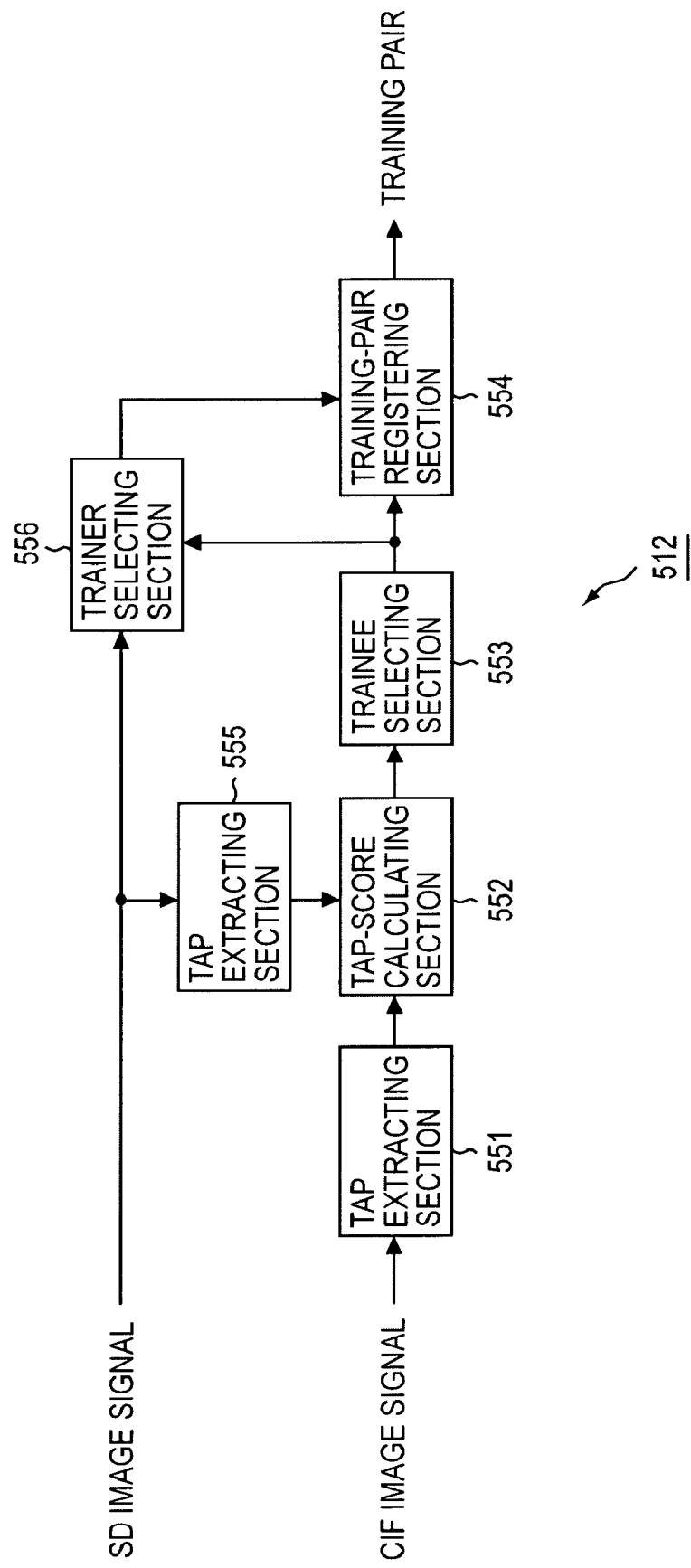
FIG. 41 is a block diagram depicting an example structure of the training-pair generating section in FIG. 40.

FIG. 41 depicts an example structure of the training-pair generating section 512. The training-pair generating section 512 includes a tap extracting section 551, a tap-score calculating section 552, a trainee selecting section 553, a training-pair registering section 554, a tap extracting section 555, and a trainer selecting section 556.

The tap extracting section 551 extracts, from the CIF image signal supplied by the trainee-image generating section 511, reference taps which are pixels existing in an area (reference area) having preset relative positional relationships with the target pixel of interest. From the input SD image signal, the tap extracting section 555 extracts as prediction taps the pixels in a prediction area having a predetermined relative positional relationship with the pixel of interest.

The relative positional relationships of the reference taps in the tap extracting section 551 with the pixel of interest are set so as to be substantially the same as the relative positional relationships of the prediction taps in the tap extracting section 555 with the pixel of interest (such that score calculation can be performed).

The tap-score calculating section 552 determines the correlation between the reference taps extracted by the tap extracting section 551 and the prediction taps extracted by the tap extracting section 555. More specifically, the correlation coefficient of each tap is calculated.

If the reference taps are, for example, X (X1, X2, X3, X4, X5) and the prediction taps are, for example, Y (Y1, Y2, Y3, Y4, Y5), a correlation coefficient C is calculated based on the following equation, in the same manner as in Equation (15).

$$C = \frac{\sum_i (X_i - X_M)(Y_i - Y_M)}{\sqrt{\sum_i (X_i - X_M)^2} \sqrt{\sum_i (Y_i - Y_M)}} \quad (25)$$

where, XM and YM represent the average values of Xi and Yi, respectively.

Alternatively, the tap-score calculating section 552 may use the waveform distance between the reference taps and the prediction taps to determine the correlation between the two types of taps. If this is the case, a waveform distance D is calculated based on the following equation, in the same manner as in Equation (16).

$$D = \sqrt{\sum_i (X_i - Y_i)^2} \quad (26)$$

If the correlation with the prediction taps is a preset threshold or higher, the trainee selecting section 553 selects the reference taps as a trainee image signal, and supplies it to the training-pair registering section 554 for registration. If the waveform distance D is used as a score and is smaller than a preset threshold, the reference taps are selected by the trainee selecting section 553 and then supplied to and registered in the training-pair registering section 554.

The trainer selecting section 556 selects as a trainer image signal the SD image signal corresponding to the reference taps selected by the trainee selecting section 553. The training-pair registering section 554 registers the training pair, i.e., the signal pair including the CIF image signal as a trainee image signal supplied by the trainee selecting section 553 and the SD image signal as a trainer image signal supplied by the trainer selecting section 556.

Figure 42:
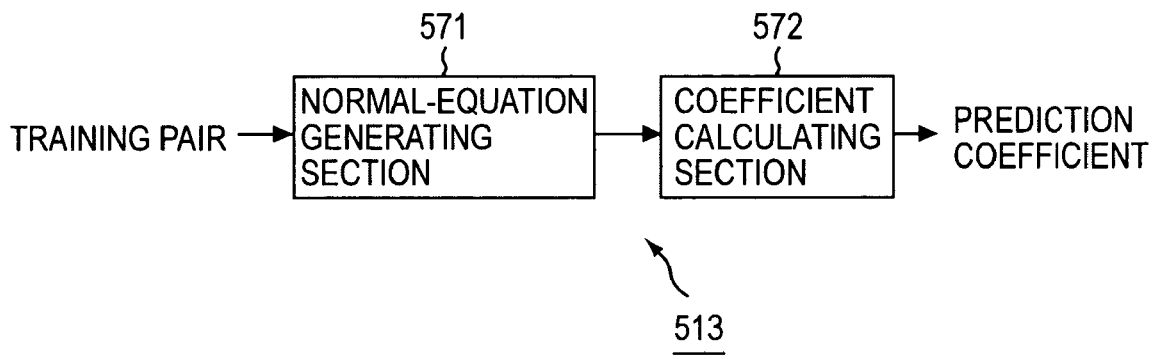
FIG. 42 is a block diagram illustrating an example structure of the coefficient generating section in FIG. 40.

FIG. 42 depicts an example structure of the coefficient generating section 513. The coefficient generating section 513 includes a normal equation generating section 571 and a coefficient calculating section 572.

The normal equation generating section 571 generates normal equations based on the training pair supplied by the training-pair registering section 554 in the training-pair generating section 512. The coefficient calculating section 572 calculates prediction coefficients by solving the normal equations generated by the normal equation generating section 571 through, for example, the least squares method.

Figure 43:
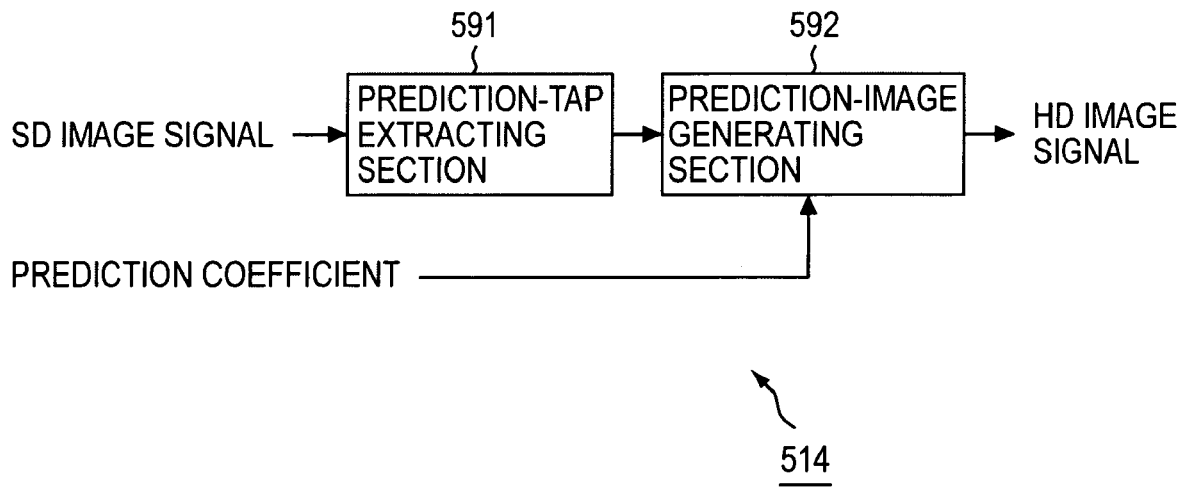
FIG. 43 is a block diagram illustrating an example structure of the image calculation section in FIG. 40.

FIG. 43 depicts an example structure of the image calculation section 514. The image calculation section 514 includes a prediction-tap extracting section 591 and a prediction-image generating section 592.

From the input SD image signal, the prediction-tap extracting section 591 extracts as prediction taps the pixels in a preset prediction area. The relative positional relationships of these prediction taps with the pixel of interest are the same as in the tap extracting section 551 and the tap extracting section 555 in FIG. 41. The prediction-image generating section 592 applies the prediction taps extracted by the prediction-tap extracting section 591 and the prediction coefficients supplied by the coefficient calculating section 572 to a linear simple expression to generate predicted pixels as a HD image signal.

HD-image-signal generation processing by the information processing apparatus 501 will now be described with reference to the flowchart in FIG. 44.

First in step S301, the trainee-image generating section 511 carries out CIF-image-signal generation processing. Details of this CIF image signal generation processing are the same as in the processing in FIG. 22.

After a CIF image signal has been generated in step S301, in step S302 the tap extracting section 555 extracts prediction taps with respect to the pixel of interest of the input SD image signal. As a result of this processing, as shown in, for example, FIG. 45, 13 pixel data items s0 to s12 of the SD image signal are extracted as prediction taps. In the example in FIG. 45, the predictions taps include a pixel of interest s6; pixel data items s5 and s4 located in the left of s6; pixel data items s7 and s8 located in the right of s6; a pixel data item s2 located above s6; a pixel data item s1 located in the left of s2; a pixel data item s3 located in the right of s2; a pixel data item s0 located above s2; a pixel data item s10 located below s6; a pixel data item s9 located in the left of s10; a pixel data item s11 located in the right of s10; and a pixel data item s12 located below s10.

In step S303, the tap extracting section 551 extracts reference taps whose center tap corresponds to one pixel in the search range of the same CIF image signal as that supplied by the sub-sampling section 333 according to the above-described embodiment. These reference taps are preset such that they have the same relative positional relationships as the prediction taps extracted by the tap extracting section 555. In the example in FIG. 46, the reference taps composed of one pixel data item c6; pixel data items c5 and c4 located in the left of c6; pixel data items c7 and c8 located in the right of c6; a pixel data item c2 located above c6; a pixel data item c1 located in the left of c2; a pixel data item c3 located in the right of c2; a pixel data item c0 located above c2; a pixel data item c10 located below c6; a pixel data item c9 located in the left of c10; a pixel data item c11 located in the right of c10; and a pixel data item c12 located below c10 are extracted from the CIF image signal indicated by "x".

Next in step S304, the tap-score calculating section 552 calculates a tap score. If, for example, a correlation value is used as the score, a correlation coefficient C between the 13 prediction taps s0 to s12 extracted in step S302 and the reference taps c0 to c12 extracted in step S303 as shown in FIG. 47 is calculated based on the above-described Equation (16).

Figure 45:
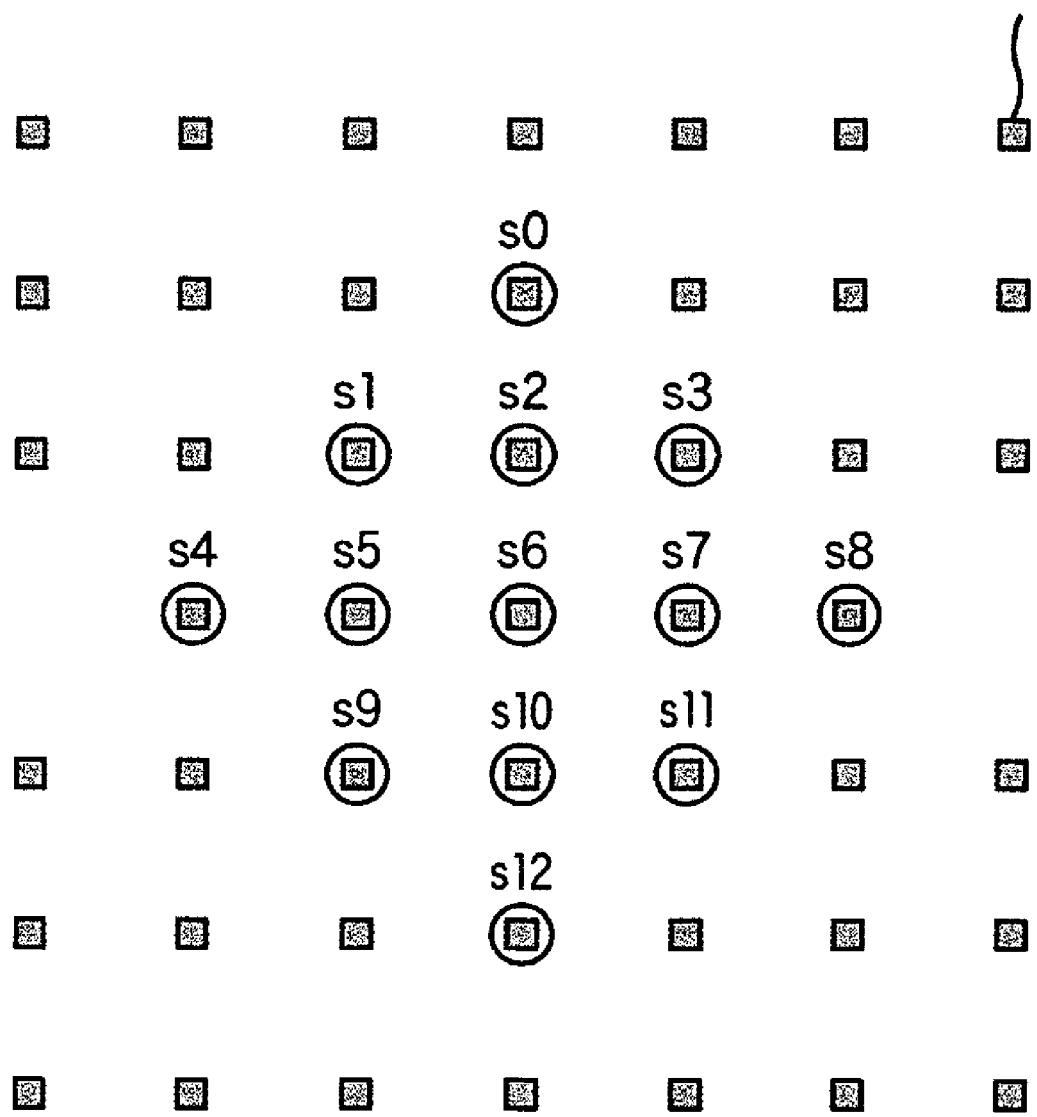
FIG. 45 illustrates prediction taps.
Figure 46:
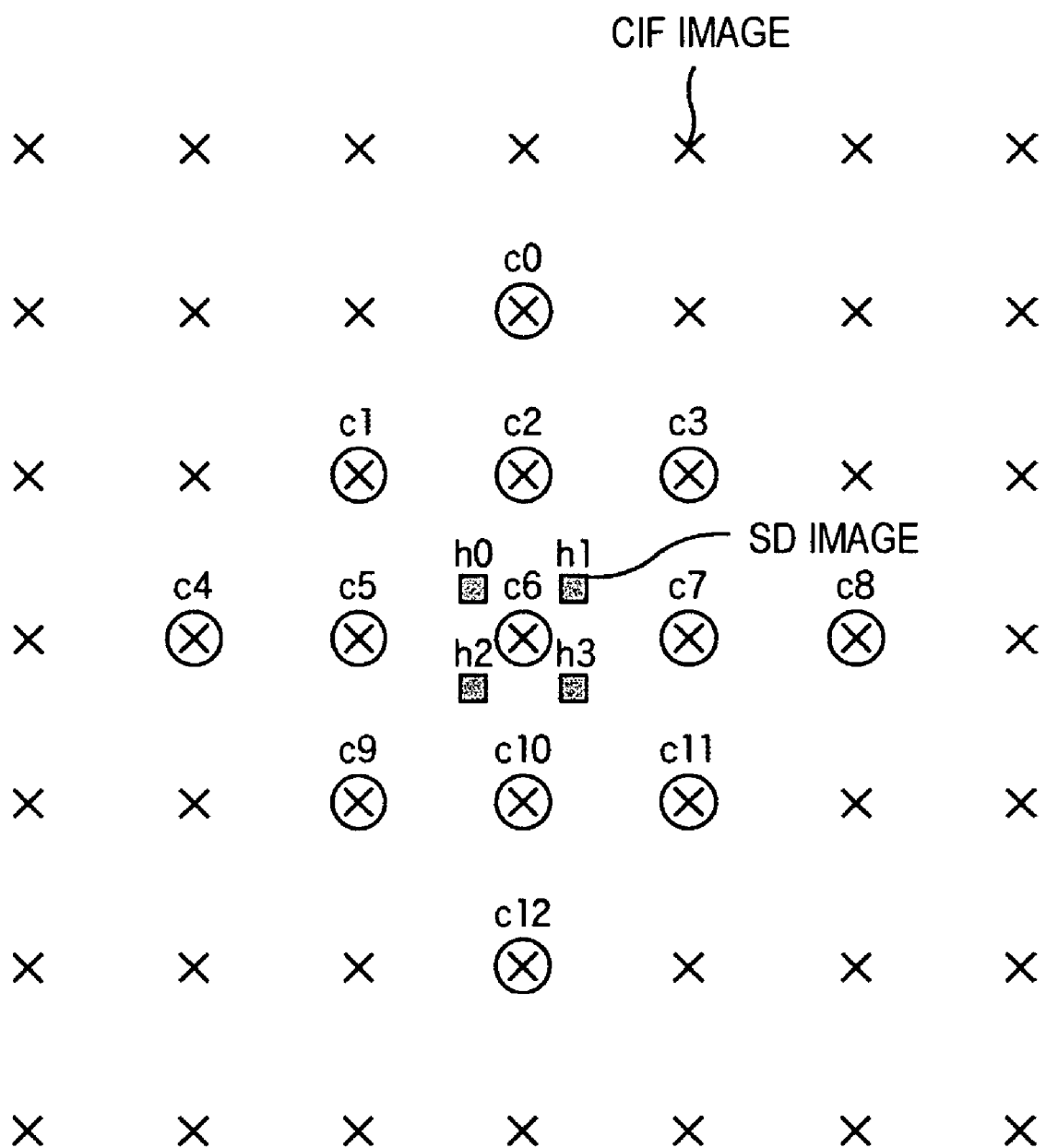
FIG. 46 illustrates reference taps.

To ensure that the above-described calculation is carried out, the prediction taps extracted by the tap extracting section 555 in step S302 and the reference taps extracted by the tap extracting section 551 in step S303 are predetermined so as to correspond to each other. More specifically, as shown in FIGS. 45 and 46, the relative positional relationships between the reference taps and the prediction taps are determined such that the pixel data items c0 to c12 as the reference taps correspond to the pixel data items s0 to s12 as the prediction taps, respectively.

Next in step S305, the trainee selecting section 553 compares the score (correlation coefficient C in this example) calculated in the processing of step S304 with a predetermined threshold. If the correlation value C is the threshold or higher, i.e., if the CIF image signal (reference taps) has a high correlation with the prediction taps of the SD image signal, the reference taps are selected and supplied to the training-pair registering section 554. The training-pair registering section 554 registers the reference taps. More specifically, the pixel data items c0 to c12 as the reference taps extracted in step S303 shown in FIG. 46 and FIG. 47 are registered in the training-pair registering section 554.

Figure 47:
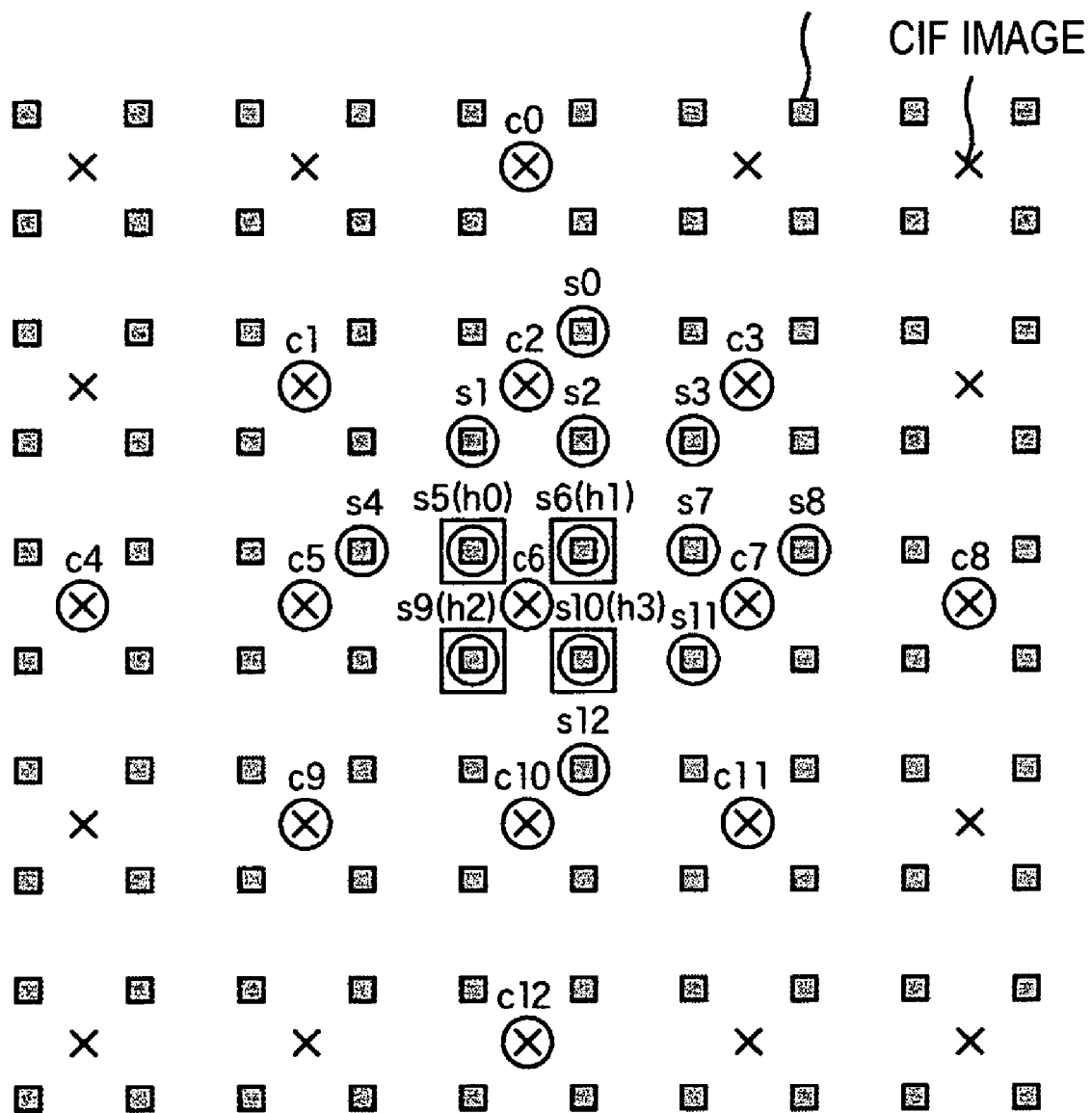
FIG. 47 illustrates the relationship between prediction taps and reference taps.

At this time, as shown in FIG. 47, the trainer selecting section 556 selects pixel data h0 to h3 (located in the upper left, upper right, lower left, and lower right, respectively of the pixel data c6 at the center of the reference taps extracted in step S303) of the SD image signal as the pixel data of the trainer image signal corresponding to the reference taps c0 to c12 (corresponding pixels of interest). The training-pair registering section 554 registers the pixel data h0 to h3 as to constitute a training pair corresponding to the pixel data c0 to c12.

In step S306, the tap extracting section 551 determines if the entire search range is searched. If not the entire search range is searched, the flow returns to step S303, where a subsequent pixel in the search range is selected, and reference taps having the selected pixel as its center are extracted. In step S304, the tap-score calculating section 552 calculates the score of the reference taps selected newly in step S303 in the same manner as described above. In step S305, the trainee selecting section 553 determines whether the score calculated in the processing of step S304 is the threshold or higher. If the score is the threshold or higher, the trainee selecting section 553 supplies the reference taps to the training-pair registering section 554, which then stores them. If the score is below the threshold, this registration processing is not carried out. The trainer selecting section 556 selects the pixel data h0 to h3 of the SD image signal as the trainer data for the pixel data c0 to c12 selected by the trainee selecting section 553 and supplies the pixel data h0 to h3 to the training-pair registering section 554. The training-pair registering section 554 registers the reference tap c0 to c12 (trainee image signal) and the pixel data h0 to h3 of the SD image signal (trainer image signal) as a training pair.

Figure 48:
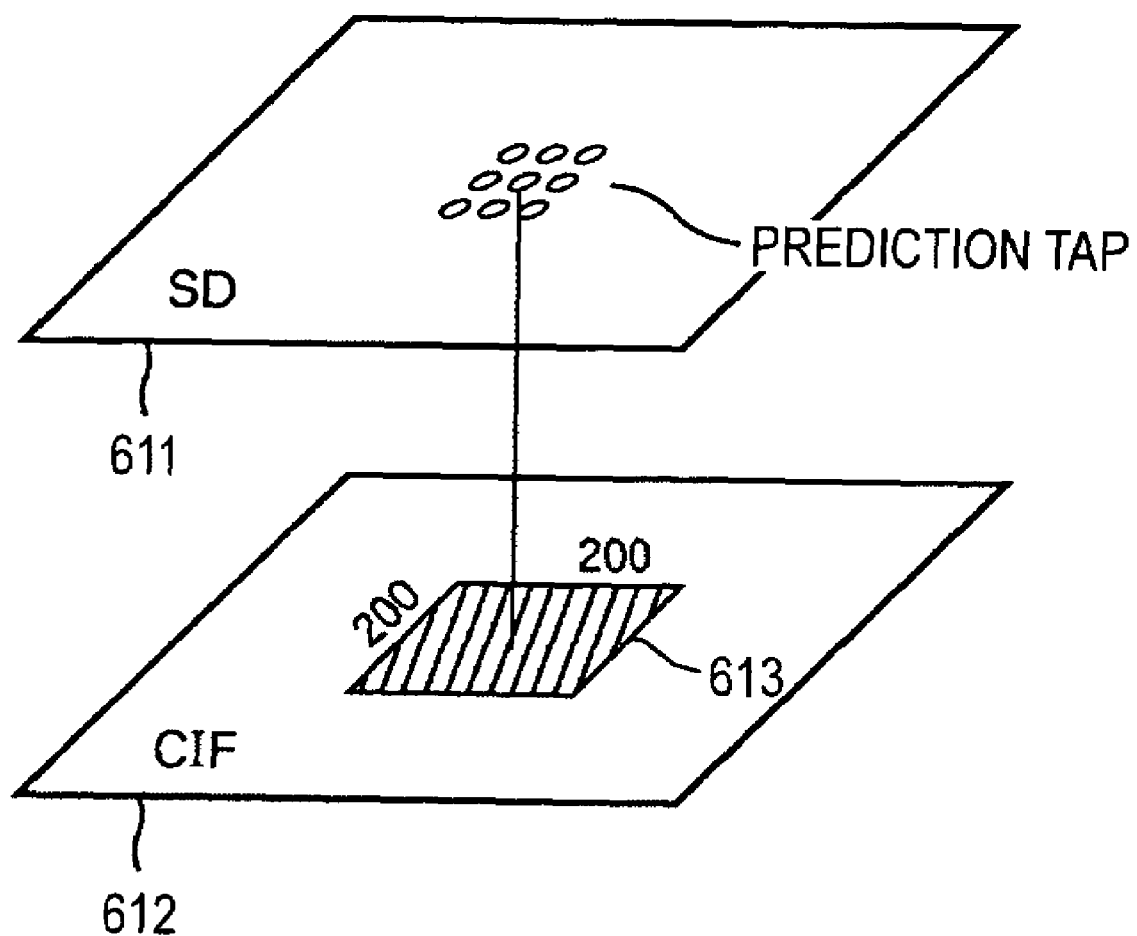
FIG. 48 illustrates the relationship between prediction taps and a search range.

As shown in FIG. 48, the above-described processing is to search a search range 613 on a CIF image plane 612 for taps correlated with the prediction taps with respect to one pixel of interest on a SD image plane 611. The search range 613 is, for example, an area of 200×200 pixels. The search range 613 is searched for reference taps having a correlation of the threshold or higher with the prediction taps surrounding the pixel of interest, and then the reference taps and the corresponding pixels of interest of the SD image signal are registered as a training pair.

Figure 49:
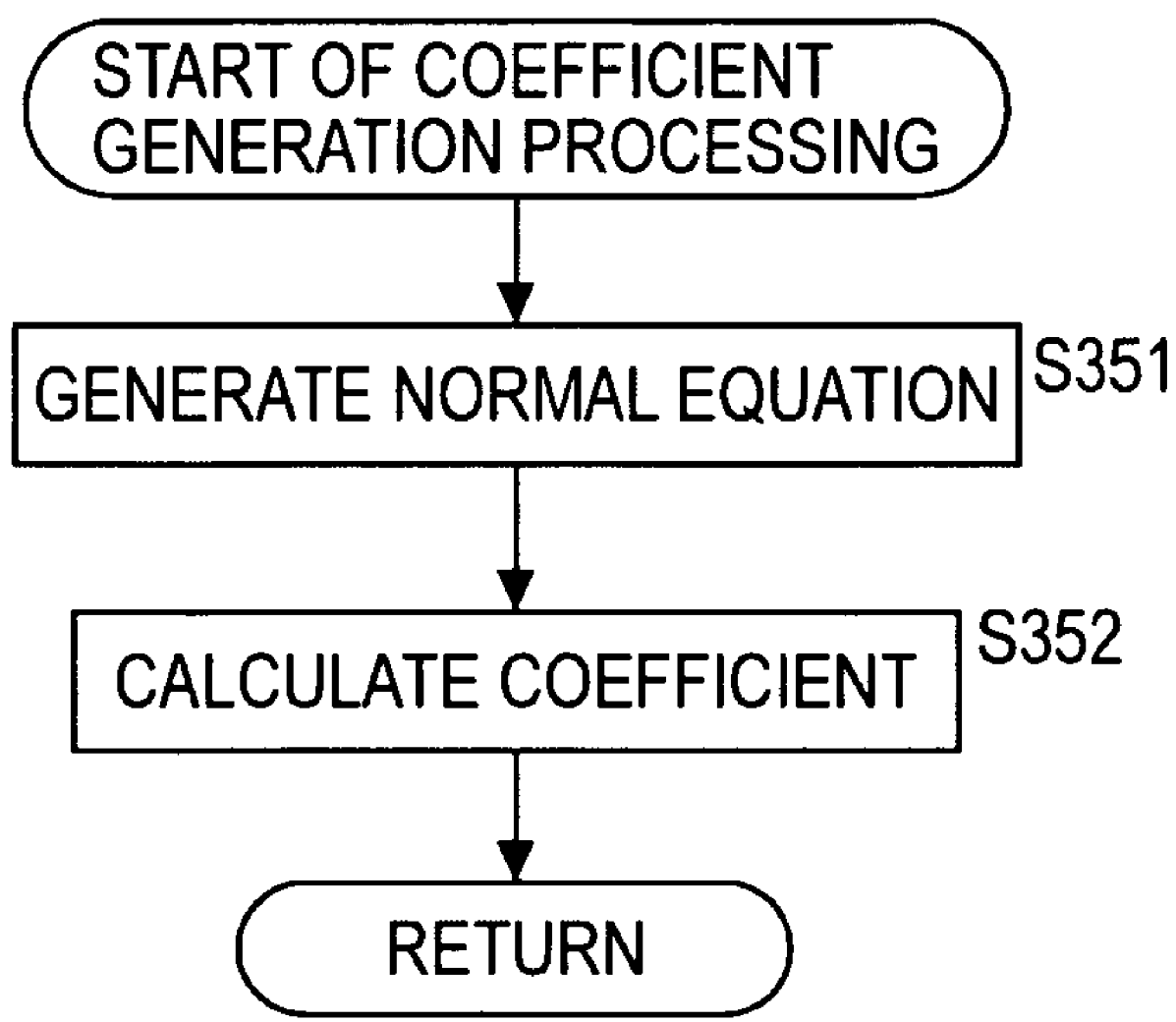
FIG. 49 is a flowchart illustrating coefficient generation processing of step S307 in FIG. 44.

The above-described processing is repeated until it is determined in step S306 that the entire search range 613 is searched. If it is determined that the entire search range 613 is searched, the flow proceeds to step S307, where the coefficient generating section 513 carries out coefficient generation processing. Details of this coefficient generation processing are shown as the flowchart in FIG. 49.

In step S351, the normal equation generating section 571 generates normal equations as shown in Equation (27) based on the training pair supplied by the training-pair registering section 554.

$$\left. \begin{array}{l} h0 = \sum_{k=0}^{12} W_{0,k} \cdot c_k \\ h1 = \sum_{k=0}^{12} W_{1,k} \cdot c_k \\ h2 = \sum_{k=0}^{12} W_{2,k} \cdot c_k \\ h3 = \sum_{k=0}^{12} W_{3,k} \cdot c_k \end{array} \right\} \quad (27)$$

The four mathematical expressions in Equations (27) represent the relationships between the pixel data h0 of the SD image signal and the pixel data c0 to c12 of the CIF image signal, the relationships between the pixel data h1 of the SD image signal and the pixel data c0 to c12 of the CIF image signal, the relationships between the pixel data h2 of the SD image signal and the pixel data c0 to c12 of the CIF image signal, and the relationships between the pixel data h3 of the SD image signal and the pixel data c0 to c12 of the CIF image signal in FIG. 47, respectively. Thirteen or more equations that represent the relationships between the pixel data h0 and the pixel data c0 to c12 are obtained in the search range 613. Therefore, 13 unknown prediction coefficients W0,k can be obtained. Similarly, 13 or more equations for each of the pixel data items h1, h2, and h3, can be generated in the search range 613. Therefore, the prediction coefficients W1,k, W2,k, and W3,k can be obtained in the same manner.

If the normal equation generating section 571 generates normal equations in step S351, in step S352 the coefficient calculating section 572 calculates the coefficients by solving the generated normal equations through, for example, the least squares method. Thus, the prediction coefficients W0,k to W3,k in Equations (27) are obtained.

Figure 44:
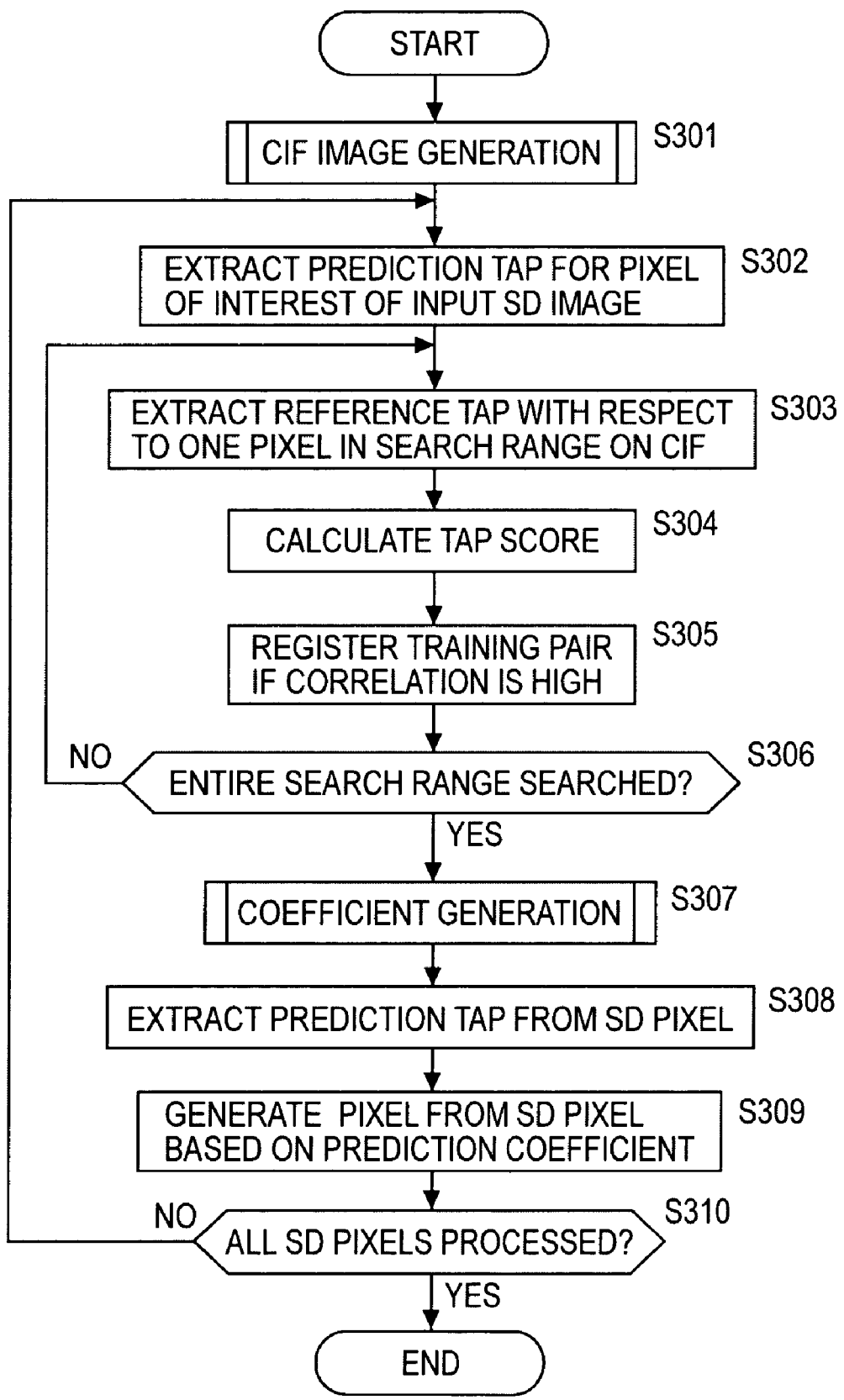
FIG. 44 is a flowchart illustrating HD image signal generation processing of the information processing apparatus in FIG. 40.
Figure 50:
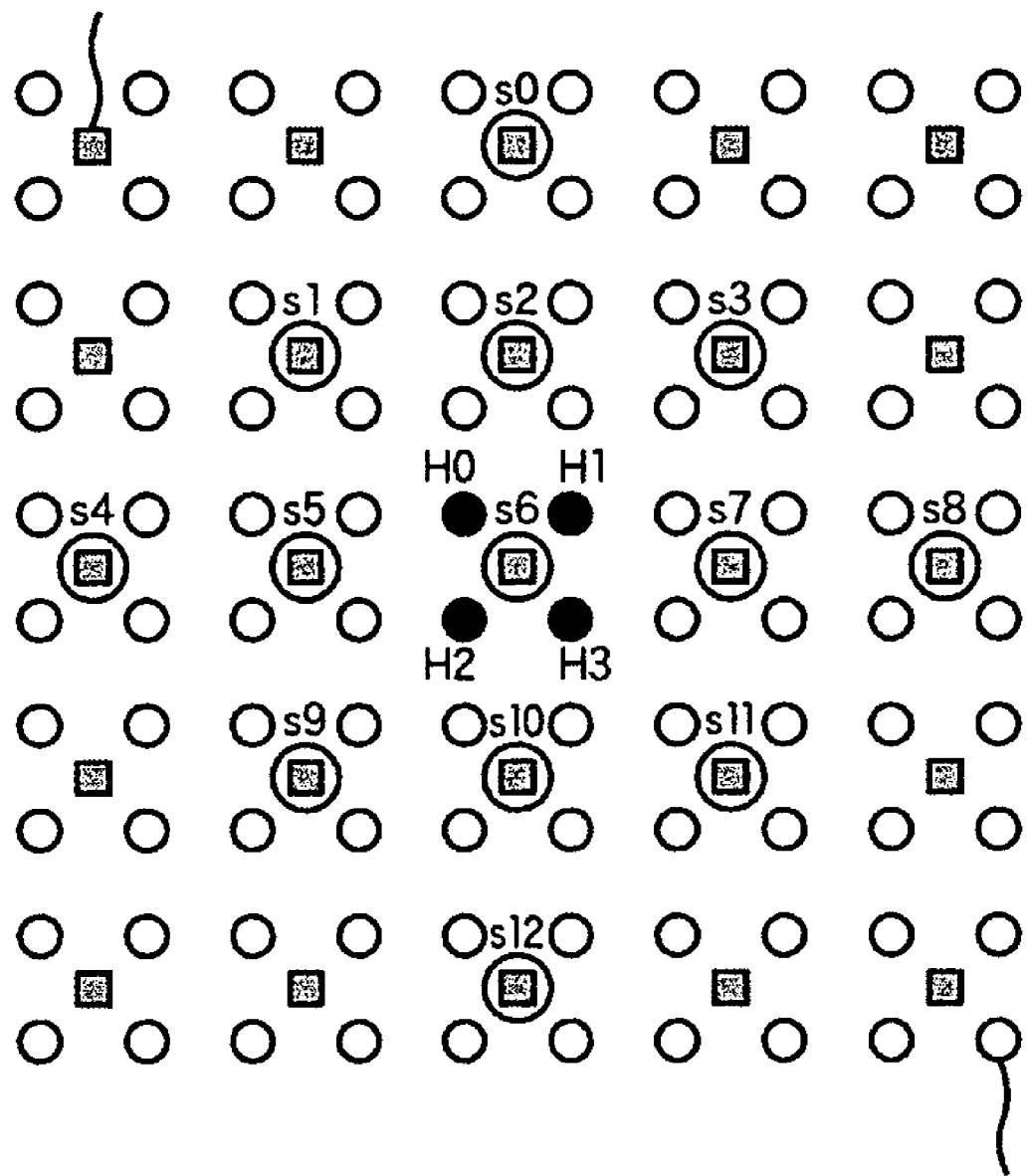
FIG. 50 illustrates the relationship between prediction taps and a HD image signal.

Next in step S308 of FIG. 44, the prediction-tap extracting section 591 in the image calculation section 514 extracts as prediction taps the pixel data in a predetermined prediction area from the input SD image signal. These prediction taps are the same as the taps extracted in the tap extracting section 555 of FIG. 41. In short, as shown in FIG. 50, pixel data items s0 to s12 are selected from the input SD image signal data as prediction taps. The shape formed by these prediction taps (positional relationships relative to the pixel of interest) is the same as that formed by the pixel data items c0 to c12 shown in FIG. 47.

In step S309, based on the prediction coefficients, the prediction-image generating section 592 carries out the processing of generating a HD image signal from the SD image signal. More specifically, the pixel data items H0 to H3 for a HD image signal are generated by applying the prediction coefficients generated through the processing in step S307 and the prediction taps extracted through the processing in step S308 to the Equation (28) shown below.

$$\left.\begin{aligned} H0 &= \sum_{k=0}^{12} W_{0,k} \cdot s_k \\ H1 &= \sum_{k=0}^{12} W_{1,k} \cdot s_k \\ H2 &= \sum_{k=0}^{12} W_{2,k} \cdot s_k \\ H3 &= \sum_{k=0}^{12} W_{3,k} \cdot s_k \end{aligned}\right\} \quad (28)$$

As shown in FIG. 5, the data H0 to H3 indicate pixel data of the HD image signal located, respectively, in the upper left, upper right, lower left, and lower right of the pixel data s6 as the pixel of interest at the center of the prediction taps s0 to s12. Prediction coefficients W0,k to W3,k of Equation (28) are the same as the prediction coefficients W0,k to W3,k in Equation (27).

As is apparent from the comparison between FIG. 50 and FIG. 47 (or FIG. 46), the relative positional relationships between the prediction taps S0 to S12 as pixels of the SD image signal and the pixel data items H0 to H3 as the HD image signal in FIG. 50 are the same as or similar to the relative positional relationships between the pixel data items c0 to c12 of the CIF image signal and the pixel data items h0 to h3 of the SD image signal in FIG. 47 (or FIG. 46). Furthermore, the HD image signal has the pixel density double that of the SD image signal horizontally and vertically, and the SD image signal also has the pixel density double that of the CIF image signal horizontally and vertically. Therefore, the relationships between the pixel data c0 to c12 and the pixel data h0 to h3 are very similar to (has a significantly high correlation with) the relationships between the pixel data s0 to s12 and the pixel data H0 to H3. Thus, it is expected that the prediction coefficients W0,k to W3,k obtained based on the relationships between the pixel data c0 to c12 of the CIF image signal and the pixel data h0 to h3 of the SD image signal are substantially the same as or, if different, very similar to the prediction coefficients W0,k to W3,k representing the relationships between the pixel data s0 to s12 of the SD image signal and the pixel data H0 to H3 of the HD image signal. Accordingly, the pixels H0 to H3 of the HD image signal can be generated by applying the prediction coefficients W0,k to W3,k to the pixel data S0 to S12 of the SD image signal.

Figure 51A:
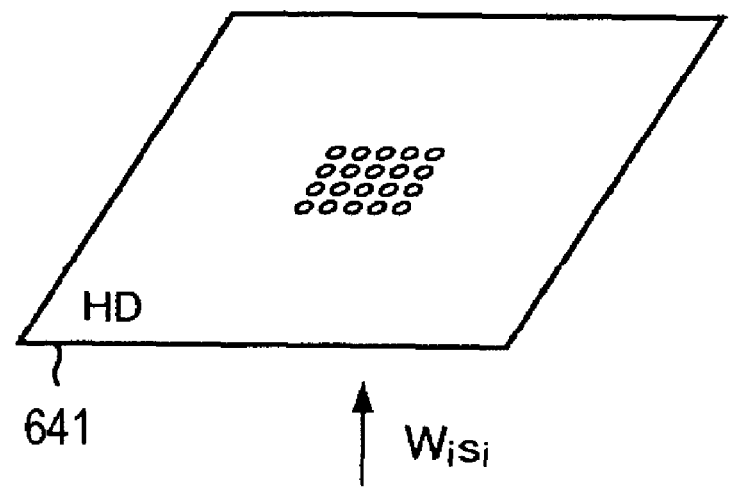
FIGS. 51A to C illustrate the relationships between a CIF image signal, a SD image signal, and a HD image signal.
Figure 51B:
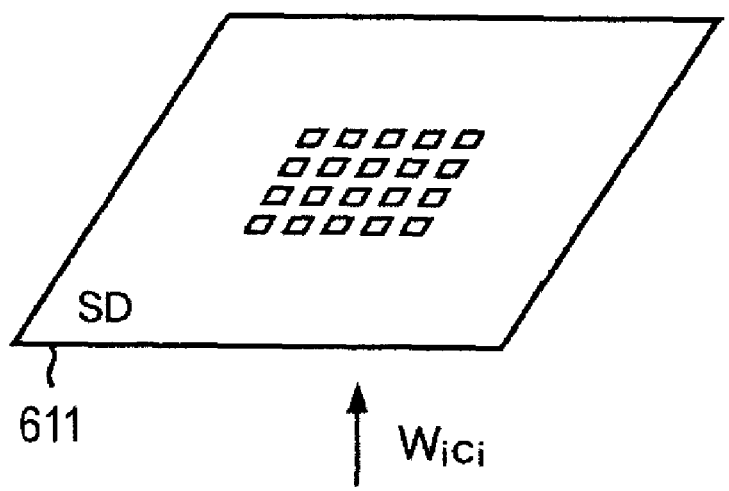
Figure 51C:
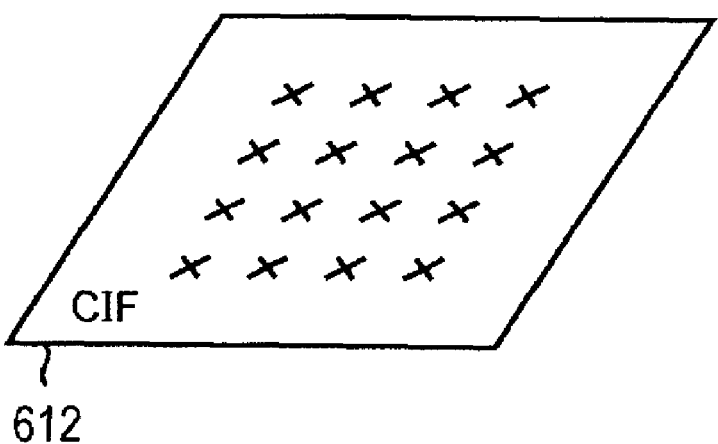

More specifically, as shown in FIGS. 51A to 51C, based on the fact that a field 641 of the HD image signal has the density double (horizontally and vertically) that of a field 611 of the subordinate SD image signal, a field 612 of the CIF image signal having the density half (horizontally and vertically) that of the field 611 of the SD image signal is generated to obtain prediction coefficients Wi representing the relationships between the field 611 of the SD image signal and the field 612 of the CIF image signal, and thereafter the prediction coefficients Wi are used to find the relationships between the field 611 of SD image signal and the field 641 of the HD image signal. For this reason, the prediction coefficients Wi can be generated without a HD image signal as a trainer image signal, and based on that, a HD image signal with higher quality than that of the SD image signal can be generated from the SD image signal.

Referring back to FIG. 44, in step S310 the image calculation section 514 determines whether all SD image pixels have been processed. If there is a SD image pixel that has not been processed, the flow returns to step S302, where another pixel of the input SD image signal is set as a new pixel of interest and prediction taps with respect to the pixel of interest are extracted. Thereafter, the prediction taps are processed in the same manner as described above.

If it is determined in step S310 that all SD pixels have been processed, the HD pixel generation processing ends.

In the above-described processing, when a high-quality image with four times the resolution of an input image is to be generated, an image with ¼ the resolution of the input image is generated to produce prediction coefficients. In general, to produce an image n-times the resolution of an input image, an image 1/n the resolution of the input image is produced to produce prediction coefficients based on the produced image. Although "n=4" in the above-described example, n is generally one or a larger number.

Although higher-quality images are generated in the above-described example, the present invention can be applied to the generation of various types of signals. Furthermore, the present invention can be applied to the processing of not only image signals but also sound signals and other signals.

The above-described sequence of processing can be carried out not only with hardware but also with software. If software is used to carry out the above-described sequence of processing, for example, the information processing apparatus can be realized by, for example, a personal computer as shown in FIG. 15.

In the present invention, the steps of programs recorded on the recording medium may or may not be followed time-sequentially in order of described steps. Furthermore, the steps may be followed in parallel or independently from one another.

The present application contains subject matters related to Japanese Patent Application No. 2004-013888, Japanese Patent Application No. 2004-013890, and Japanese Patent Application No. 2004-013891, all of which were filed in Japanese Patent Office on Jan. 22, 2004 and the entire contents of which being incorporated by reference.

What is claimed is:

1. An information processing apparatus comprising:
   storage means for storing a signal pair including a signal of a first type and a signal of a second type corresponding to the signal of the first type;
   first extraction means for extracting a signal in a first range from an input signal as a signal of the first type;
   retrieval means for comparing a feature of the extracted input signal in the first range with a feature of the signal of the first type in the first range in the stored signal pair to retrieve a signal pair including the signal of the first type in the first range having a predetermined relationship with the feature of the extracted input signal in the first range;
   calculation means for calculating a prediction coefficient based on the signal of the second type and the signal of the first type in a second range in the retrieved signal pair;
   second extraction means for extracting a signal in the second range from the input signal; and
   generation means for generating an output signal as a signal of the second type from the input signal in the second range based on the calculated prediction coefficient.

2. The information processing apparatus according to claim 1, wherein the signal of the first type and the signal of the second type are image signals and the signal of the second type has higher resolution than that of the signal of the first type.

3. The information processing apparatus according to claim 2, wherein the retrieval means includes:
   first detection means for detecting the feature of the input signal in the first range;
   second detection means for detecting the feature of the stored signal of the first type in the first range; and
   selection means for comparing the detected feature of the input signal with the detected feature of the signal of the first type and selecting the signal pair based on a result of the comparison.

4. The information processing apparatus according to claim 3, wherein the first detection means and the second detection means detect a pixel value, a normalized pixel value, or a dynamic range in the first range as the features and the selection means performs the comparison based on a norm value, a sum of absolute differences, or a coefficient value of detected values.

5. The information processing apparatus according to claim 3, wherein the first detection means and the second detection means detect an adaptive dynamic range coding code in the first range and the selection means performs the comparison based on a coincidence of detected codes.

6. The information processing apparatus according to claim 1, wherein the calculation means generates a normal equation based on the signal of the second type and the signal of the first type in the second range in the detected signal pair and calculates the prediction coefficient by solving the normal equation.

7. An information processing method of an information processing apparatus for processing one or more image signals, the method comprising:
   a first extracting step, utilizing a first extracting unit, of extracting a signal in a first range from an input signal;
   a retrieval step, utilizing a retrieving unit, of comparing a feature of the extracted input signal in the first range with a feature of a signal of a first type in the first range, the signal of the first type and a corresponding signal of a second type being included in a pre-stored signal pair, to retrieve a signal pair including the signal of the first type in the first range having a predetermined relationship with the feature of the extracted input signal in the first range;
   a calculating step, utilizing a calculating unit, of calculating a prediction coefficient based on the signal of the second type and the signal of the first type in a second range in the retrieved signal pair;
   a second extracting step, utilizing a second extracting unit, of extracting a signal in the second range from the input signal; and
   a generating step, utilizing a generating unit, of generating an output signal as a signal of the second type from the input signal in the second range based on the calculated prediction coefficient.

8. A computer-readable recording medium storing a program comprising:
   a first extraction step of extracting a signal in a first range from an input signal;
   a retrieval step of comparing a feature of the extracted input signal in the first range with a feature of a signal of a first type in the first range, the signal of the first type and a corresponding signal of a second type being included in a pre-stored signal pair, to retrieve a signal pair including the signal of the first type in the first range having a predetermined relationship with the feature of the extracted input signal in the first range;
   a calculation step of calculating a prediction coefficient based on the signal of the second type and the signal of the first type in a second range in the retrieved signal pair;
   a second extraction step of extracting a signal in the second range from the input signal; and
   a generation step of generating an output signal as a signal of the second type from the input signal in the second range based on the calculated prediction coefficient.

9. An information processing apparatus comprising:
   first generation means for generating a signal of a first type from an input signal of a second type;
   first extraction means for extracting a signal in a first range from the generated signal of the first type;
   second extraction means for extracting a signal in a second range from the generated signal of the first type;
   second generation means for generating a signal pair including the signal of the second type and the signal of the first type corresponding to the signal of the second type, the signal of the first type being in a range defined by the logical OR between the extracted first range and the second range; and
   storage means for storing the signal pair.

10. The information processing apparatus according to claim 9, wherein the signal of the first type and the signal of the second type are image signals and the signal of the second type has higher resolution than that of the signal of the first type.

11. The information processing apparatus according to claim 10, wherein the first generation means generates the signal of the first type by decimating the signal of the second type.

12. An information processing method of an information processing apparatus for processing image signal, the method comprising:
   a first generating step, utilizing a first generating unit, of generating a signal of a first type from an input signal of a second type;
   a first extracting step, utilizing a first extracting unit, of extracting a signal in a first range from the generated signal of the first type;
   a second generating step, utilizing a second generating unit, of extracting a signal in a second range from the generated signal of the first type;
   a second generating step, utilizing a second generating unit, of generating a signal pair including the signal of the second type and the signal of the first type corresponding to the signal of the second type, the signal of the first type being in a range defined by the logical OR between the extracted first range and the second range; and
   a storage step, utilizing a storage unit, of storing the generated signal pair.

13. A computer-readable recording medium storing a program comprising:
   a first generation step of generating a signal of a first type from an input signal of a second type;
   a first extraction step of extracting a signal in a first range from the generated signal of the first type;
   a second extraction step of extracting a signal in a second range from the generated signal of the first type;
   a second generation step of generating a signal pair including the signal of the second type and the signal of the first type corresponding to the signal of the second type, the signal of the first type being in a range defined by the logical OR between the extracted first range and the second range; and
   a storage step of storing the generated signal pair.

* * * * *

UNITED STATES PATENT AND TRADEMARK OFFICE
CERTIFICATE OF CORRECTION

PATENT NO. : 7,605,868 B2 Page 1 of 1
APPLICATION NO. : 11/040586
DATED : October 20, 2009
INVENTOR(S) : Kondo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1309 days.

Signed and Sealed this

Fifth Day of October, 2010

David J. Kappos
*Director of the United States Patent and Trademark Office*